US008213606B2

(12) United States Patent
Shantz et al.

(10) Patent No.: US 8,213,606 B2
(45) Date of Patent: *Jul. 3, 2012

(54) METHOD AND APPARATUS FOR IMPLEMENTING PROCESSOR INSTRUCTIONS FOR ACCELERATING PUBLIC-KEY CRYPTOGRAPHY

(75) Inventors: Sheueling Chang Shantz, Cupertino, CA (US); Leonard Rarick, Los Altos, CA (US); Lawrence Spracklen, Boulder Creek, CA (US); Hans Eberle, Mountain View, CA (US); Nils Gura, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1582 days.

This patent is subject to a terminal disclaimer.

(21) Appl. No.: 10/789,311

(22) Filed: Feb. 27, 2004

(65) Prior Publication Data
US 2004/0267855 A1 Dec. 30, 2004

Related U.S. Application Data

(63) Continuation of application No. 10/626,420, filed on Jul. 24, 2003.

(60) Provisional application No. 60/483,818, filed on Jun. 30, 2003.

(51) Int. Cl.
*G06F 21/00* (2006.01)
(52) U.S. Cl. ............................ 380/44; 380/30
(58) Field of Classification Search .................... 380/28, 380/29
See application file for complete search history.

(56) References Cited

U.S. PATENT DOCUMENTS

| 4,863,247 | A | * | 9/1989 | Lasher et al. ................ 359/108 |
| 5,121,431 | A | | 6/1992 | Wiener |
| 5,347,481 | A | | 9/1994 | Williams |
| 6,049,815 | A | | 4/2000 | Lambert et al. |

(Continued)

FOREIGN PATENT DOCUMENTS

EP 0 247 383 A3 12/1987

OTHER PUBLICATIONS

Yvonne Hitchcock, et al., "Implementing an efficient elliptic curve cryptosystem over GF(p) on a smart card," Anziam J. 44(E), Apr. 2003, pp. C354-C377.

(Continued)

*Primary Examiner* — Nasser Goodarzi
*Assistant Examiner* — Carl Johnson
(74) *Attorney, Agent, or Firm* — Robert C. Kowert; Meyertons, Hood, Kivlin, Kowert & Goetzel, P.C.

(57) ABSTRACT

In response to executing an arithmetic instruction, a first number is multiplied by a second number, and a partial result from a previously executed single arithmetic instruction is fed back from a first carry save adder structure generating high order bits of the current arithmetic instruction to a second carry save adder tree structure being utilized to generate low order bits of the current arithmetic instruction to generate a result that represents the first number multiplied by the second number summed with the high order bits from the previously executed arithmetic instruction. Execution of the arithmetic instruction may instead generate a result that represents the first number multiplied by the second number summed with the partial result and also summed with a third number, the third number being fed to the carry save adder tree structure.

67 Claims, 36 Drawing Sheets

U.S. PATENT DOCUMENTS

| | | | |
|---|---|---|---|
| 6,199,087 B1 | 3/2001 | Blake et al. | |
| 6,339,819 B1* | 1/2002 | Huppenthal et al. | 712/16 |
| 6,542,916 B1* | 4/2003 | Hinds et al. | 708/501 |
| 6,633,896 B1 | 10/2003 | Moore et al. | |
| 6,687,725 B1* | 2/2004 | Chen et al. | 708/492 |
| 6,735,611 B2* | 5/2004 | Vanstone | 708/492 |
| 6,748,410 B1* | 6/2004 | Gressel et al. | 708/491 |
| 6,763,365 B2* | 7/2004 | Chen et al. | 708/491 |
| 6,848,043 B1* | 1/2005 | Yeh et al. | 712/216 |
| 7,181,484 B2* | 2/2007 | Stribaek et al. | 708/492 |
| 2002/0044649 A1 | 4/2002 | Gallant et al. | |
| 2002/0103843 A1 | 8/2002 | McGregor et al. | |
| 2002/0116430 A1* | 8/2002 | Chen et al. | 708/491 |
| 2002/0174157 A1* | 11/2002 | Bhushan et al. | 708/671 |
| 2002/0194237 A1* | 12/2002 | Takahashi et al. | 708/491 |
| 2003/0123654 A1 | 7/2003 | Lambert | |
| 2003/0123655 A1 | 7/2003 | Lambert et al. | |
| 2004/0158597 A1 | 8/2004 | Ye et al. | |

OTHER PUBLICATIONS

National Institute of Standards and Technology, "Recommended Elliptic Curves for Federal Government Use," Aug. 1999, 43 pages.
Hasegawa, Toshio, et al., "A Practical Implementation of Elliptic Curve Cryptosystems over GF(p) on a 16-bit Microcomputer," In *Public Key Cryptography* PKC '98, vol. 1431 of *Lecture Notes in Computer Science*, pp. 182-194.
U.S. Appl. No. 10/387,007 entitled "Hardware Accelerator for Elliptic Curve Cryptography", filed Mar. 2009.
U.S. Appl. No. 10/387,008 entitled "Generic Modular Multiplier Using Partial Reduction", filed Feb. 2008.
U.S. Appl. No. 10/387,009 entitled "Modular Multiplier", filed Nov. 2008.
U.S. Appl. No. 10/387,104 entitled "Generic Implementaion of Elliptic Curve Cryptography Using Partial Reduction", filed Jun. 2007.
Erdem, et al., "A Less Recursive Variant of Karatsuba-Ofman Algorithm for Multiplying Operands of Size a Power of Two," Proceedings of the 16th IEEE Symposium on Computer Arithmetic (ARITH-16'03), Jun. 15-18, 2003.
Gupta, V., et al, "Speeding up Secure Web Transactions Using Elliptic Curve Cryptography," Sun Microsystems, Inc., http://research.sun.com/projects/crypto/, 9 pages, Feb. 2004.
Comba, P.G., "Exponentiation Cryptosystems on the IBM PC," IBM Systems Journal, vol. 29, No. 4, 1990, pp. 526-538.
Kaliski, Burt, "TWIRL and RSA Key Size," Technical Notes, May 1, 2003, RSA Laboratories, 5 pages, downloaded from Internet http://www.orsasecurity.com/rsalabs/node.asp?id=2004 as of Sep. 13, 2006.
Gura, Nils, et al., "Comparing Elliptic Curve Cryptographic and RSA on 8-bit CPUs," Cryptographic Hardware and Embedded Systems—CHES 2004: 6th International Workshop (Cambridge, MA, USA), Aug. 11-13, 2004, LNCS, vol. 3156, ISBN 3-540-22666-4, pp. 119-132, Springer.
Hasegawa, et al., "A Practical Implementaion of Elliptic Curve Cryptosystems over GF(p) on a 16-Bit Microcomputer," In Public Key Cryptography PKC, '98, vol. 1431 of Lecture Notes in Computer Science, Feb. 1998.
Karatsuba, A., et al., "Ymnozhenie mnogozhachnix chisel na avtomatax," Doklady Academi Nauk SSSR, Vo. 145. No. 2, pp. 293-294, 1962.
Hankerson, et al., "Guide to Elliptic Curve Cryptography," pp. 48-53, 95-113, 129-147, 205-212 and 224-226, Springer-Verlag, 2004.
Guajardo, et al., "Efficient Algorithms for Elliptic Curve Cryptosystems," ECE Dept., Worcester Polytechnic Institute, pp. 1-16 (CRYPTO '97, Springer-Verlag, LNCS 1294, pp. 342-356, 1997).
Weimerskirch, et al., "Generalizations of the Karatsuba Algoirthm for Polynomial Multiplication," Communication Security Group, Dept. of Electrical Engineering & Information Sciences, Ruhr-Universitat, Germany, Mar. 2002, pp. 1-23.
Blake-Wilson, S., "Additional ECC Groups for IKE", IPSec Blake-Wilson, Dierks, Hawk-Working Group, Jul. 23, 2002, pp. 1-17.

Gupta, V., "ECC Cipher Suites for TLS," Blake-Wilson, Dierks, Hawk—TLS Working Group, Aug. 2002, pp. 1-31.
Standards for Efficient Cryptography, "SEC 2: Recommended Elliptic Curve Domain Parameters," Certicom Research, Sep. 20, 2000, pp. i-45.
"RFC 2246 on the TLS Protocol Version 1.0", http://www.ietf.org/mail-archive/ietf-announce/Current/msg02896.html, Mar. 26, 2003, 2 pages, including Dierks, T., "The TLS Protocol Version 1.0", Dierks & Allen, Jan. 1999, pp. 1-80.
Song, et al., "Low-Energy Digit-Serial/Parallel Finite Field Multipliers," Journal of VLSI Signal Processing 19, 1988, pp. 149-166.
Agnew, et al., "An Implementaion of Elliptic Curve Cryptosystems Over F2155," IEEE Journal on Selected Areas on Communications, vol. 11. No. 5, Jun. 1993, pp. 804-813.
Halbutogullari, et al., "Mastrovito Multiplier for General Irreducible Polynomials," IEEE Transactions on Computers, Vo. 49, No. 5, May 2000, pp. 503-518.
Yanik, et al., "Incomplete Reduction in Modular Arithmetic," IEEE Proc.-Comput. Digit. Tech., vol. 149, No. 2, Mar. 2002, pp. 46-52.
Blum, et al., "High-Radix Montgomery Modular Exponentiation on Reconfigurable Hardware," IEEE Transactions on Computers, vol. 50, No. 7, Jul. 2001, pp. 759-764.
Gao, et al., "A Compact Fast Variable Key Size Elliptic Curve Cryptosystem Coprocessor," Proceedings of the Seventh Annual IEEE Symposium on Field-Programmable Custom Computer Machines, 1998.
Ernst, et al., "Rapid Prototyping for Hardware Accelerated Elliptic Curve Public-Key Cryptosystems," 12th IEEE Workshop on Rapid System Prototyping, Monterey, CA Jun. 2001, pp. 24-29.
Orlando, et al., Aug. 2000, "A High-Performance Reconfigurable Elliptic Curve Processor for GF(2m)," CHES 2000 Workshop on Cryptographic Hardware and Embedded Systems, Springer-Verlag, Lecture Notes in Computer Science, 1965, pp. 41-56.
Lopez, et al., Aug. 1999, "Fast Multiplication on Elliptic Curves over GF(2m) without Precomputation," CHES 1999 Workshop on Cryptographic Hardware and Embedded Systems, Springer-Verlag, Lecture Notes in Computer Science, 1717, pp. 316-327.
Hankerson, et al., Aug. 2000, "Sowareimmentaion of Elliptic Curve Cryptography over Binary Fields," CHES 2000 Workshop on Cryptographic Hardware and Embedded Systems, Springer-Verlag, Lecture Notes in Computer Science, 1965, pp. 1-24.
Koblitz, Neal, "Elliptic Curve Cryptosystems," Mathematics of Computation, Vo. 48, No. 177, Jan. 1987, pp. 203-209.
Schroeppel, et al., 1995, "Fast Key Exchange with Elliptic Curve Systems," Advances in Cryptography, Crypto '95, Springer-Verlag, Lecture Notes in Computer Science 963, pp. 43-56.
Woodbury, et al., Sep. 2000, "Elliptic Curve Cryptography on Smart Cards Without Coprocessors," The Fourth Smart Card Research and Advanced Applications (CARDIS2000) Conference, Bristol, UK, pp. 71-92.
Miller, V., "Use of Elliptic Curves of Cryptography," In Lecture Notes in Computer Science 218, Advances in Cryptology, CRYPTO '85, pp. 417-426, Springer-Verlag, Berling, 1986.
Itoh, et al., "A Fast Algorithm for Computer Multiplicative Inverses in GF(2m) Using Normal Bases," Informaiton and Computation, vol. 78, No. 3, 1988, pp. 171-177.
Bednara, et al., "Reconfigurable Implementation of Elliptic Curve Crypto Algorithms," Proceedings of the International Parallel and Distributed Processing Symposium, IEEE Computer Society, 2002, 8 pages.
U.S. Dept. of Commerce/National Institute of Standards and Technology, "Digital Signature Standard (DSS)," Federal Information Processing Standards Publication, Jan. 27, 2000, pp. 1-74.
Blake-Wilson, et al, "ECC Cipher Suites for TLS," Blake-Wilson, Dierks, Hawk—TLS Working Group, Mar. 15, 2001, pp. 1-22.
Goodman, et al., "An Energy-Efficient Reconfigurable Public-Key Cryptography Processor," IEEE Journal of Solid-State Circuits, vol. 36, No. 11, Nov. 2001, pp. 1808-1820.
Shantz, Sheueling Chang, "From Euclid's GCD to Montgomery Multiplication to the Great Divide," Sun Microsystems, Jun. 2001, pp. 1-10.

Blake, et al., "Elliptic Curves in Cryptography," London Mathematical Society Lecture Note Series 265, Cambridge University Press, UK, 1999, pp. vii-204.

Intel® Itanium™ Processor, "High Performance on Security Algorithms (RSA Decryption Kernel)," Intel Corporation, 2001, pp. 1-8.

Intel®, "Intel® Itanium™ Architecture Software Developer's Manual, vol. 1: Application Architecture," Revision 2.1, Oct. 2002, 2 pages.

Cohn, Leonard Allen, "Generate-Propagate Adders," ChoPP Computer Corporation, prior to 2000, pp. 1-16.

Fairchild, "F100K ECL Data Book," Fairchild Camera and Instrument Corporation, 1982, pp. 3-177-3-178.

Großschädl, Johann, "Instruction Set Extension for Long Integer Modulo Arithmetic on RISC-Based Smart Cards," Proceedings of the 14$^{th}$ Symposium on Computer Architecture and High Performance Computing, 2002, 7 pages.

Koç, Cetin Kaya, "High-Speed RSA Implementation," Version 2.0, RSA Laboratories, Nov. 1994, pp. i-70.

Mano, M. Morris, "Computer System Architecture," Prentice-Hall, Inc., 1976, pp. 244-249.

Woodbury, A.D.; Bailey, Daniel V., Paar, Christof, "Elliptic Curve Cryptography on Smart Cards Without Coprocessors," The Fourth Smart Card Research and Advanced Applications (CARDIS2000) Conference, Bristok, UK, pp. 71-92.

H. Cohen, A. Miyaji, and T. Ono, "Efficient elliptic curve exponentiation using mixed coordinates", in K. Ohta and D. Pei, editors, Advances in Cryptology ASIACRYPT 98, pp. 51-65, Springer Verlag, 1998, LNCS 1514.

D. Bailey and C. Paar, "Optimal Extension Fields for Fast Arithmetic in Public-Key Algorithms." in H. Krawczyk, editor, Advances in Cryptography—CRYPTO '98, vol. LNCS 1462, pp. 472-485. Springer-Verlag, 1998. http://citeseer.ist.psu.edu/article/bailey98optimal.html, 14 pages.

H. Pietiläinen, "Elliptic Curve Cryptography on Smart Cards," Master's Thesis, Helsinki University of Technology, Oct. 12, 2000, pp. i-81.

F. Morain and J. Olivos, "Speeding Up the Computations on an Elliptic Curve Using Addition-Subtraction Chains," Rapport de Recherche 983, INRIA, France, Mar. 1989, http://citeseer.ist.psu.edu/morain90speeding.html, pp. 119-130.

* cited by examiner

| x15 | x14 | x13 | ... | | x2 | x1 | x0 |
|---|---|---|---|---|---|---|---|
+ | y15 | y14 | y13 | ... | | x2 | x1 | x0 |

| s16 | s15 | s14 | s13 | ... | | s2 | s1 | s0 |
|---|---|---|---|---|---|---|---|---|

```
   X3   X2   X1   X0  *  Y3   Y2   Y1   Y0  + (0,S6,S5,S4) + (C7,C6,C5,C4) + (0,0,0,CC4)
                         P03 P02 P01 P00  ⎤
  +                  P13 P12 P11 P10      ⎥  INPUTS AT START      $P_{ij} = X_i * Y_j$
  +              P23 P22 P21 P20          ⎥  OF WALLACE TREE
  +          P33 P32 P31 P30              ⎦
  +                      S6   S5   S4  ← PREVIOUS SUM OUTPUT  ⎤ INPUTS IN MIDDLE
  +                  C7  C6   C5   C4  ← PREVIOUS CARRY OUTPUT⎦ OF WALLACE TREE
  =      ─────────────────────────────
             S6   S5   S4   S3   S2   S1   S0   } NEW WALLACE TREE SUM OUTPUT
  + C7   C6   C5   C4   C3   C2   C1            } NEW WALLACE TREE CARRY OUTPUT
```

FIG. 11

```
              S3   S2   S1   S0
       +      C3   C2   C1
       +                       CC4   ← PREVIOUS CLA CARRY OUT
       ─────────────────────────────
       CC4  RD3  RD2  RD1  RD0       ← NEW CLA OUTPUT
```

WITH [S7:S0] AND [C7:C0] GOING TO THE CARRY LOOK-AHEAD ADDER.

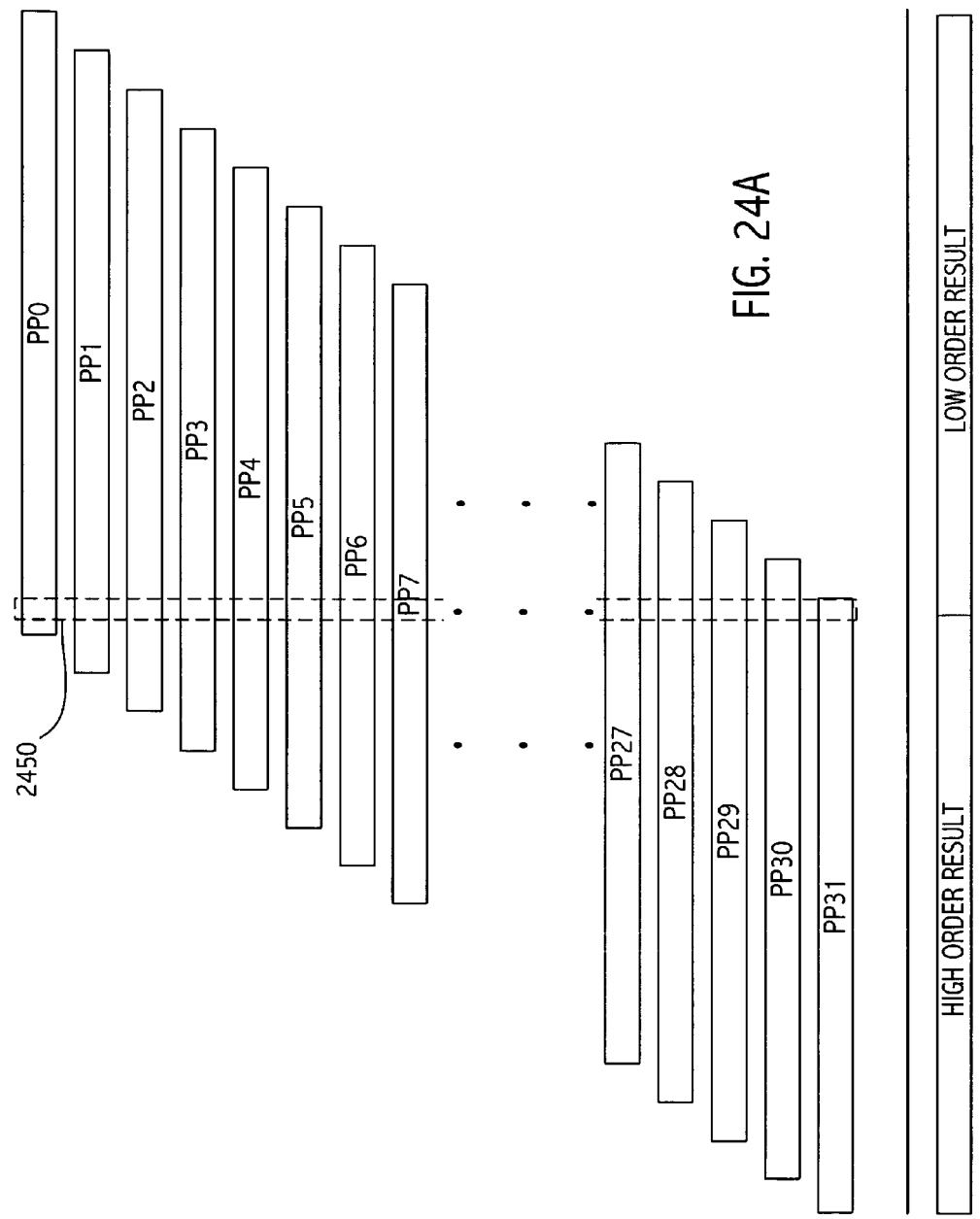

METHOD AND APPARATUS FOR IMPLEMENTING PROCESSOR INSTRUCTIONS FOR ACCELERATING PUBLIC-KEY CRYPTOGRAPHY

CROSS-REFERENCE TO RELATED APPLICATION(S)

This application is a continuation of application Ser. No. 10/626,420 filed Jul. 24, 2003, naming Sheueling Chang Shantz et al. as inventors, which claims benefit under 35 U.S.C. §119(e) of application No. 60/483,818, filed Jun. 30, 2003, naming Sheueling Chang Shantz et al. as inventors, which applications are incorporated herein by reference.

BACKGROUND

1. Field of the Invention

This invention relates to computer systems and more particularly to arithmetic computations performed therein useful in cryptographic applications.

2. Description of the Related Art

Internet standards such as Secure Socket Layer (SSL) and IP security (IPsec) rely on public-key cryptosystems for scalable key management. With the enormous growth of the World-Wide-Web and, in particular, the ever increasing deployment of e-commerce applications based on https (http over SSL), it has become important to efficiently support cryptographic computations in computer systems, particularly server systems.

Public-key cryptosystems such as the Rivest-Shamir-Adleman (RSA) public-key algorithm and the Diffie-Hellman (DH) key exchange scheme require modular exponentiation with operands of at least 512 bits. Modular exponentiation is computed using a series of modular multiplications and squarings. A newly standardized public-key system, the Elliptic Curve Cryptography (ECC), also uses large integer arithmetic, even though it requires much smaller key sizes. The Elliptic Curve public-key cryptographic systems operate in both integer and binary polynomial fields. A typical RSA operation requires a 1024-bit modular exponentiation (or two 512-bit modular exponentiations using the Chinese Remainder Theorem). RSA key sizes are expected to grow to 2048 bits in the near future. A 1024-bit modular exponentiation includes a sequence of large integer modular multiplications; each, in turn, is further broken up into many word-size multiplications. In total, a 1024-bit modular exponentiation requires over 1.6 million 64-bit multiplications. Thus, public-key algorithms are compute-intensive with relatively few data movements. The computations required are generic arithmetic functions such as integer multiplications and additions. Given those characteristics, public-key algorithms can be well supported by general-purpose processors.

In order to better support cryptography applications, it would be desirable to enhance the capability of general-purpose processors to accelerate public-key computations.

SUMMARY

Accordingly, in one embodiment, a method is provided that includes feeding back high order bits of a previously executed arithmetic instruction, generated by a first plurality of arithmetic structures, to a second plurality of arithmetic structures. The second arithmetic structures generate a first partial result of low order bits of a currently executed arithmetic instruction. The first partial result represents the high order bits summed with low order bits of a result of a first number multiplied by a second number. The summing of the high order bits is performed during multiplication of the first number and the second number, and the summing and a portion of the multiplication is performed in the second arithmetic structures.

In another embodiment a method is provided that includes feeding back high order bits of a previously executed arithmetic instruction, from a first plurality of arithmetic structures that generate the high order bits, to a second plurality of arithmetic structures. The method further includes supplying a third number to the second plurality of arithmetic structures; and using the second arithmetic structures, generating a first partial result of a currently executed arithmetic instruction, the first partial result being a representation of the high order bits summed with low order bits of a result of a first number multiplied by a second number, and summed with the third number. The summing of the high order bits and the summing of the third number are performed during multiplication of the first number and the second number. The summing and a portion of the multiplication being performed in the second arithmetic structures.

In another embodiment an apparatus is provided that includes a first plurality of arithmetic structures generating high order bits for an arithmetic operation that includes a multiplication operation. A second plurality of arithmetic structures generates low order bits of the arithmetic operation. The second plurality of arithmetic structures receive the high order bits that were generated by the first plurality of arithmetic structures during a previous arithmetic operation, and generate as a first partial result of the arithmetic operation the high order bits summed with low order bits of a multiplication result of the multiplication operation. The arithmetic structures may includes a plurality of carry save adders.

In another embodiment an apparatus is provided that includes a first plurality of arithmetic structures that generate the high order bits for an arithmetic operation. The arithmetic operation includes a multiplication operation of a first and a second number. A second plurality of arithmetic structures generate low order bits of the arithmetic operation. The second arithmetic structures receive the high order bits that were generated by the first plurality of arithmetic structures during a previous arithmetic operation and also receive a third number. The second arithmetic structures generate a first partial result of the arithmetic operation that represents the high order bits summed with low order bits of a multiplication result of the multiplication operation, and summed with the third number.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIG. 2 illustrates the add-chaining operation used for adding two multi-word integer values with automatic carry propagation.

FIG. 10 shows an example of a multiply-accumulate operation in an embodiment of the invention that utilizes an extended carry.

FIG. 11 shows an example of a multiply-accumulate operation in an embodiment of the invention that utilizes an extended carry in the redundant sum-and-carry representation.

FIG. 12 illustrates the inputs supplied to the carry lookahead adder.

FIG. 24A a high level block diagram illustrating how the carry save adder columns shown in FIGS. 24B-32 generate high and low order portions of a multiplication result according to an embodiment of the invention.

DESCRIPTION OF THE PREFERRED EMBODIMENT(S)

Figure 1:
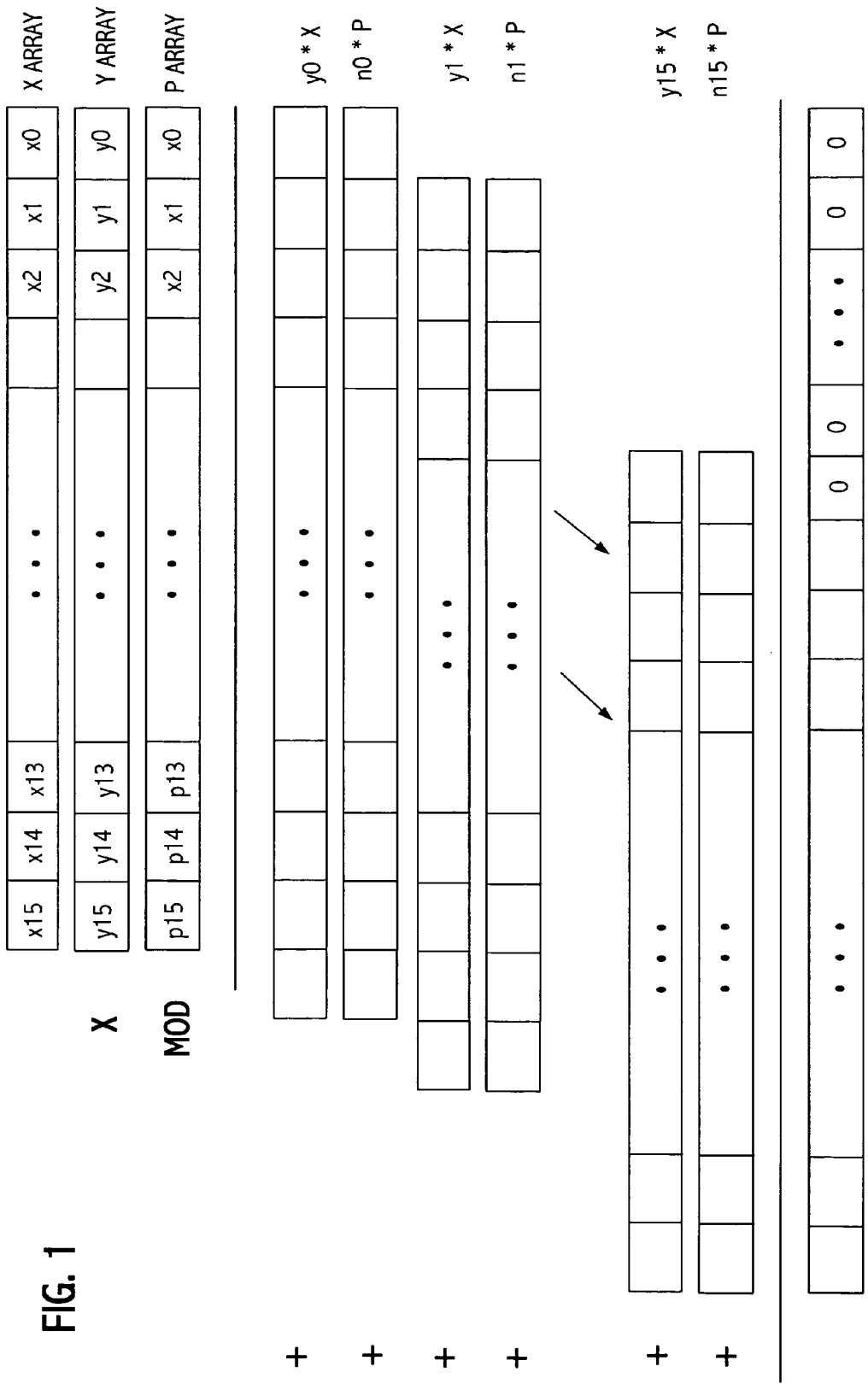
FIG. 1 illustrates an overview of a 1024 bit Montgomery modular multiplication.

Multi-word multiplications and additions may be computed using many word-sized multiply, add, and shift operations. As shown in FIG. 1, a 1024-bit integer X, for example, can be represented with sixteen 64-bit words X=(x15, ..., x1, x0). That form is commonly referred to as multi-precision representation. The more efficiently a multi-word operation can be performed, the better the public-key performance will be. Adding capabilities to a general purpose processor to speed up multi-word operations is a key to accelerating public-key computations, and add-chaining and multiply-chaining are two of the capabilities needed.

A single architecture with a coherent instruction set for cryptographic support can reduce the software deployment cost and shorten the time-to-market. It thereby enables earlier adoption of the cryptographic capabilities found in the new systems. Implementing new instruction capability may be used to provide more efficient support for cryptographic computations. In one or more embodiments of the invention one or more instructions are provided that multiply two n bit numbers together and save the high order bits of the result in an extended carry register for use by the next multiply operation.

Prior to explaining that new instruction capability, additional details on Montgomery multiplication will be provided. As an example, 1024-bit Montgomery modular multiplication will be introduced to better understand the complexity involved in such a computation, which will facilitate an understanding of operation and advantages of the present invention. Montgomery modular multiplication is an operation commonly used to efficiently implement RSA.

Modular multiplication requires multiplication and reduction, the latter reducing the multiplication result back to the size of the input operands. A plain modular multiplication reduces the most significant bits whereas Montgomery modular multiplication reduces the least significant bits, which can be done much more efficiently. FIG. 1 illustrates the computation of a 1024-bit Montgomery modular multiplication split up into 32 rows representing multi-word multiplications and multi-word additions. The Montgomery method interleaves partial product generation and reduction. There are 16 rows y0*X ... y15*X that show the multi-word multiplications resulting in the partial products. Interleaved with these rows are 16 additional rows of multi-word multiplications resulting in the reduction terms n0*P ... n15*P. These terms are multiples of the modulus P that are chosen in a way such that the least significant word of the sum of the accumulated partial products at each intermediate stage yields zero.

The architecture of a particular processor can significantly affect the overall performance with respect to Montgomery modular multiplication. For example, it is advantageous if an architecture can support the new instructions proposed herein with a fully pipelined multiplier. For many processor architectures, the number of multiplications determines the upper performance bound for Montgomery exponentiation. A 1024-bit Montgomery modular multiplication requires $2*(16^2)+16=528$ 64-bit multiplications. Therefore, improving multiplication throughput generally improves the performance of Montgomery modular exponentiation. Multiplication latency can be hidden as long as sufficient registers are available to store intermediate results.

In addition to multiplications, a 1024-bit Montgomery modular multiplication requires $4*(16^2)+3*16-1=1071$ 64-bit additions (including carry propagation) to accumulate partial products. If additions take less time than multiplications and can be executed in parallel to multiplications, their cost can be hidden. However, low addition throughput and costly carry propagation can negatively contribute to the performance of Montgomery modular multiplication and can even determine its upper bound.

A 1024-bit Montgomery modular multiplication requires the generation and accumulation of 512 64-bit partial products yielding a 1024-bit end result. Besides 16 registers for accumulating the end result, a number of registers are needed for storing multiplier and multiplicand operands, constants, pointers and intermediate results. Although generation and accumulation of partial products can be pipelined, computational dependencies and instruction latencies can significantly increase register demand. Diminished performance can be exhibited if load and store operations are required to transfer intermediate results to and from cache memory.

Note that for enhanced performance of Montgomery computation, it is desirable to have registers for at least one 1024-bit operand and for accumulating an intermediate 1024+64-bit result. Smaller register files require frequent load and store operations to supply the operand to be multiplied in a 64×1024-bit multiplication and to spill some data back into the memory. If additional load and store operations are necessary to transfer intermediate results, the memory bandwidth between level-1 cache and register file can become a performance bottleneck. Efficient implementations of Montgomery modular multiplication preferably utilize the parallel execution of multiplications, additions and load/store operations. Pipeline dependencies that prohibit the parallel execution of these operations can significantly impact the performance.

FIG. 2 illustrates the add-chaining operation used for adding two multi-word integer values with automatic carry propagation. That is, the carry out of the previous addition operation is automatically propagated into the next addition-operation. For example, assume there are three addition instructions addcc, addxc, and adxccc. Assume that addcc is an addition operation that produces a carry (reflected in location cc, which may be a condition code register or other location in the processor) but does not consume a carry, addxc is an addition operation that consumes a carry (the carry being based on the value in location cc), but does not produce one, and adxccc is an addition operation that both produces and consumes a carry. Adding two large (e.g., 1024 bit) integers $X=(x15, \ldots, x1, x0)$ and $Y=(y15, \ldots y1, y0)$ can be done very efficiently using 17 instructions whereby the carryout bit of one addition is automatically propagated into the next addition.

```
s0 = addcc x0, y0;
s1 = addxccc x1, y1;
  ...
  ...
  ...
s15= addxccc x15, y15;
s16= addxc 0,0     // catch the last carryout bit.
```

Figure 3:
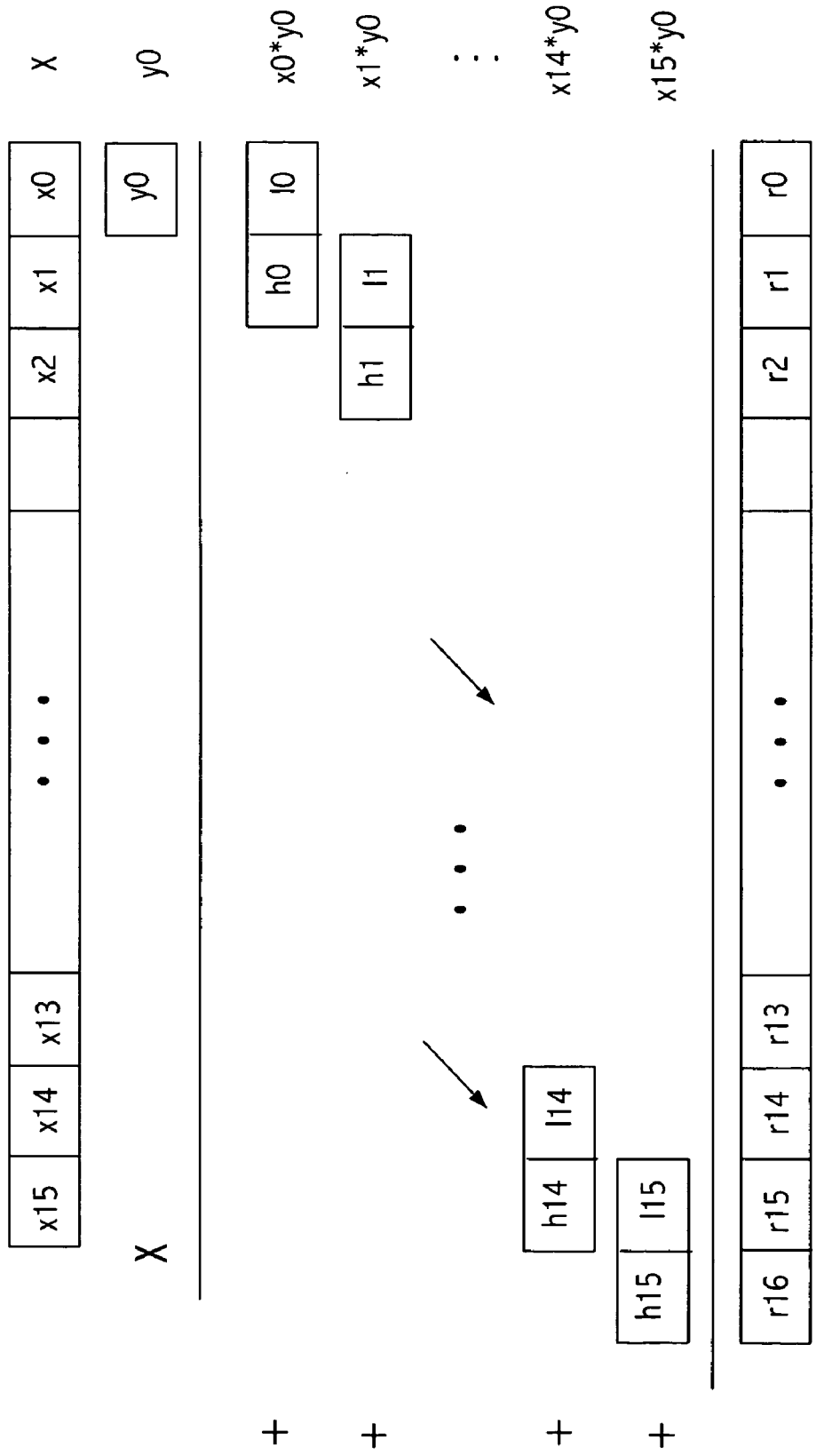
FIG. 3 illustrates a multi-word multiplication.

The multiply-chaining operation is for computing multi-word multiplication with automatic carry propagation. FIG. 3 shows an example of a multi-word multiplication y0*X where y0 is a 64-bit integer and X is a 1024-bit integer $X=(x15, \ldots, x1, x0)$. The multiplication will be explained assuming the instructions umulxhi and mulx are available. The instruction umulxhi (rs1, rs2, rd) is an unsigned operation that multiplies two 64 bit numbers specified as the source operands rs1 and rs2 and places the high 64 bits of the 128 bit result in the destination register rd. The instruction mulx (rs1, rs2, rd) multiplies two 64 bit numbers specified in the source operands rs1 and rs2 and places the low 64 bits of the 128 bit result in the destination register rd. Assuming such instructions, the computation y0*X, illustrated in FIG. 3, can be carried out in the following instruction steps, where h0 represents the high 64 bit result of multiplying x0 and y0 and l0 represents the lower 64 bit result of multiplying x0 and y0:

```
h0 = umulxhi x0, y0;      l0 = mulx x0, y0;
h1 = umulxhi x1, y0;      l1 = mulx x1, y0;
  ...
  ...
  ...
h15 = umulxhi x15, y0;    l15 = mulx x15, y0;
r0 = l0;
r1 = addcc h0, l1;
r2 = addxccc h1, l2; // catch the carryout bit.
  ...
  ...
  ...
r15= addxccc h14, l15;
r16= addxc h15,0;   //
```

Note that the upper 64-bits, for example, h0, of a 128-bit partial product x0*y0 is manually propagated into the next partial product x1*y0 using an addcc instruction. That process is typically slow because the output is delayed by the multiplier latency, which may be, e.g., an 8-cycle latency in the case of an exemplary processor. The present invention provides a more efficient technique for efficiently handling the propagation of the upper 64-bits of a 128-bit product into a next operation.

Referring again to FIG. 1, three modes of operation may be used to accelerate Montgomery modular multiplication—the modes are called "add-chaining", "multiply-chaining", and "multiply-accumulate-chaining".

In one embodiment of the invention an unsigned multiplication using an extended carry register (the instruction umulxc) performs a multiply-and-accumulate computation and returns the lower 64-bits of (rs1*rs2+previous extended carry) and saves the upper 64 bits of the result in an extended carry register to be used by the next multiply operation. The lower 64 bits of the multiply-and-accumulate result are referred to herein as the product and the upper 64 bits are referred to herein as the extended carry. While traditionally an add carryout is only 1 bit and is contained in location cc, the instruction umulxc defines a 64-bit extended carry register (exc) that contains the extended carry bits. The extended carry register enables the automatic propagation of the carryout bits in a multiply-chaining operation such that a multi-word multiplication can be executed in consecutive instructions.

Figure 4A:
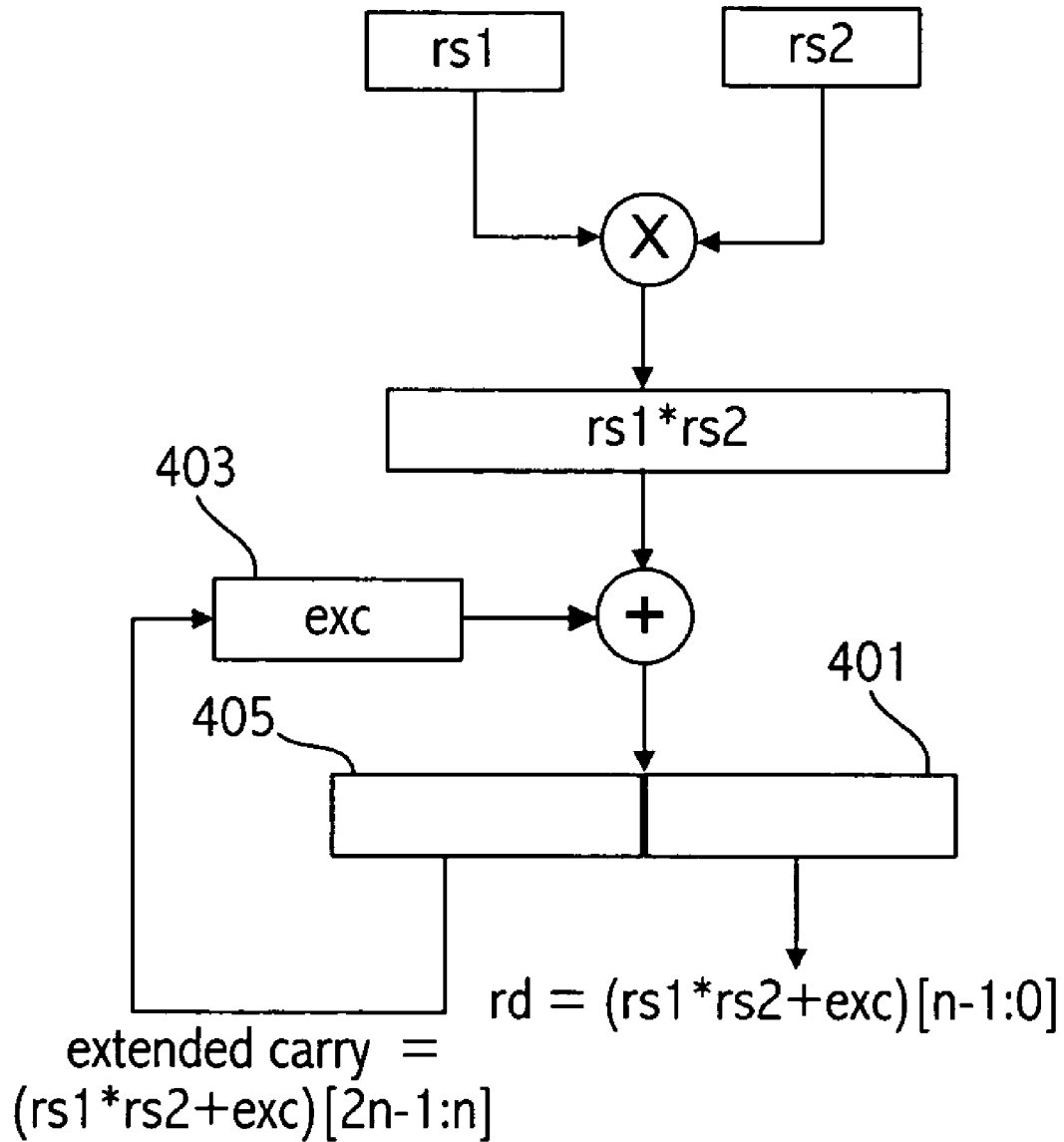
FIG. 4A illustrates operation of the umulxc instruction.

The umulxc instruction is illustrated in FIG. 4A and summarized in Table 1 below. The result register rd receives the lower n bits [n-1:0] 401 of (rs1*rs2+previous extended carry saved in the extended carry register (exc) 403) and saves the upper n bits [2n-1:n] 405 of (rs1*rs2+previous exc) in the extended carry register (exc) 403 for use in subsequent computations. The exc value, although saved from the most significant n bits of the result of one operation, is added into the least significant n bits of the next operation. Note that in the implementation illustrated in FIG. 4A the exc register is a register that is logically local to the multiplier, and may be implemented as a special register so that, even though not a general purpose register such as those specified by rs1, rs2 and rd, the exc register can be accessed in association with, e.g., saving and restoring the exc register in association with context switches. The exc register is used to propagate an n bit extended carry per multiplication. The source operands rs1, rs2, the destination register rd, and the extended carry register are assumed to be n bits. In an exemplary embodiment, such as the embodiment described in Table 1, n=64.

TABLE 1

| Instruction | Description |
|---|---|
| umulxc rs1, rs2, rd | Computes rd = lower 64 bits of (rs1*rs2 + previous carry saved in exc) and the upper 64 bits of (rs1*rs2 + previous exc) are saved in exc for use in subsequent computations. |

Referring again to FIG. 3, the multiplication of a 64-bit integer, y0, and a 1024-bit large integer X=(x15, . . . , x1, x0) can be done using the umulxc instruction in the following 18 steps:

```
umulxc 0,0; // clear extended-carry register exc first
r0 = umulxc y0, x0;
r1 = umulxc y0, x1;
. . .
. . .
. . .
``` r15 = umulxc y0, x15;
r16 = umulxc 0, 0;   // save the last carryout bits.

Figure 5:
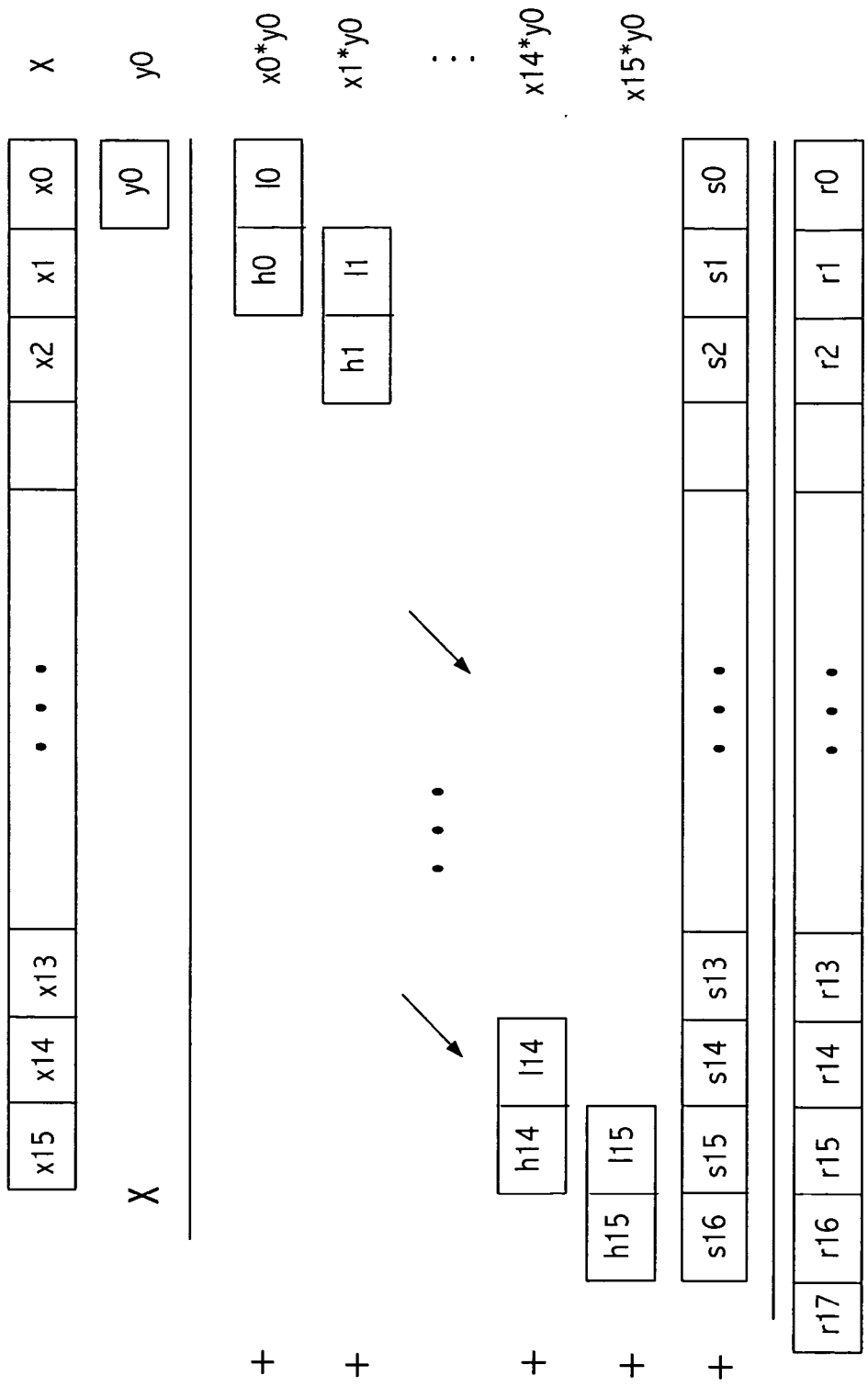
FIG. 5 illustrates the calculation of a 64×1024 bit partial product and the accumulation with a previous partial product.

Referring to FIG. 5, in one implementation, a multiplication algorithm may use a sequence of umulxc instructions to compute a row (e.g. y0*X) and a sequence of add instructions, e.g., addcc, adxccc, to accumulate two rows. Note that the first instruction umulxc 0,0; clears the extended-carry register. Alternatively, an instruction can be defined that produces, but does not consume an extended carry, and can be utilized to compute r0, to eliminate the need for an explicit instruction clearing the extended carry register.

Figure 4B:
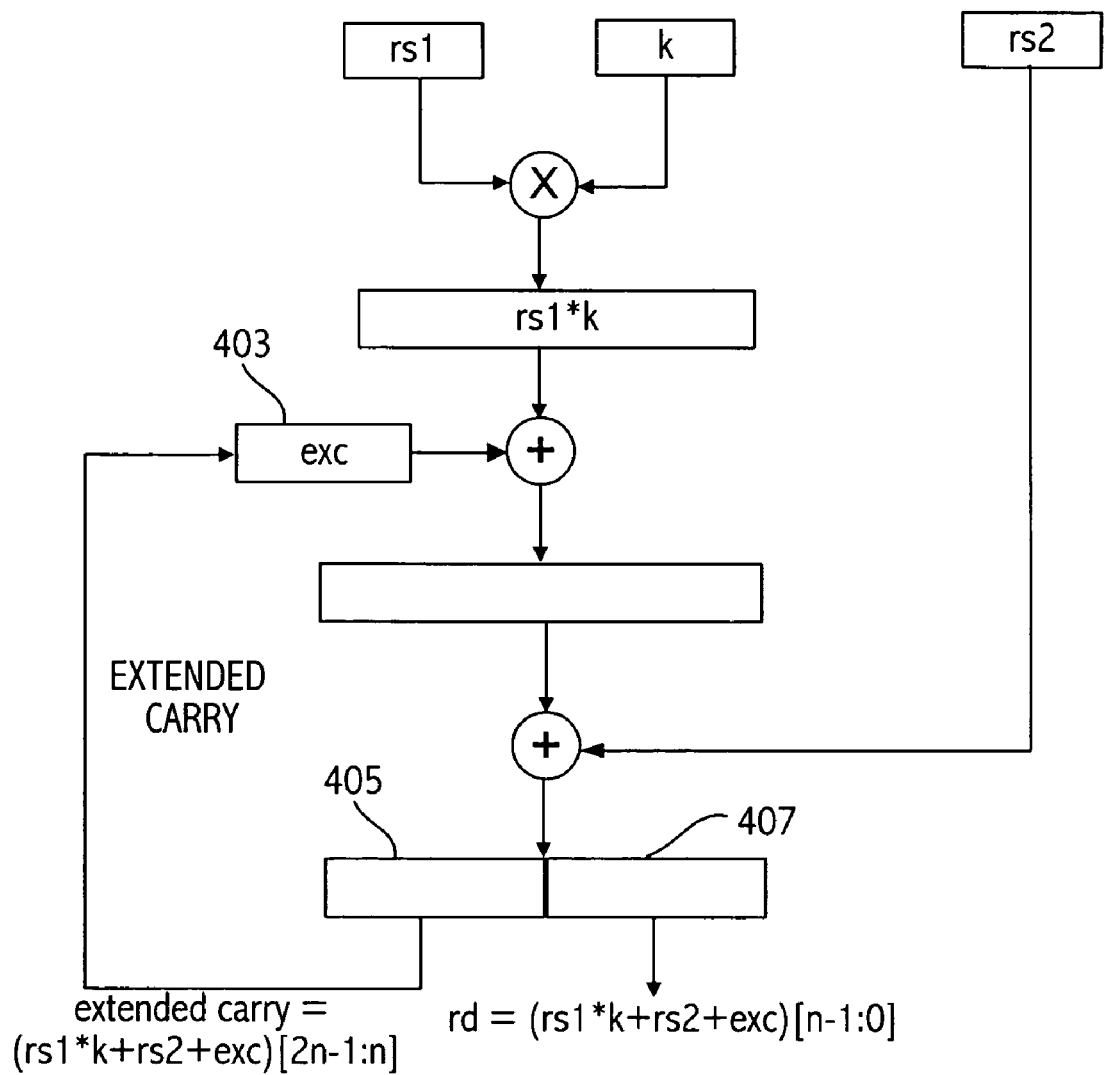
FIG. 4B illustrates operation of the umulxck instruction.

According to another embodiment of the invention an instruction, umulxck, effectively combines both multiply and accumulate operations. In addition to computing a row y0*X, the umulxck instruction also allows for accumulating an additional row S=(s15, . . . , s0) implicitly without requiring additional add (e.g., adxccc) operations. The umulxck instruction is illustrated in FIG. 4B and summarized in Table 2 below. The result register rd receives the lower n bits 407 of (rs1*k+previous extended carry saved in the extended carry register (exc) 403+rs2). The extended carry register 403 receives the upper n bits 405 for use in subsequent computations. As with the umulxc instruction, the exc value, although saved from the most significant n bits of the result of one operation, is added into the least significant n bits of the next operation. The register rs2 is used to provide the words of the accumulated partial products. Note that in the implementation illustrated in FIG. 4B the extended carry register is logically local to the multiplier and is used to propagate an n-bit extended carry per multiplication. The exc register illustrated in FIG. 4B may be implemented as a special register so that, even though not a general purpose register such as those specified by rs1, rs2 and rd, the exc register can be accessed in association with, e.g., saving and restoring the exc register in association with context switches. The source operands rs1, rs2, the destination register rd, the extended carry register and the k register are assumed to be n bits. In the embodiment described in Table 2, n=64.

TABLE 2

| Instruction | Description |
|---|---|
| umulxck rs1, rs2, rd | Computes rd = lower 64 bits of (rs1*k + rs2 + previous carry saved in exc) and saves the upper 64 bits of ( rs1*k + rs2 + previous exc) in exc for use in subsequent computations. |

In the embodiment illustrated in FIG. 4B, the umulxck instruction uses a logically local register k rather than a general-purpose register for two reasons. First, some instruction formats, e.g. the SPARC™ instruction format allows for specifying only two source operands. Secondly, referring again to the multiply-chaining shown in FIG. 1, one operand (y0) remains constant throughout the computation of an entire partial product and, therefore, can be kept in a local register that is initialized only once for every partial product. The k register illustrated in FIG. 4B may be implemented as a special register so that, even though not a general purpose register such as those specified by rs1, rs2 and rd, the k register can be accessed in association with, e.g., saving and restoring the register in association with context switches.

Figure 4C:
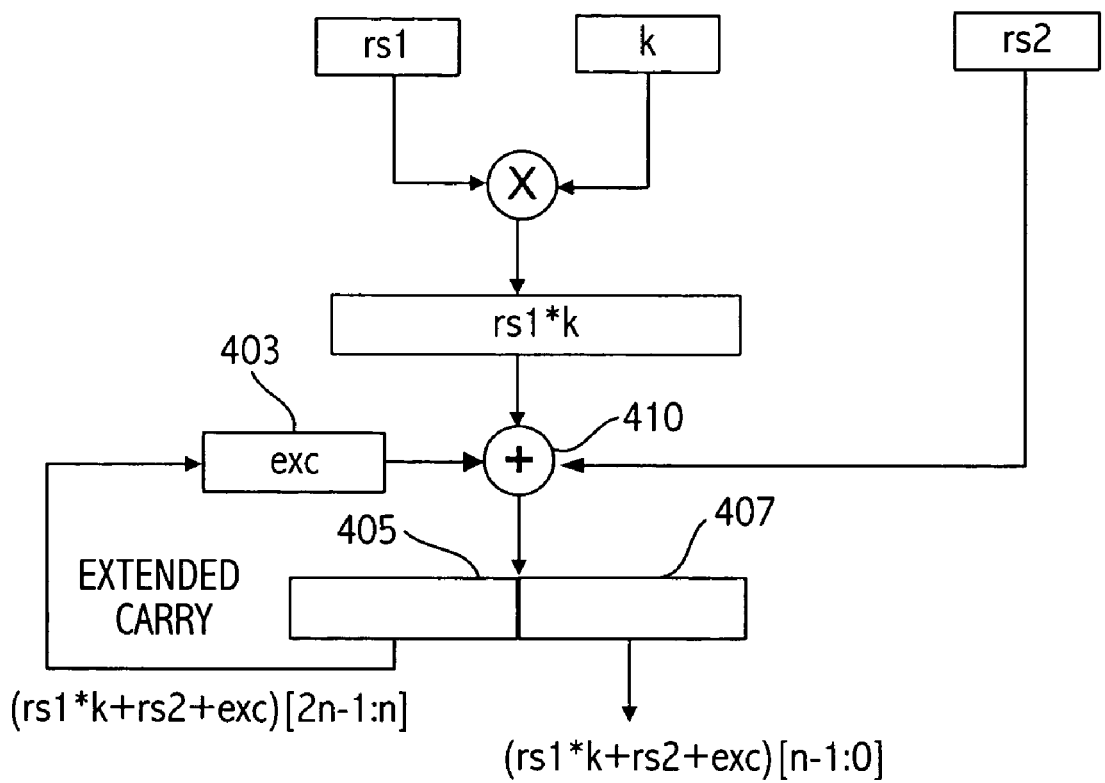
FIG. 4C illustrates another embodiment of operation of the umulxck instruction.

FIG. 4C shows an alternative embodiment of an implementation of the umulxck instruction having a single summing node 410.

In other embodiments, the register k may be explicitly specified as one of three source operands umulxck (rs1, rs2, rs3, rd) to perform rs1*rs2+rs3+exc and store the low order portion of the result in the result register rd. In still other embodiments, one of the source registers may be identical with the destination register. For example, the instruction umulxck rs1, rs2, rs3 executes rs1*rs2+rs3+exc and stores the result in rs3. In still another embodiment, the register k may implicitly be a specific general purpose register, e.g. the register r0. For example, the instruction umulxck rs1, rs2, rd performs rs1*r0+rs2+exc and stores the result in the result register rd. If rs1 is specified to be the register r0, a square operation will be performed.

The umulxck instruction is an efficient way to support public-key computations. Back-to-back scheduling of multi-word multiplications and accumulations is often difficult using today's instruction sets due to the multiplier latency. The umulxck instruction performs the multiply-accumulate-chaining operation which combines add-chaining and multiply-chaining in one operation and avoids the multiplier latency. Using the umulxck instruction, and referring again to FIG. 5, the calculation of a 64×1024 bit partial product (y0*X) and the accumulation with a previous partial product (s16:s0), can be accomplished in the following 20 instructions:

```
set register k=y0;
umulxck 0,0; //       clear extended-carry register exc first
r0 = umulxck x0, s0;
...
...
...
r15 = umulxck x15, s15;
r16 = umulxck 0, s16;   // catch 64 carryout bits
r17 = umulxck 0, 0;     // catch last carryout bit
```

Note that the final umulxck instruction illustrated above clears the extended carry register so that in a chained partial product calculation, the first umulxc instruction illustrated above is unnecessary after the first partial product calculation.

After the local k register is set to y0, the extended carry register is explicitly cleared (umulxck 0,0). Alternatively, the second umulxck instruction (umulsck x0, s0) could be replaced by a multiply instruction that produces but does not consume an extended carry.

Thus, several embodiments of instructions and implementations have been described that accelerate multiply-chaining. An architecture only needs to support one or the other instruction. In addition to increased performance, multiply-accumulate-chaining has the advantage that it only keeps the multiplier busy whereas other functional units of a processor are unused. That is, in a multi-threaded implementation the latter units could be used by other threads.

It is worth noting that neither the umulxck nor the umulxc instruction produce an overflow. This is because a 64×64 product is not greater than $(2^{64}-1)(2^{64}-1)$ in magnitude and adding two 64-bit integers to the 128-bit product will not cause an overflow.

$$(2^{64}-1)(2^{64}-1)+(2^{64}-1)+(2^{64}-1)<2^{128}$$

Elliptic curve public-key cryptographic systems are defined over two types of arithmetic fields, integer fields and binary polynomial fields. The arithmetic operations in both types of fields are similar. An addition in a binary polynomial field is a bit-wise exclusive-or operation. A multiplication, referred to herein as "XOR multiply", is similar to an integer multiply except that partial products are summed with bit-wise exclusive-or operations. An execution unit that supports both integer and XOR multiplications is described in application Ser. No. 10/354,354, filed Jan. 30, 2003, entitled MULTIPLY EXECUTION UNIT FOR PERFORMING INTEGER AND XOR MULTIPLICATION, naming Rarick et al. as inventors, which application is incorporated herein by reference in its entirety.

Providing instruction set and hardware support today for XOR multiply operations further enhances performance for elliptic curve cryptographic applications. The integer multiplier unit can be readily modified to perform an XOR multiply. That function can be implemented in the block diagrams illustrated in FIGS. 4A, 4B and 4C where the arithmetic operations are XOR multiplies and XOR additions.

Tables 3 and 4 summarize two instructions bmulxc and bmulxck that are utilized to perform XOR multiplications for use in binary polynomial field operations, and correspond to umulxc and umulxck, respectively. The instruction bmulxc (rs1, rs2, rd) stores in destination register rd, the lower n bits of (rs1^*rs2^previous exc), where rs1^*rs2 refers to the XOR multiply and the symbol ^ refers to addition in a binary polynomial field (a bit-wise XOR operation). The instruction saves the upper n-1 bits of (rs1^*rs2^previous exc) in the extended carry register exc. The source operands rs1, rs2, the destination register rd, and the extended carry register are assumed to be n bits. In the embodiment illustrated in Table 3, n=64 bits.

TABLE 3

| Instruction | Description |
| --- | --- |
| bmulxc rs1, rs2, rd | computes rd = lower 64 bits of (rs1^*rs2^ previous exc) and saves the upper 63 bits of (rs1^*rs2 ^previous exc) in register exc. Here the multiply, rs1^*rs2, refers to the XOR multiply. |

The instruction bmulxck stores in destination register rd, the lower n bits of (rs1^*k^rs2^A previous exc), where rs1^*k refers to the XOR multiply and the symbol ^ refers to addition in a binary polynomial field (a bit-wise XOR operation). The instruction saves the upper n-1 bits of (rs1^*k^rs2^previous exc) in the extended carry register exc. The source operands rs1, rs2, the destination register rd, the extended carry register, and the k register are assumed to be n bits. In the embodiments illustrated in Tables 4, n=64.

TABLE 4

| Instruction | Description |
| --- | --- |
| bmulxck rs1, rs2, rd | computes rd = lower 64 bits of (rs1^*k ^rs2 ^previous exc) and saves the upper 63 bits of the result in exc for use in subsequent computations. Here the multiply, rs1^*k, refers to the XOR multiply. |

Figure 6:
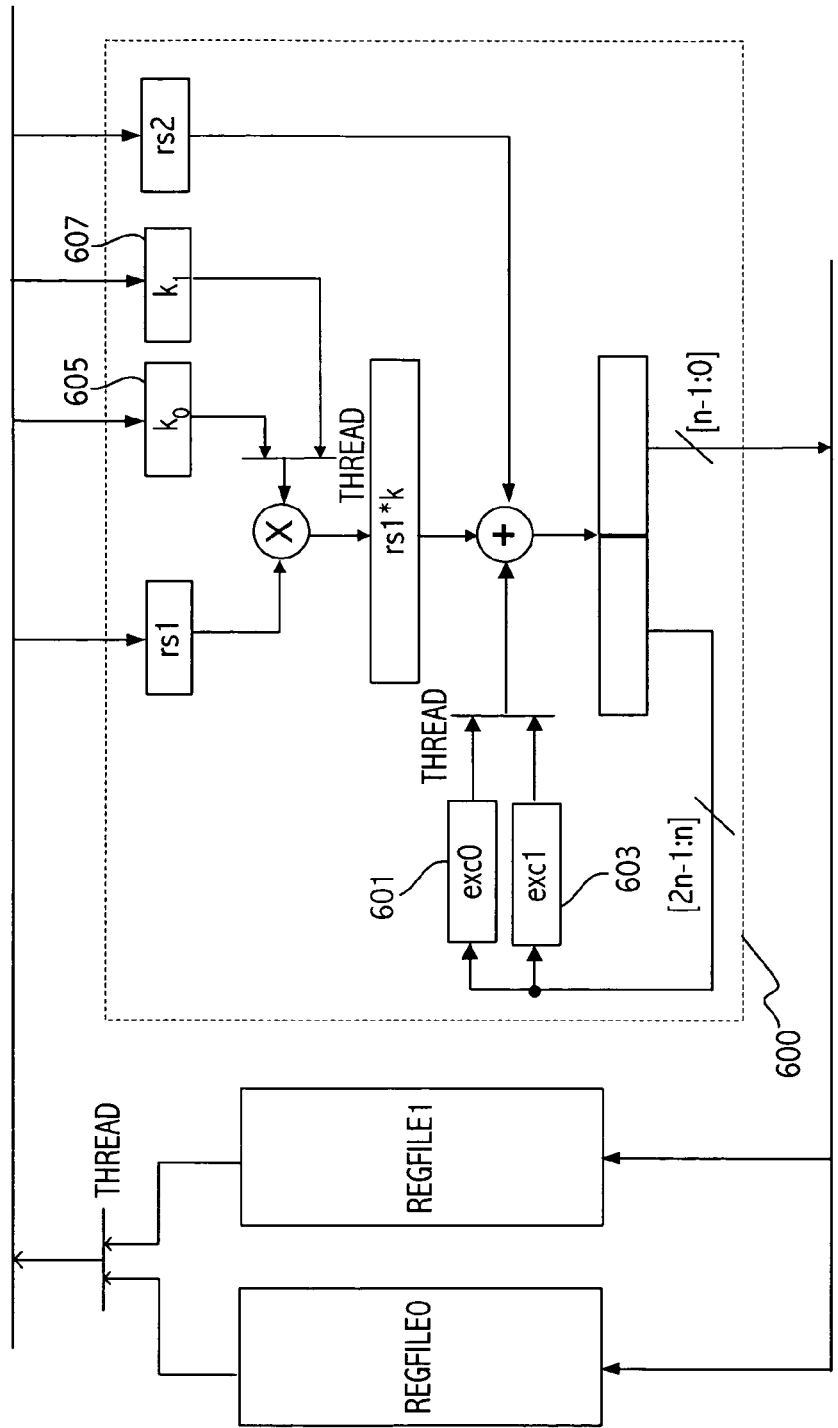
FIG. 6 illustrates an exemplary embodiment of the umulxck instruction that supports two threads.

In current processor implementations, it is common for multiple threads to be running concurrently on a single processor. That leads to the possibility that multiple threads can use the multipliers described in FIGS. 4A, 4B, and 4C. However, because in an embodiment local multiplier registers, rather than general purpose registers, are used for the extended carry register and register k (see FIGS. 4B and 4C), there should be a way to ensure that when switching between threads, the information in the local multiplier registers is not lost. Referring to FIG. 6, an exemplary embodiment shows a data path that supports two threads. Local registers are provided for each thread in functional unit 600. Thus, an extended carry register 601 is provided for thread 0 and an extended carry register 603 is provided for thread 1. Similarly, a local k register 605 is provided for thread 0 and a local k register 607 is provided for thread 1.

Figure 7:
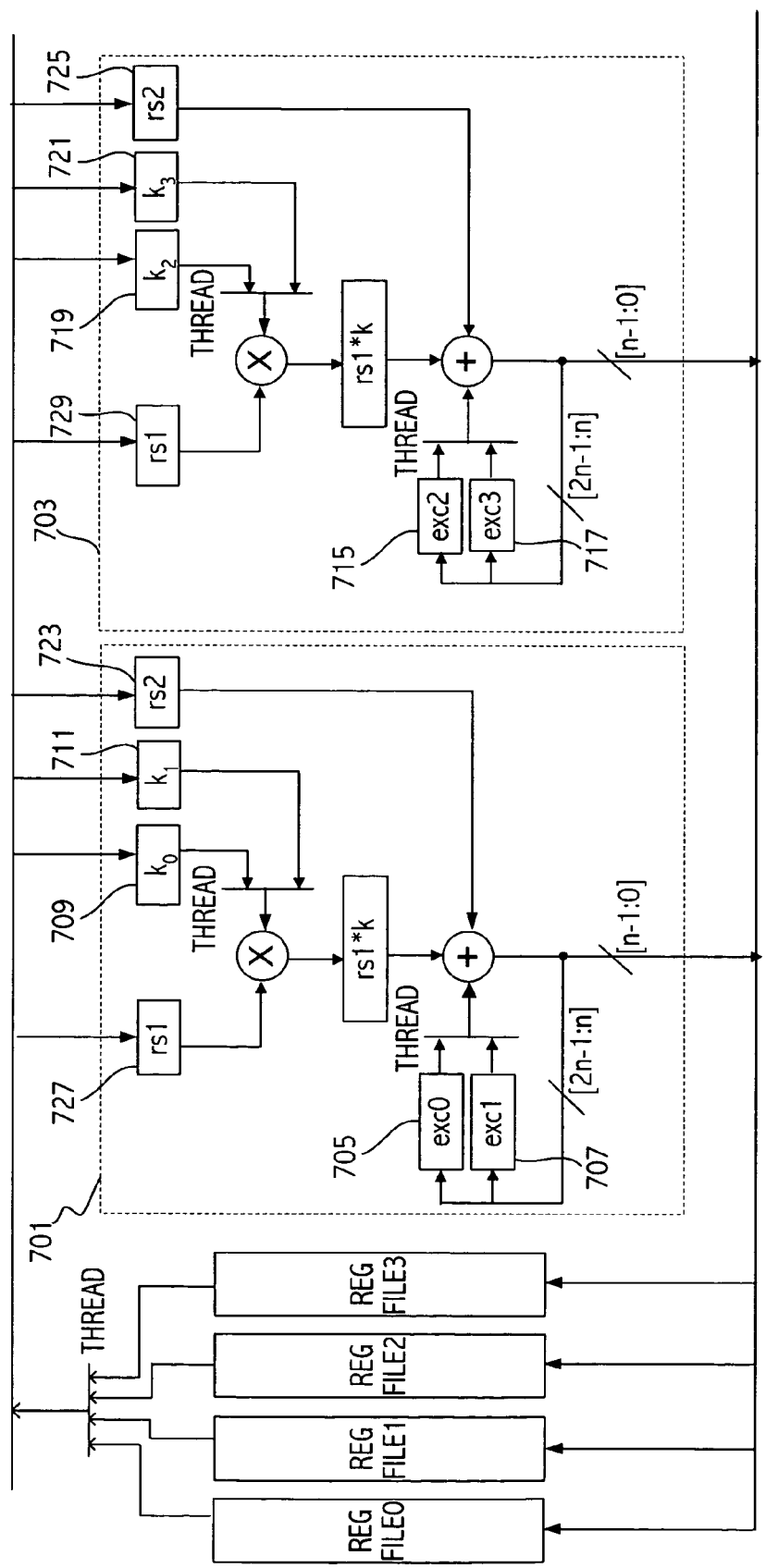
FIG. 7 illustrates a multi-threaded data path with two functional units that in combination support the umulxck instruction for four threads.

FIG. 7 shows a multi-threaded data path with two functional units 701 and 703 that in combination support four threads. In the embodiment illustrated in FIG. 7, threads are preassigned to functional units so that the extended carry value is always locally available. Threads 0 and 1 are assigned to functional unit 701. Thus, functional unit 701 includes extended carry registers 705 and 707 and k registers 709 and 711. Functional unit 703 includes extended carry registers 715 and 717 and k registers 719 and 721. The particular extended carry register and the k register utilized are selected according to the thread being processed by the functional unit. The registers 723, 725, 727, and 729 are not logically local registers in that upon execution they are loaded with the contents of the general purpose registers specified as source operands rs1 and rs2.

Figure 8:
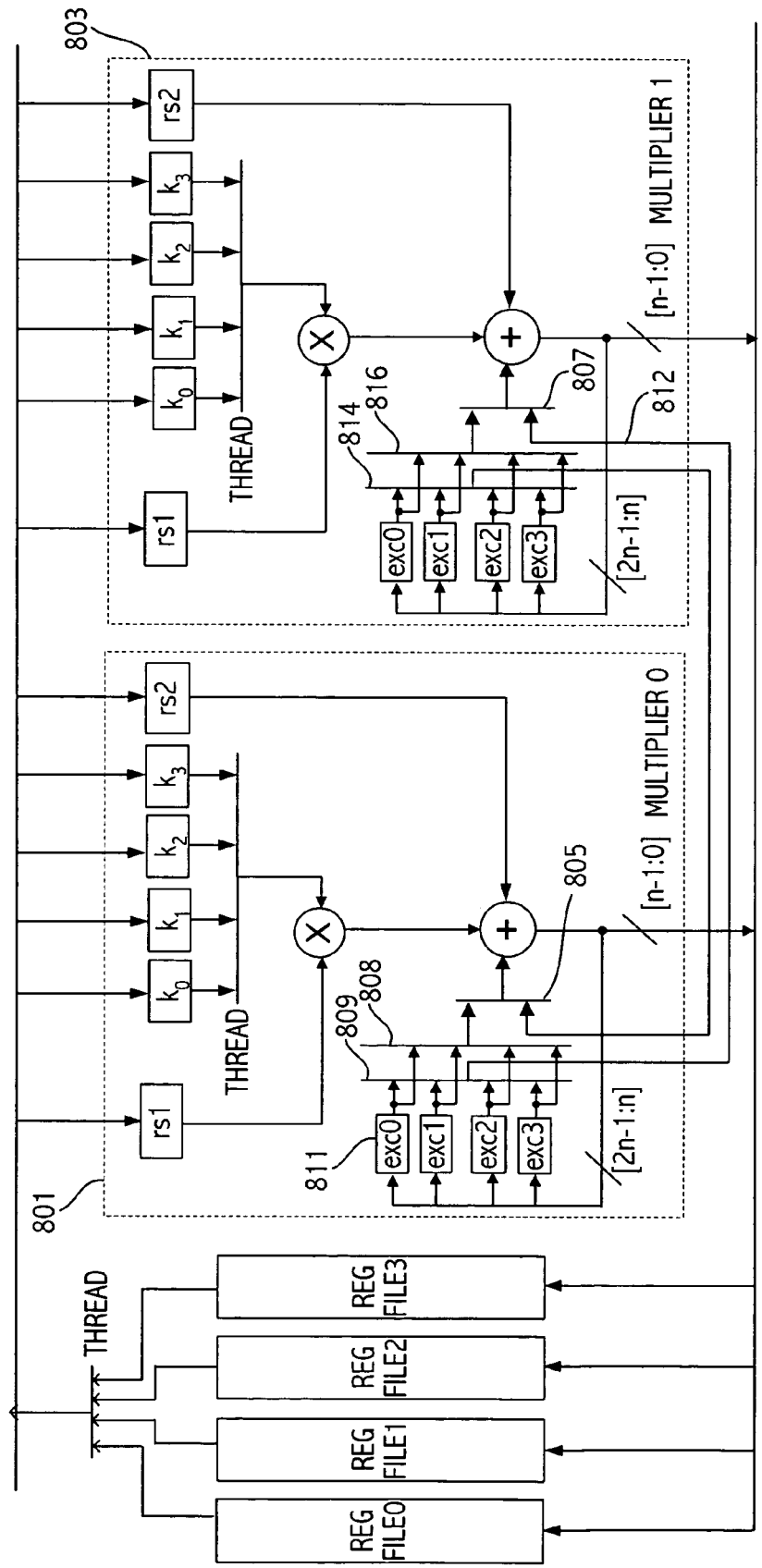
FIG. 8 shows an embodiment in which the extended carry values can be exchanged between two functional units.

FIG. 8 shows an embodiment in which the extended carry values can be exchanged between two functional units 801 (multiplier 0) and 803 (multiplier 1). With the embodiment illustrated in FIG. 8, threads are not preassigned to functional units and can be executed on either functional unit. For example, if a thread is reassigned from one to the other functional unit, multiplixer logic 805 and 807 can select the extended carry value of the previous multiplication available for accumulation with the newly computed product from the extended carry registers in either multiplier 0 or multiplier 1. Thus, e.g., if a thread 0 had been executing on functional unit 801 (multiplier 0), and is reassigned to functional unit 803 (multiplier 1) for the subsequent multiplication, the multiplexer logic 809 on functional unit 801 selects the extended carry register 811 associated with thread 0 and multiplexer logic 807 in functional unit 803 is controlled to select the other multiplier extended carry value supplied on node 812. Multiplexer 808 selects the extended carry register supplied to multiplexer 805. In functional unit 803, multiplexer 814 selects the extended carry register to be supplied to functional unit 801 and multiplexer 816 selects the extended carry register to be supplied to multiplexer 807. Note that copies of the k registers for each of the four threads are provided in each functional unit in the illustrated embodiment.

In another embodiment (not shown in FIG. 8) the functional units can selectively store the high order bits of the addition from either functional unit into a selected one of the extended carry register(s) by using multiplexer logic on the input side of the extended carry register(s) to select which functional unit should be the source of the extended carry register.

Figure 9:
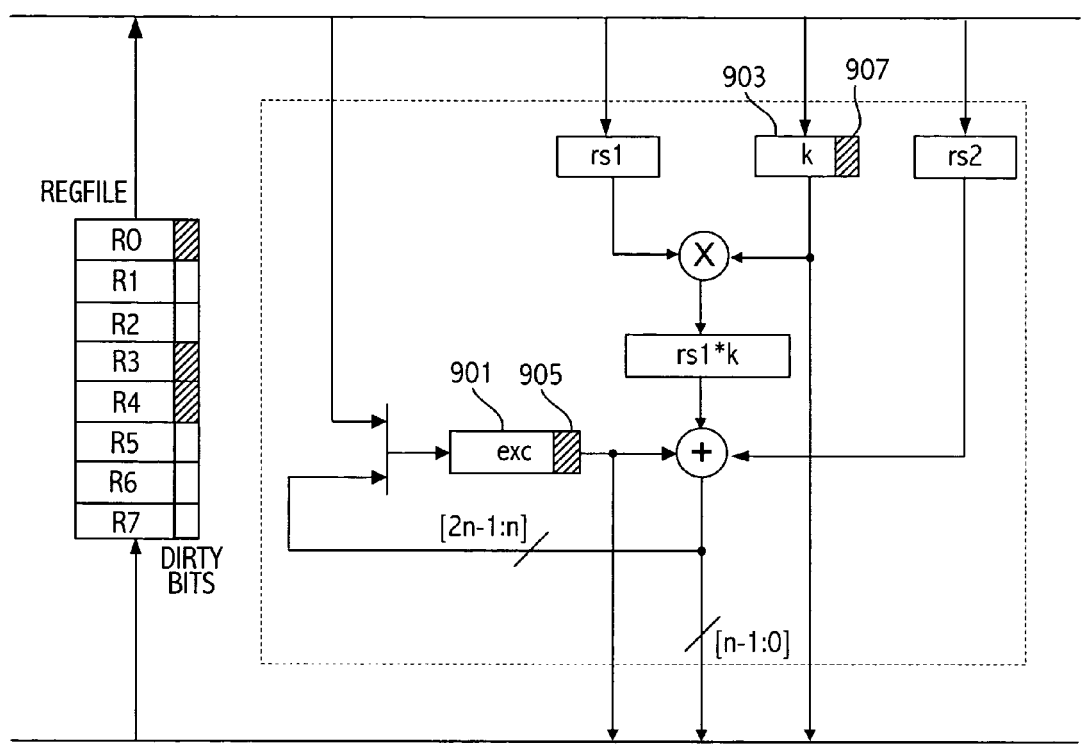
FIG. 9 shows an embodiment in which the extended carry register and the k register are readable and writeable.

FIG. 9 shows an embodiment in which the extended carry register 901 and the k register 903 are readable and writeable. That capability is needed, in particular, for implementing context switches. To reduce overhead for context switches in the illustrated embodiment, dirty bits 905 and 907 are associated with these registers. A dirty bit is set the first time the corresponding register is written after a context switch. The dirty bit is reset at context switch. A register is saved on context switch only if the dirty bit is set. In another embodiment, the extended carry register 901 and the k register 903 share a dirty bit since a write to k is likely to be followed by a write to the extended carry register.

The instructions capability described herein is intended to accelerate multi-word multiplications through multiply-chaining. Referring to FIG. 1, in an embodiment of the invention using umulxck, it takes a total of 35 instructions to compute and accumulate two rows, i.e. a partial product and a reduction term, of a Montgomery modular multiplication:

Multi-word multiplication and accumulation $S = S + xi * Y - 17$ instructions

Multi-word multiplication and accumulation $S = S + ni * P - 18$ instructions

35 *umulxck* instructions

Appendix A illustrates sample pseudo code for a 256×256 multiplication using the umulxck instruction. Appendix A helps illustrate the simplicity offered by use of this new instruction capability. The pseudo code shows a 256×256-bit multiplication of two arrays A=(a3, ..., a0) and B=(b3, ..., b0). Note that the cycle count depends on the instruction latencies of the actual implementation. The value for k can be first loaded into a general-purpose register and then be moved into the k register (see Appendix A).

While FIGS. 4A, 4B, 4C, 6, 7, and 8 provide various embodiments of the multiplier and addition logic utilizing the exc register and k register (where applicable), other embodiments to efficiently implement the multiply and add operations may incorporate the additions required to add the high order bits of the result from the previous umulxc (or umulxck) instruction into the addition operations performed in association with summing of the partial products that are part of multiplication of the two operands in the current umulxc (or umulxck) instruction. In fact, the umulxc and umulxck instructions can usually be implemented so that they are approximately as fast as an ordinary multiply instruction. This is because an ordinary multiply instruction needs to add many partial products, which is commonly implemented with a tree of carry save adders. Including the extended carry register for umulxc, or both the extended carry register and rs2 for umulxck, as additional terms in the tree does not significantly affect the time to generate the product. Note that in such an implementation the addition(s) specified in FIGS. 4A, 4B, 4C (as well as FIGS. 6, 7, 8, and 9) are not performed after the multiplication but are an integral part of the multiplication.

There are many techniques used to efficiently and rapidly perform multiplication operations. Fast integer multipliers may be constructed that utilize carry save adders, full adders, 4 to 2 compressors, and 5 to 3 compressors. In one embodiment of the invention, a multiply execution unit performs both integer and XOR multiplication so that arithmetic operations for binary polynomial fields can be supported as well as integer arithmetic. An execution unit that supports both integer and XOR multiplications is described in application Ser. No. 10/354,354. filed Jan. 30, 2003, entitled MULTIPLY EXECUTION UNIT FOR PERFORMING INTEGER AND XOR MULTIPLICATION, naming Rarick et al. as inventors, which application was previously incorporated herein by reference in its entirety.

Figures 10, 11, 12:
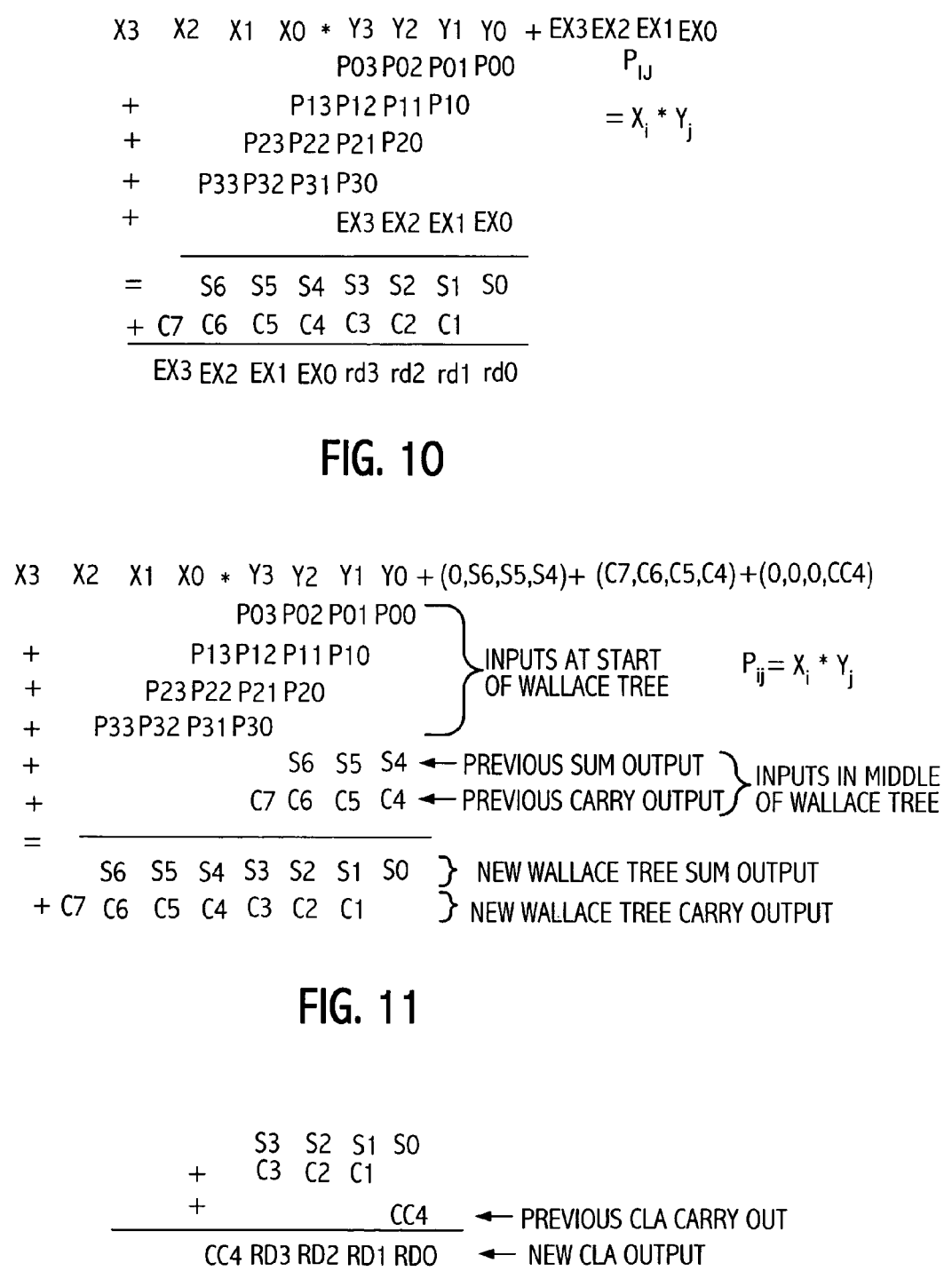

Referring back to FIG. 4A, illustrated is the computation of the result (exc, rd)=rs1*rs2+exc, where the upper n bits of the multiply-accumulate operation are stored in the extended carry register exc and the lower n bits are stored in the result register rd. That operation suggests that all partial products of the multiplication and the extended carry register are added before they are stored in the extended carry register exc and the result register rd. However, hardware implementations of multipliers often choose to generate an intermediate result in a redundant number representation that requires one more addition to generate the final result. FIG. 10 illustrates that operation giving an example of a 4×4 bit multiply-accumulate operation, where the multiplication result (exc, rd)=(X3, X2, X1, X0)*(Y3, Y2, Y1, Y0)+(EX3, EX2, EX1, EX0), where (EX3, EX2, EX1, EX0) are the high order results of a previous multiply-accumulate operation. As can be seen in FIG. 10, the multiplication result (S6, S5, S4, S3, S2, S1, S0, C7, C6, C5, C4, C3, C2, C1) is provided in a form that requires an addition to obtain the final result. Note that the high order bits of the result (EX3, EX2, EX1, EX0) are those bits that are utilized in a subsequent multiply-accumulate operation.

In one embodiment, the partial products P00 . . . P33 and the extended carry bits (EX3, EX2, EX1, EX0) are added using a Wallace tree. A Wallace tree is a structure of full adders that generates a result having two sets of numbers, designated in FIG. 10 as sum outputs S6 to S0 and carry outputs C7 to C1. The final result shown in FIG. 10 (EX3, EX2, EX1, EX0, RD3, RD2, RD1, RD0) can be computed from the sum and carry outputs of the Wallace tree in an adder circuit. A common implementation of that adder circuit utilizes a carry look-ahead adder in order to propagate the carries involved in the addition efficiently.

Instead of storing the final high order bits of the result (EX3, EX2, EX1, EX0) which incurs the delay associated with the addition, only the low order bits required for the destination register (RD3, RD2, RD1, RD0) in the example shown in FIG. 10, need to be sent to the carry look-ahead adder, while the high order bits of the result can be kept in the sum-and-carry representation. By keeping the high order portion in the redundant representation, the appropriate sum and carry bits representing the high order portion of the result can be fed back more quickly into the Wallace tree.

FIG. 11 shows an example of a multiply-accumulate operation in an embodiment of the invention that utilizes an extended carry in the redundant sum-and-carry representation. The partial products P00 to P33 are inputs at the start of the Wallace tree. The previous high order sum output bits of the Wallace tree (S6, S5, S4) and the previous carry output bits (C7, C6, C5, C4) are input back into the Wallace tree. The new sum outputs of the Wallace tree (S6, S5, S4, S3, S2, S1, S0) and the new carry outputs (C7, C6, C5, C4, C3, C2, C1) are generated using the previous carry and sum output bits, thus efficiently feeding back the extended carry bits into the Wallace tree. Thus, the extended carry bits are summed with the partial products of the multiplication to achieve much greater efficiency than if done in a separate addition operation after the multiplication result is calculated in the carry look-ahead adder (CLA). Note that a carry bit CC4 that is necessary to add into the high order carry and sum outputs to fully represent the high order result of the multiplication is not fed back into the Wallace tree but is fed back into the carry look-ahead adder instead.

Referring to FIG. 12 the inputs to the carry look-ahead adder are shown. The carry look-ahead adder changes the redundant representation into the final result. The inputs to the carry look-ahead adder are shown to be the low order sum bits from the Wallace tree (S3, S2, S1, S0) and the low order carry bits from the Wallace tree (C3, C2, C1). Note that a carry out from the previous carry-look ahead addition would normally be propagated by adding the carry out with the lowest order bits S4 and C4 Wallace tree outputs. However, rather than feeding that carry out into the Wallace tree, which would require waiting for completion of the carry look-ahead addition operation, that carry out bit (CC4 in FIG. 12) is simply added into the carry look-ahead adder along with the outputs of the Wallace tree.

Note that the number and position of the sum bits and the carry bits can vary widely. That is so, in part, because a Wallace tree can take many different forms. Also, whether or not Booth encoding is used can also have an effect. For a k by k multiplication, the maximum bit configuration as output form the carry save adder is:

sum output: S[2k−1], S[2k−2], . . . , S[3], S[2], S[1], S[0]
carry output: C[2k], C[2k−1], C[2k−2], . . . , C[3], C[2], C[1], C[0]

Note that the C[2k] bit could be called S[2k] instead. One or more of the carry bits and one or more of the sum bits could be known to always be zero, any such bits being determined by such factors as the details of the Wallace tree and whether Booth encoding is used. For example, if Booth encoding is not used, C[2k] is known to be always zero. If Booth encoding is not used and no half adders are used, then one can also have S[2k−1] and C[2k−1] be zero. If Booth encoding is not used, then one can have one of S[2k−1] and C[2k−1] be known zero. The bit that is known zero is a matter of naming convention. Often, one can have several, e.g., up to half a dozen or so, of the least significant bits (e.g., C[0], C[1], C[2], . . . ) be known to be zero. These could be either sum or carry bits (or a mixture), depending on the naming convention. There can be special conditions where about a quarter of the above bits could be known to be zero. Thus, many conditions exist that effect the specific number of bits and which bits are known zeros.

Figures 12B, 13:
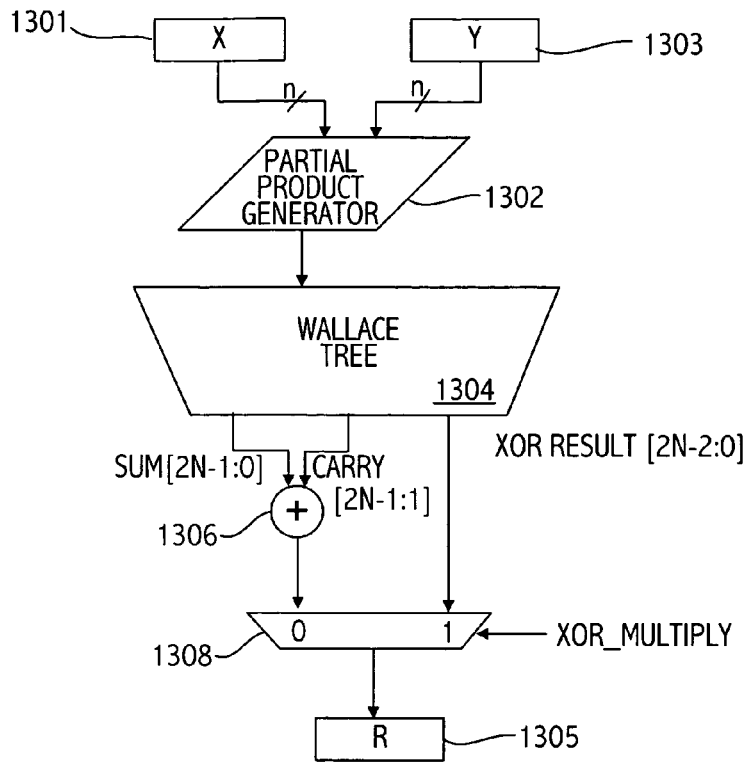
FIG. 12B illustrates an example using Booth encoding.
FIG. 13 shows a multiplier circuit structure that may be adapted for use in various embodiments of the invention.

Referring to FIG. 12B, the example shown uses Booth encoding and multiplies X=[X7, X6, X5, X4, X3, X2, X1, X0] by Y=[Y7, Y6, Y5, Y4, Y3, Y2, Y1, Y0] and adds in term Z=[Z7, Z6, Z5, Z4, Z3, Z2, Z1, Z0], using the umulxck instruction. The "partial product" terms produced by the Booth encoding muxes are designated by D, E, F, G, and H in FIG. 12B. The sign of each of these terms is SD, SE, SF, and SG, with H known to be non-negative. The first five lines shown in FIG. 12B are from the Booth encoding. The next two lines are the feedback of the high order sum and carry bits from the previous execution of the umulxck instruction, and the last line is the Z term to be added in. [S7:S0] and [C7:C0] are provided to the carry look-ahead adder. C16 is the sign bit, as one of the two terms (S and C) that are fed back may be negative when Booth encoding is used. The multiple occurrences of C16 when fed back are due to sign extension.

Referring again to FIG. 9, the implementation shown utilizes added wires and multiplexer circuitry to allow access for loading and storing the exc register, e.g., when a context switch is needed. However, the additional hardware requirements to achieve that access may be undesirable in particular embodiments. In another embodiment, the extended carry register exc can be loaded and stored using umulxc/umulxck instructions as explained further below. When a context switch is needed, it is desirable to save the non-redundant extended carry representation (e.g., ex3, ex2, ex1, ex0) instead of the larger redundant extended carry representation (e.g., S6, S5, S4, C7, C6, C5, C4, CC4), shown, e.g., in FIG. 11. The code that performs the context switch, after it has saved the general purpose registers, can perform an umulxc or umulxck instruction to load and/or store the extended carry register as part of that context switch. In one embodiment, the processor executes a umulxc or umulxck instruction that multiplies zero by zero (and adds zero for umulxck). The output result (rd) will be the non-redundant (ex3, ex2, ex1, ex0) value to be saved for the context switch. This also sets the exc register (i.e., the sum, carry, and CC4) to zero, which is needed before restoring the new context. In order to restore the exc value for the new context, two cases need to be considered.

If the umulxck instruction is implemented, then the current exc value can be obtained and the new exc context value restored at the same time. Let v be the new exc value. Assume the umulxck instruction is executed with rs1=v, rs2=v and k=($2^n$)-1 (all bits on). This computes v*($2^n$-1)+v+current exc=v*$2^n$+current exc. Thus, the current exc is output to register rd and v becomes the new exc value.

If the umulxck instruction is not implemented, the umulxc instruction can be used to implement load and/or store operations of the extended carry register as part of the context switch. In this case note that the value of v can never exceed $2^n$-2. That is so because the maximum value computable is all bits on times all bits on, plus the previous exc value. If the previous exc value is assumed to be ($2^n$)-2, then $$(2^n - 1) * (2^n - 1) + (2^n - 2) = 2^{2n} - 2^n - 2^n + 1 + 2^n - 2$$
$$= 2^{2n} - 2*(2^n) + 2^n - 1$$
$$= 2^n * (2^n - 2) + 2^n - 1$$
$$= 2^n * (\text{new } exc \text{ value}) + 2^n - 1$$

and so the new exc value can never exceed $2^n$-2 if the old value doesn't exceed that value. Hence, a larger value can not be achieved.

As stated above, the current extended carry value (exc) may be obtained by execution of an umulxc instruction that multiplies zero by zero. The output result (rd) will be the non-redundant extended carry value (ex3, ex2, ex1, ex0) to be saved for the context switch. That also sets the exc register (i.e. the sum, carry and CC4) to zero, which is needed for restoring the new context. The new context v may be restored by executing an umulxc instruction with rs1=v+1 and rs2=($2^n$)-1 (all bits on). This computes $$(v + 1) * (2^n - 1) = v * (2^n) + 2^n - v - 1$$
$$= (2^n) * v + (2^n - (v + 1))$$
$$= (2^n) * (\text{restoring } exc \text{ value}) + (2^n - (v + 1)).$$

Since $2^n$-(v+1) is between 0 and $2^n$-1, the value of v has been restored. Note that by saving and restoring the exc value in this manner, no extra instructions are needed and no extra data paths to or from the exc value need be provided, saving hardware resources.

The following pseudo code fragments illustrate how the extended carry can be stored and loaded on a 64-bit processor, i.e., n=64. The following pseudo code illustrates how the extended carry register can be stored (the value of the extended carry register retrieved) utilizing the umulxc instruction.

```
ldx 0, r1              // r1 = 0
umulxc r1, r1, r0      // (exc, r0) = 0 * 0 + exc, i.e.
                       // r0=old_exc, exc = 0
stx r0, [exc]
```

One embodiment of restoring exc values computes ($2^{64}$-1)*(exc_value+1)=(exc_value*$2^{64}$)+($2^{64}$-(exc value+1)). The exc gets exc_value and r2 gets $2^{64}$-(exc_value+1), which is to be ignored. Assume that the current value of the extended carry register exc is zero:

```
ldx [exc], r0              // r0 = exc_value with 0 <=
                           // exc_value <= 2^64 - 2 < 2^64 - 1
ldx 0xFFFFFFFFFFFFFFFF, r1 // r1 = 0xFFFFFFFFFFFFFFFF = 2^64 - 1
add r0, 1, r0              // r0 = exc_value + 1 with 0 <
                           // exc_value + 1 < 2^64
umulxc r0, r1, r2          // set exc to exc_value, ignore r2
```

Another embodiment of restoring exc values computes ($2^{64}$-1)* exc_value+$2^{64}$-2=(exc_value*$2^{64}$)+($2^{64}$-exc_value-2). Thus, the extended carry register exc can be loaded with the following pseudo code:

```
ldx [exc], r0              // r0 = exc_value
ldx 0xFFFFFFFFFFFFFFFF, r1 // r1 = 0xFFFFFFFFFFFFFFFF = 2^64 - 1
umulxc r1, r1, r2          // set exc = 0xFFFFFFFFFFFFFFFE = 2^64
                           // - 2, ignore r2
umulxc r0, r1, r2          // set exc = r0, ignore r2
```

This scheme works for an arbitrary exc value with 0<=exc_value <=$2^{64}$-2 since (exc, r2)=($2^{64}$-1)*exc_value+$2^{64}$-2=exc_value*$2^{64}$+($2^{64}$-2-exc_value). The term ($2^{64}$-2-exc_value) will never create a carry overflow into the upper 64 bits as long as 0<=exc_value <=$2^{64}$-2. It can be mathematically shown that the definition of umulxc guarantees the extended carry register to always be in the range 0<=exc <=$2^{64}$-2 when exc is initially 0.

Processors that implement both integer and XOR multiply-accumulate instructions with a shared extended carry register can use umulxc or umulxck to store and restore the extended carry register. On processors that have separate extended carry registers for integer and XOR multiply-accumulate operations or that do not implement instructions umulxc and umulxck, the extended carry for XOR multiply-accumulate operations can be stored and restored with bmulxc/bmulxck instructions as described below. The value of the extended carry register for XOR multiply-accumulate can be obtained by executing a multiplication by 0. Using bmulxc, one can store the extended carry with the following pseudo code:

```
ldx 0, r1              // r1 = 0
bmulxc r1, r1, r0      // (exc, r0) = 0 *^ 0 ^ exc, i.e.
                       // r0=old_exc, exc = 0
stx r0, [exc]          // store r0
```

An alternative way to store the extended carry register exc with umulxc instructions adds 1 when storing it:

```
ldx 1, r1              // r1 = 1
umulxc r, r1, r0       // (exc, r0) = 1 * 1 + exc,
                       // i.e., r0=old_exc+1, exc = 0
stx r0, [exc]
```

An alternative way to load exc with umulxc instructions subtracts 1 when loading it. Again, this approach works for $0 <= exc\_value <= 2^{64}-2$.

```
ldx [exc], r0                    // r0 = exc_value + 1, assume exc = 0
ldx 0xFFFFFFFFFFFFFFFF, r1       // r1 = 0xFFFFFFFFFFFFFFFF =
                                 // 2^64 − 1
umulxc r0, r1, r2                // set exc = r0 − 1, ignore r2
```

When using the umulxck instruction, the following pseudo code can be used for storing exc:

```
ldx 0, r1                        // r1 = 0
umulxck r1, r1, r0               // (exc, r0) = 0 * k + 0 + exc,
                                 // i.e., r0=old_exc, exc = 0
stx r0, [exc]
```

Likewise, the following pseudo code can be used for loading the extended carry register exc using the umulxck instruction:

```
ldx [exc], r0                    r0 = exc_value, assume exc = 0
ldx 0xFFFFFFFFFFFFFFFF, r1       // r1 = 0xFFFFFFFFFFFFFFFF =
                                 // 2^64 − 1
mov r1, k                        // k = r1 = 2^64 − 1
umulxck r0, r1, r2               // set exc = r0, ignore r2
```

This scheme works for an arbitrary exc value with $0<=exc\_value <=2^{64}-1$ since $(exc, r2)=(2^{64}-1)*exc\_value+2^{64}-1+0=exc\_value*2^{64}+(2^{64}-1-exc\_value)$. That is, this scheme works for loading and storing arbitrary exc in the range $0<=exc<=2^{64}-1$.

Similarly, the extended carry can be stored using the instruction bmulxck:

```
ldx 0, r1                        // r1 = 0
bmulxck r1, r1, r0               // (exc, r0) = 0 *^ k ^0 ^ exc,
                                 // i.e., r0=old_exc, exc = 0
stx r0, [exc]                    // store r0
```

Note that the most significant bit in an n-bit extended carry register is always zero if XOR multiply-accumulate is used. That is due to the fact that the result of multiplying two n-bit binary polynomials can never be greater than 2n−1 bits, which can be split up into an n-bit result and an n−1-bit extended carry. Adding in one or more n-bit polynomials as in a bmulxc/bmulxck operation does not affect the size or value of the extended carry. For n=64, the extended carry register can be restored with an n−1-bit binary polynomial $rest\_exc=rex\_62 *t^{62}+rex\_61*t^{61}+ \ldots +rex\_1*t+rex\_0$ using bmulxc with the following pseudo code:

```
ldx [exc], r0                    // r0 = rest_exc = rex_62 * t^62 + rex_61
                                 // * t^61 + ... + rex_1 * t + rex_0
sll r0, 1, r0                    // r0 = rex_62 * t^63 + rex_61 * t^62 +
                                 // + rex_1 * t^2 + rex_0 * t
ldx 1, r1                        // r1 = 1
sll r1, 63, r1                   // r1 = t^63
```
```
bmulxc r0, r1, r2                // set exc = rex_62 * t^62 + rex_61 *
                                 // t^61 + ... + rex_1 * t + rex_0, r2 =
                                 // old_exc
```

The extended carry value rest_exc being restored is first multiplied by t through a logical shift-left instruction (sll) and subsequently multiplied by $t^{63}$ resulting in (exc, r2)=rest_exc*$t^{64}$^old_exc. Note that restoring exc using bmulxc also reads out the previous value of the extended carry register exc. Thus, both can be done at this same time. That is, the operation performed is (t*(rest_exc)*$t^{n-1}$^(old_exc).

The operation $(t*(rest\_exc)*t^{n-1})$=rest_exc*$t^n$ restores the rest_exc value without affecting the least significant n bits, and so the previous exc value is correctly output. The instruction bmulxck can be used by having the term being added in be zero.

Similarly, bmulxck can be used for restoring the extended carry:

```
ldx [exc], r0                    // r0 = rest_exc = rex_62 * t^62 + rex_61 *
                                 // t^61 + ... + rex_1 * t + rex_0
sll r0, 1, r0                    // r0 = rex_62 * t^63 + rex_61 * t^62 + ... +
                                 // rex_1 * t^2 + rex_0 * t
ldx 1, r1                        // r1 = 1
sll r1, 63, r1                   // r1 = t^63
mov r1, k                        // k = t^63
ldx 0, r1                        // r1 = 0
bmulxck r0, r1, r2               // set exc = rex_62 * t^62 + rex_61 * t^61 +
                                 // rex_1 * t + rex_0, r2 = old_exc
```

Note that bmulxc/bmulxck can not be used to restore the extended carry register with a value greater than n−1 bits. In particular, bmulxc/bmulxck can not be used to restore the extended carry for a subsequent umulxc/umulxck instruction, whereas umulxc/umulxck can be used to restore the extended carry for a subsequent bmulxc/bmulxck instruction.

Referring now to FIG. 13, a multiplier circuit structure is shown that may be adapted for use in various embodiments of the invention. FIG. 13 shows a multiplier circuit that multiplies the contents X and Y of two n bit registers 1301 and 1303 and outputs a 2n bit result into register R 1305. In the exemplary embodiment shown in FIG. 13, n is 64 bits, thus the result R is 128 bits. The result R is generated as follows. First, each bit of X is multiplied with all bits of Y in partial product generator 1302. The partial product generator outputs n-bit partial products pp63 . . . pp0 with $pp_i=x_i*y$. Alternatively, the partial product generator may output the partial products of the Booth encodings of X multiplied by Y. Next, the partial products are summed up in Wallace tree 1304. The Wallace tree 1304 adds partial products and produces a 255-bit intermediate result sum[127 . . . 0] and carry [127 . . . 1]. The Wallace tree may also generate a 127-bit "XOR multiply" result xor_result [126 . . . 0]. Adder circuit 1306 sums up intermediate results sum[127:0] and carry[127 . . . 1]. Common implementations of adder circuit 1306 include a ripple-carry-adder, a carry look-ahead adder or a carry-select-adder. Multiplexer 1308 selects the multiplication result r to be either the unsigned integer multiplication r=x*y (xor_multiply=0) or the XOR multiplication r=x^*y(xor_multiply=1), where ^* indicates XOR multiplication for binary polynomial fields.

Figure 14:
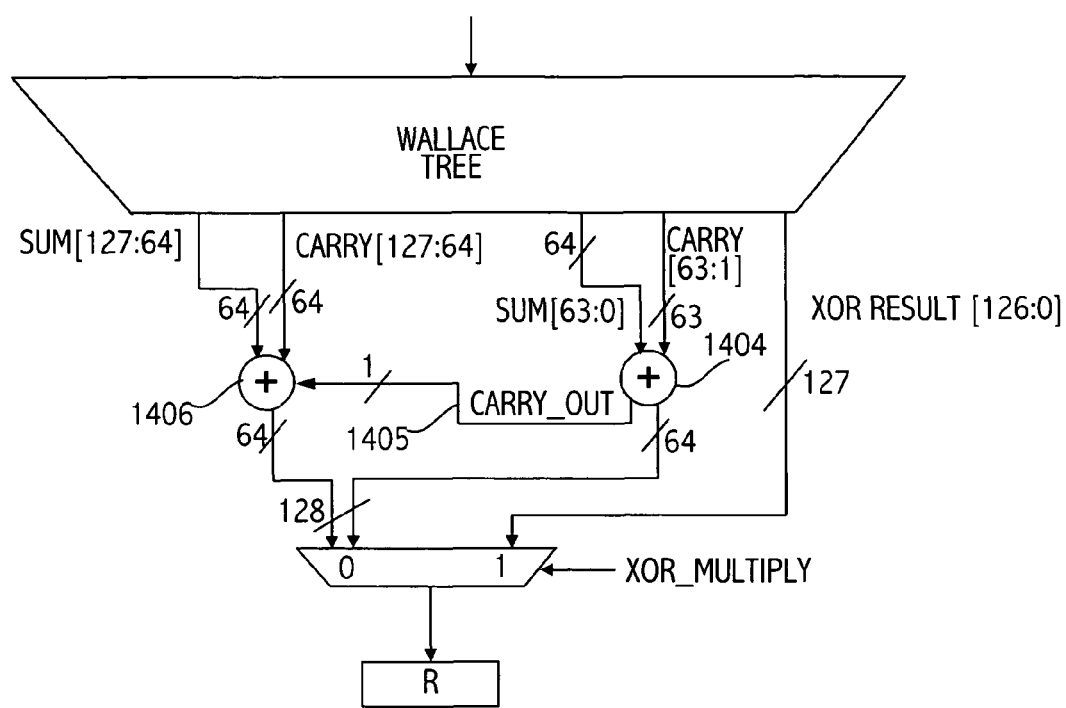
FIG. 14 shows a multiplier circuit, that may be adapted for use in various embodiments of the invention, in which the adder circuit is implemented as two 64-bit adders.

FIG. 14 shows a multiplier circuit, in which the adder circuit is implemented as two 64-bit adders 1404 and 1406. Adder circuit 1404 outputs a carry out bit 1405, which is input into adder circuit 1406. Note that adder circuit 1406 does not generate a carry bit since the product x*y can never be greater than 128 bits.

Figure 15:
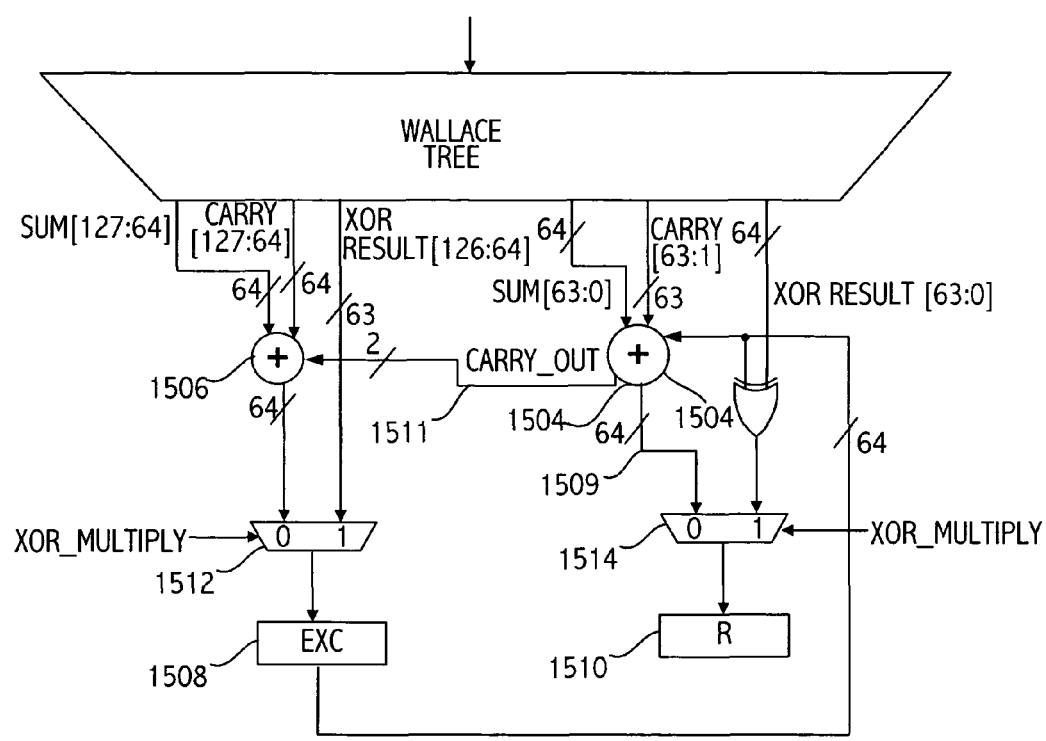
FIG. 15 shows a multiply-and-accumulate circuit according to an embodiment of the invention.
Figure 15A:
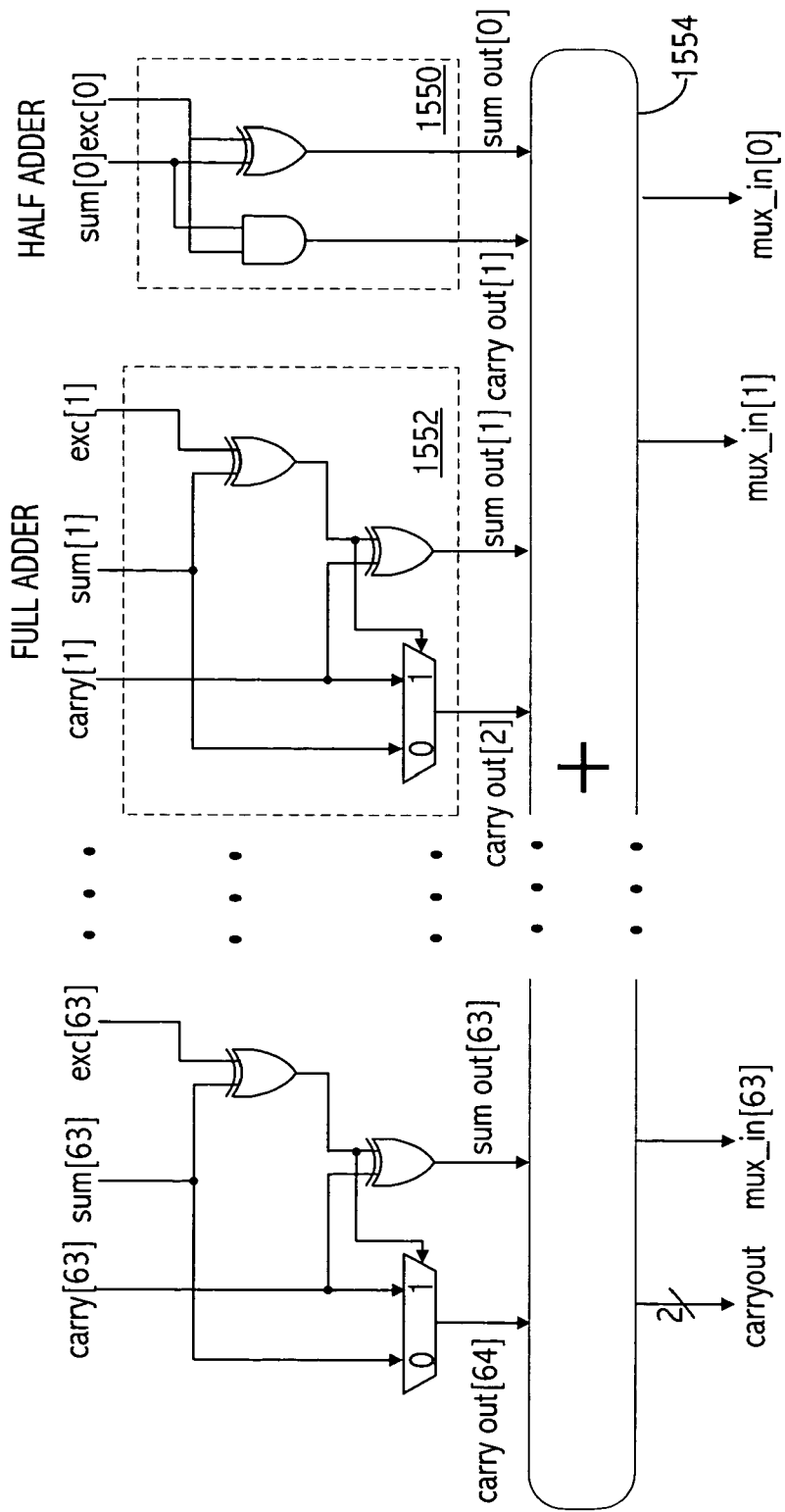
FIG. 15A shows an exemplary implementation of an adder circuit.

FIG. 15 shows a multiply-and-accumulate circuit according to an embodiment of the invention, that multiplies the contents of two 64-bit registers X and Y, adds the contents of a 64-bit extended carry register and outputs a 128-bit result. The upper 64 bits of the result are output into 64-bit extended carry (exc) register 1508 and the lower 64 bits are output into result register 1510. The addition of the 64-bit extended carry (exc) register 1508 is performed in adder circuit 1504. Adder circuit 1504 adds intermediate results sum[63 . . . 0], carry[63 . . . 1] and exc[63:0] and outputs a 64-bit addition result 1509 and two carry bits 1511 that are input into adder circuit 1506. Multiplexers 1512 and 1514 select between the unsigned integer multiply-accumulate operation (exc, r)=x*y+exc (when multiplexer select xor_multiply=0) and the XOR multiply-accumulate operation (when multiplexer select xor_multiply=1) (exc, r)=x^*y^exc where "^" indicates XOR addition. An exemplary implementation of adder circuit 1504 is shown in FIG. 15a. The adder circuit 1504 includes half adder 1550, full adder 1552 and adder circuit 1554. Note that circuit 1554 calculates {0, sum out [63], . . . , sum out [0]}+{carry out [64] . . . carry out [1], 0}. Common implementations of adder circuit 1554 include a ripple-carry-adder, a carry look-ahead adder or a carry-select-adder.

Figure 16:
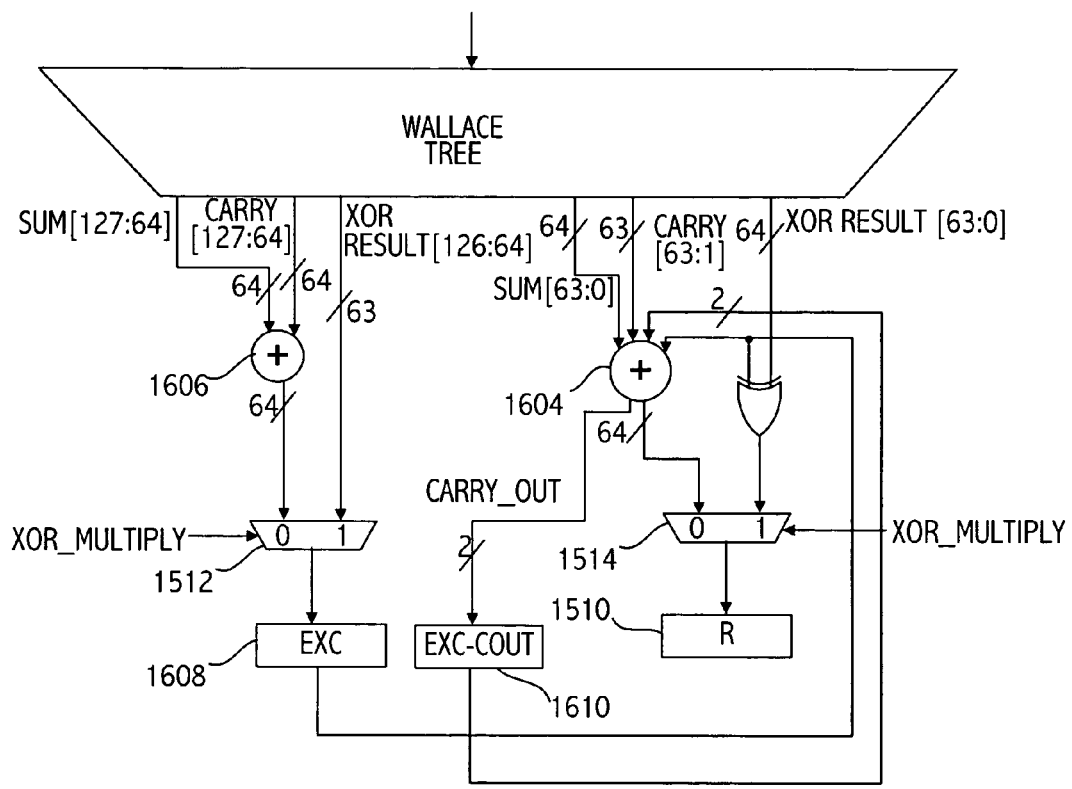
FIG. 16 shows a multiply-and-accumulate circuit according to another embodiment of the invention.

FIG. 16 shows a multiply-and-accumulate circuit according to another embodiment of the invention, in which the extended carry is not fully summed up, but stored in a 64+2-bit representation in extended carry registers exc 1608 and exc_cout 1610. Since the carry output of adder circuit 1604 is directly input into register exc_cout 1610, the length of the critical path is shortened allowing for faster implementations. The carry bits in exc_cout are added in adder circuit 1604 (which corresponds to FIG. 15a, where half adder 1550 is replaced with a full adder to add one of the carry bits, and adder circuit 1554 adds the other carry bit to the least significant bit position).

Figure 17:
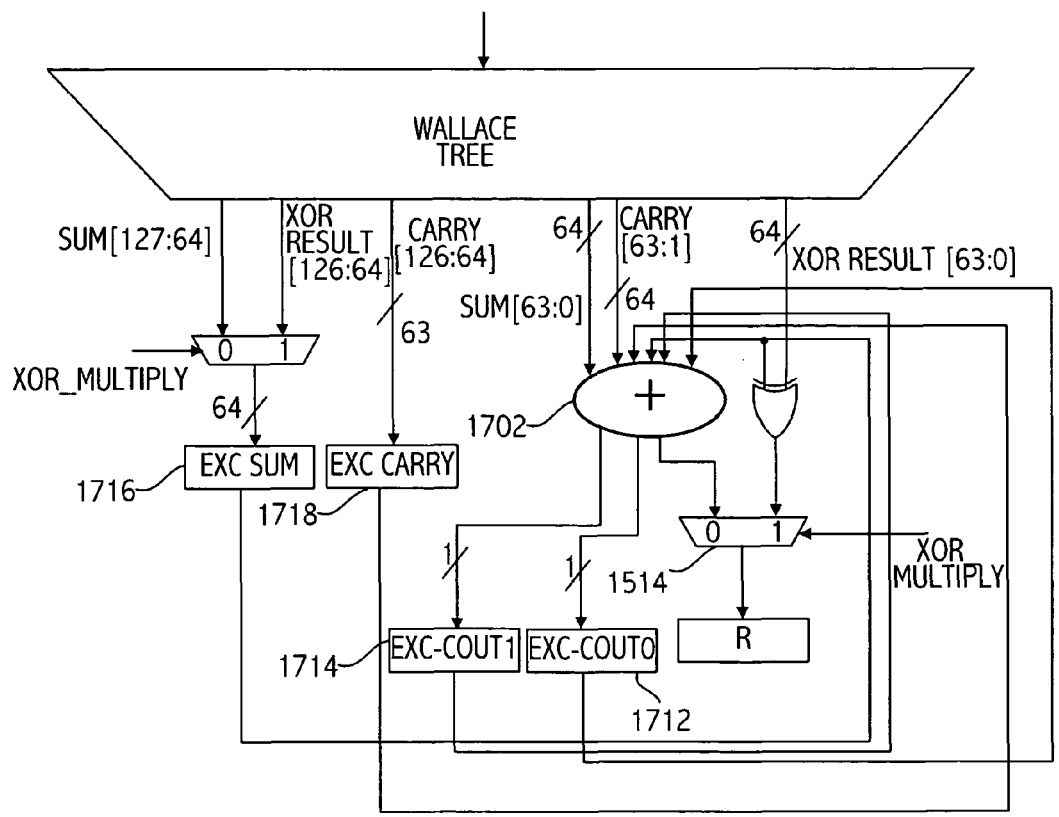
FIG. 17 shows another embodiment of a multiply-and-accumulate circuit according to an embodiment of the invention, in which the extended carry is stored in a 64+64+2-bit representation.

FIG. 17 shows another embodiment of a multiply-and-accumulate circuit according to an embodiment of the invention, in which the extended carry is stored in a 64+64+2-bit representation in registers exc_sum[63 . . . 0], exc_carry[63 . . . 0], exc_cout0 and exc_cout1. That representation eliminates adder circuit 1606 in FIG. 16 and allows for a faster implementation of the multiply-accumulate operation. Since in most implementations the lower 64 bits of the 64×64 multiplication will be available earlier than the upper 64 bits, it makes sense to save time on the generation of the extended carry and spend slightly more time on the addition in adder circuit 1702.

Figure 17A:
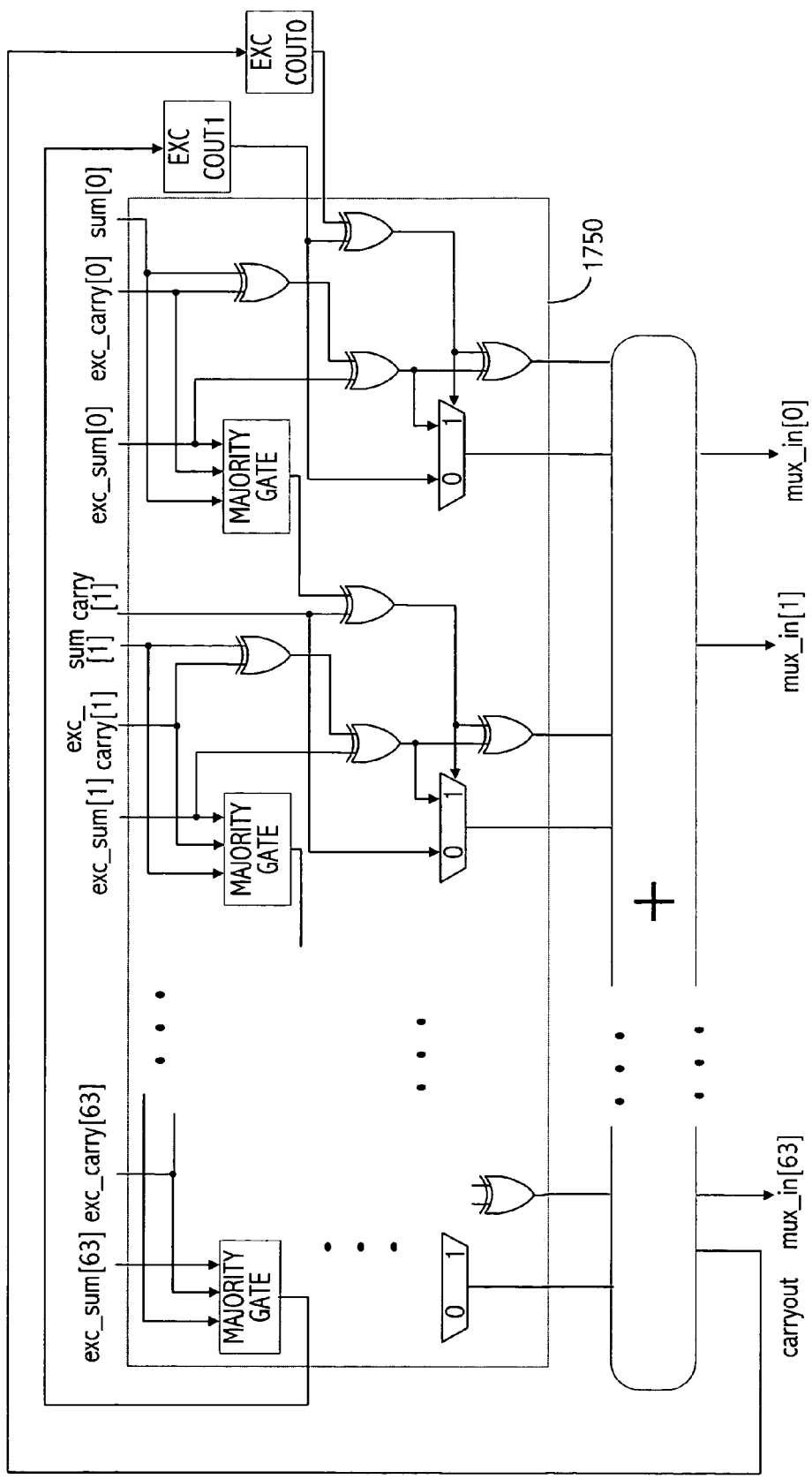
FIG. 17A shows an exemplary implementation of an adder circuit.

An exemplary implementation of adder circuit 1702 with an array of 4-to-2-compressors 1750 is shown in FIG. 17A.

Figure 18:
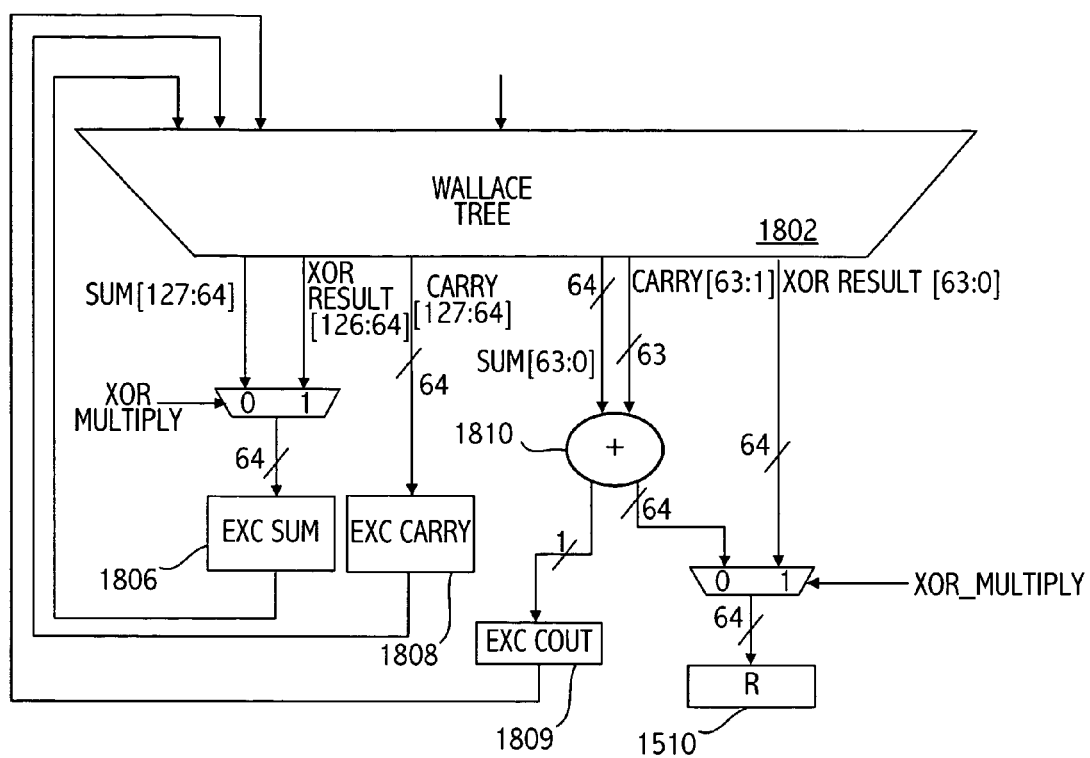
FIG. 18 shows another embodiment of a multiply-and-accumulate circuit, in which the extended carry bits and carry registers are fed back and added in the Wallace tree.

FIG. 18 shows another embodiment of a multiply-and-accumulate circuit, in which the extended carry bits in extended carry sum register 1806 and extended carry register 1808 are fed back and added in the Wallace tree 1802. Various embodiments of Wallace trees suitable for use in the present invention are described further herein. The carry out bit in carry out register 1809 supplied from the addition circuit 1810 is also supplied to the Wallace tree 1802.

Figure 19:
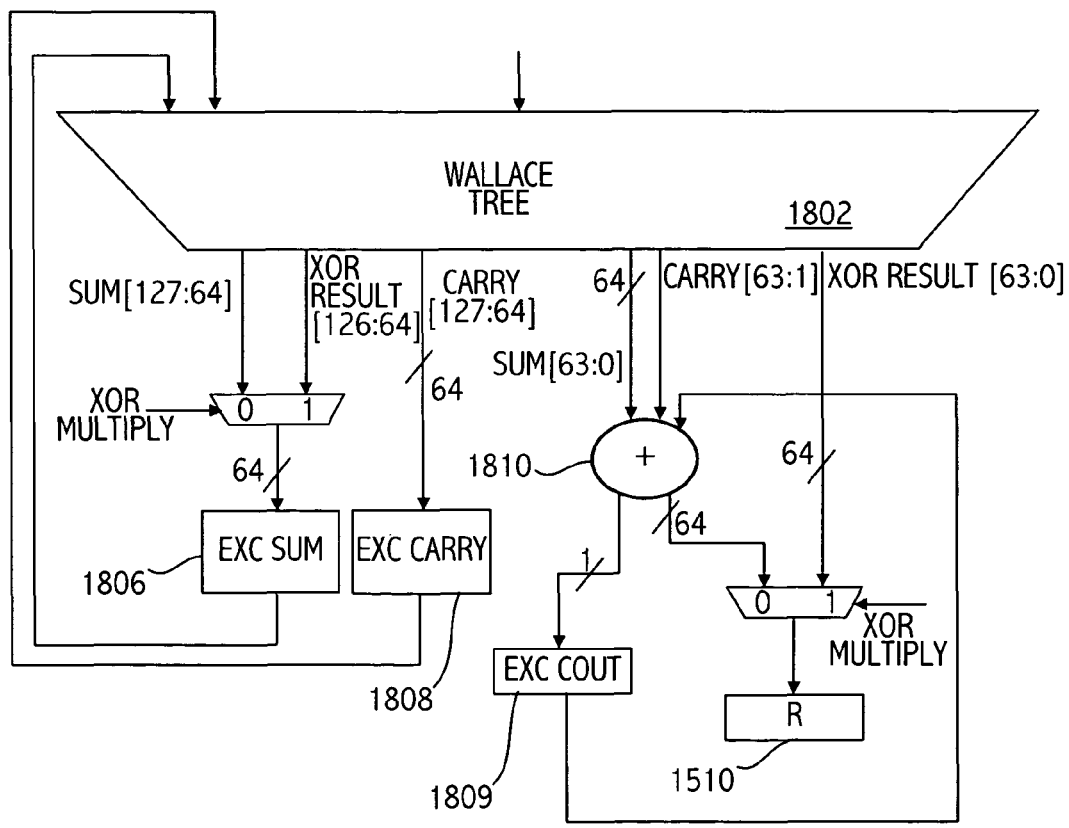
FIG. 19 shows another embodiment of a multiply-and-accumulate circuit, in which the extended carry bits are fed back and added in the Wallace tree and the carry out bit from the adder circuit is fed back to the adder circuit.

FIG. 19 shows another embodiment of a multiply-and-accumulate circuit, in which the extended carry bits in extended carry sum register 1806 and extended carry register 1808 are fed back and added in the Wallace tree 1802. The carry out bit in carry out register 1809 supplied from the adder circuit 1810 is fed back to adder circuit 1810 instead of the Wallace tree 1802. That allows the Wallace tree to begin determining the next sum and carry outputs prior to the addition being completed by adder circuit 1810.

Figure 20:
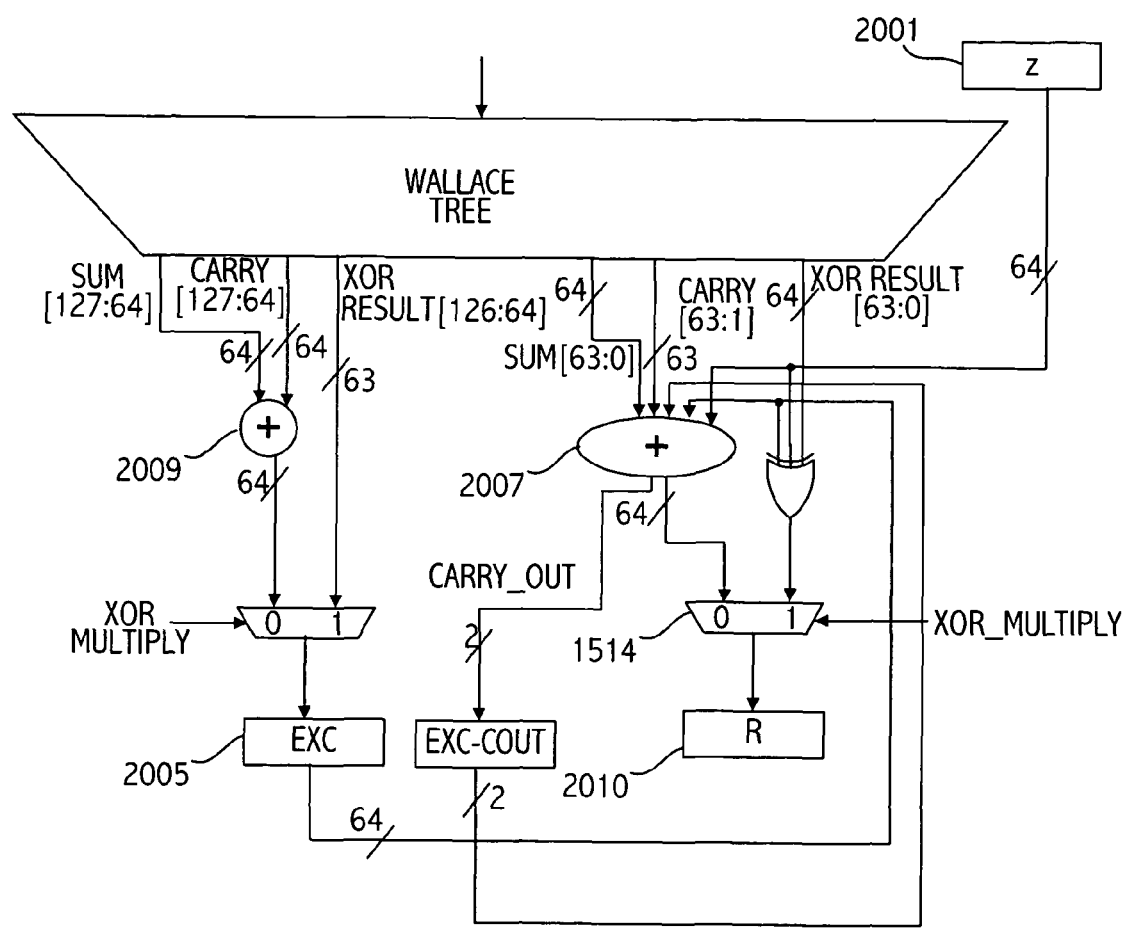
FIG. 20 illustrates a multiply-and-accumulate circuit according to an embodiment of the invention implementing the umulxck and bmulxck instructions.

FIG. 20 shows a multiply-and-accumulate circuit that multiplies the contents of two 64-bit registers X and Y (not shown), adds the contents Z of a third 64-bit register 2001, adds a 64-bit extended carry from register 2005 and generates a 130-bit result (64 bits and two carries from adder 2007 and 64 bits from adder 2009). The addition of the third value Z is performed in adder circuit 2007, which can be implemented similar to FIG. 17a. The circuit shown in FIG. 20 is one embodiment of a circuit to implement the instructions umulxck and bmulxck.

Figure 21A:
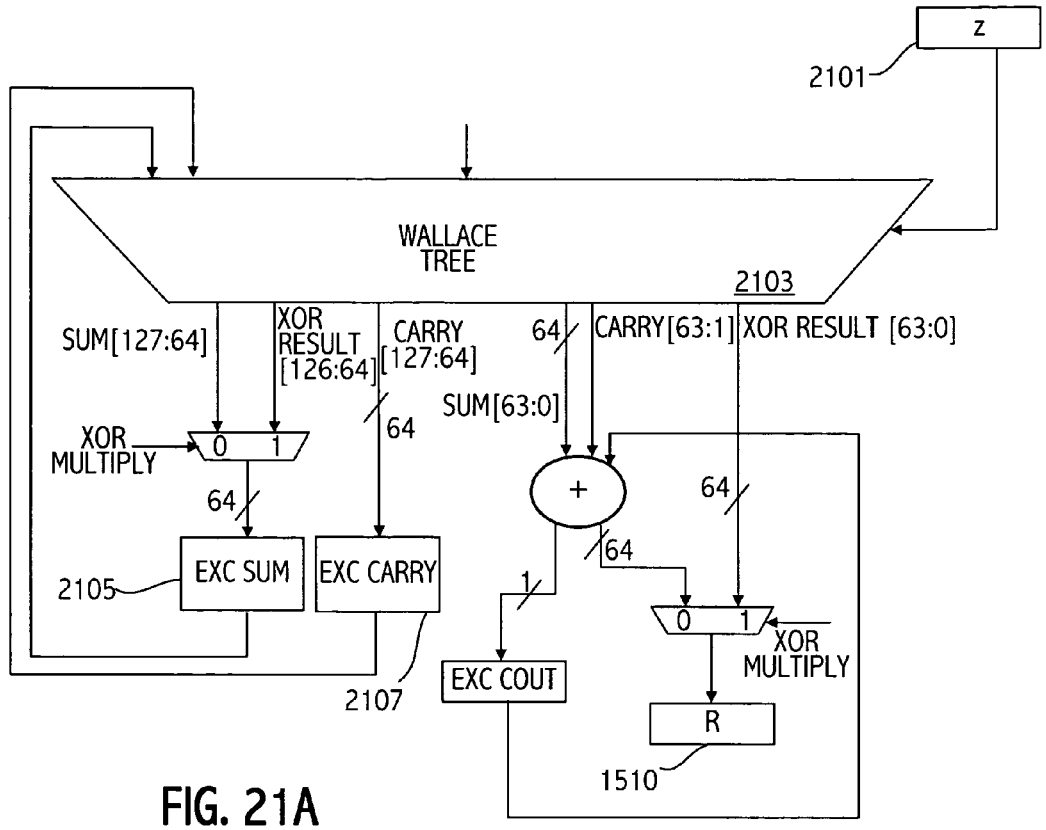
FIG. 21A shows an embodiment implementing the umulxck and bmulxck instructions in which the additions are performed in the Wallace tree for the feedback carry and sum bits and the extra term.

In another implementation, shown in FIG. 21A, the value Z from register 2101 is supplied directly into the Wallace tree 2103 along with the feedback of the extended carry sum and carry bits in registers 2105 and 2107. Note that the feedback of the extended carry bits in FIGS. 19 and 21A is shown being fed back into the top of the Wallace tree, as described further herein, the feedback is typically into the middle or lower portion of the Wallace tree.

The Wallace trees (carry save adders) illustrated in the FIGS. 13-21 are a collection of full adders arranged so that the partial products of a multiply are reduced (or compressed) to just two terms that are subsequently added in a carry look-ahead adder such as adder 1306 in FIG. 13. A variety of implementations are possible based on the application and the technology used to implement the multiplier. The partial products may be obtained by ANDing all pairs of bits, one from the multiplier and one from the multiplicand (X and Y in FIG. 13). The inputs into the Wallace tree may be outputs of Booth encoding multiplexers.

Figure 21B:
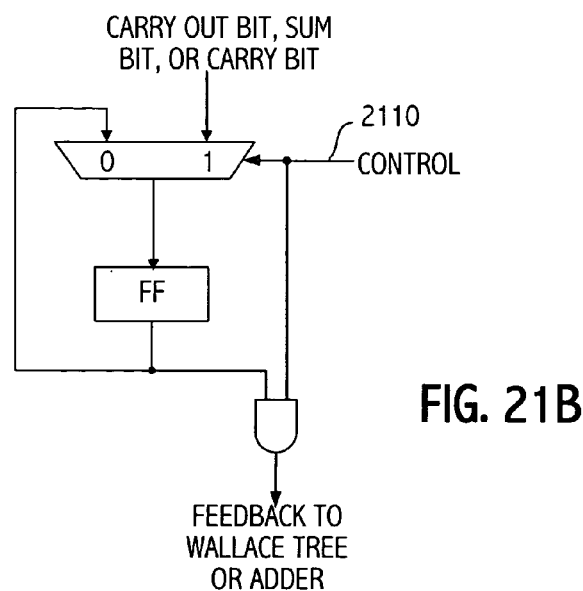
FIG. 21B illustrates a control circuit that allows various ones of the multiplier circuits described herein to be utilized for regular multiplications as well as multiplications involving the extended carry register. Further, it allows the circuit to be used when multiply-accumulate instructions are not necessarily on consecutive clocks.
Figure 21C:
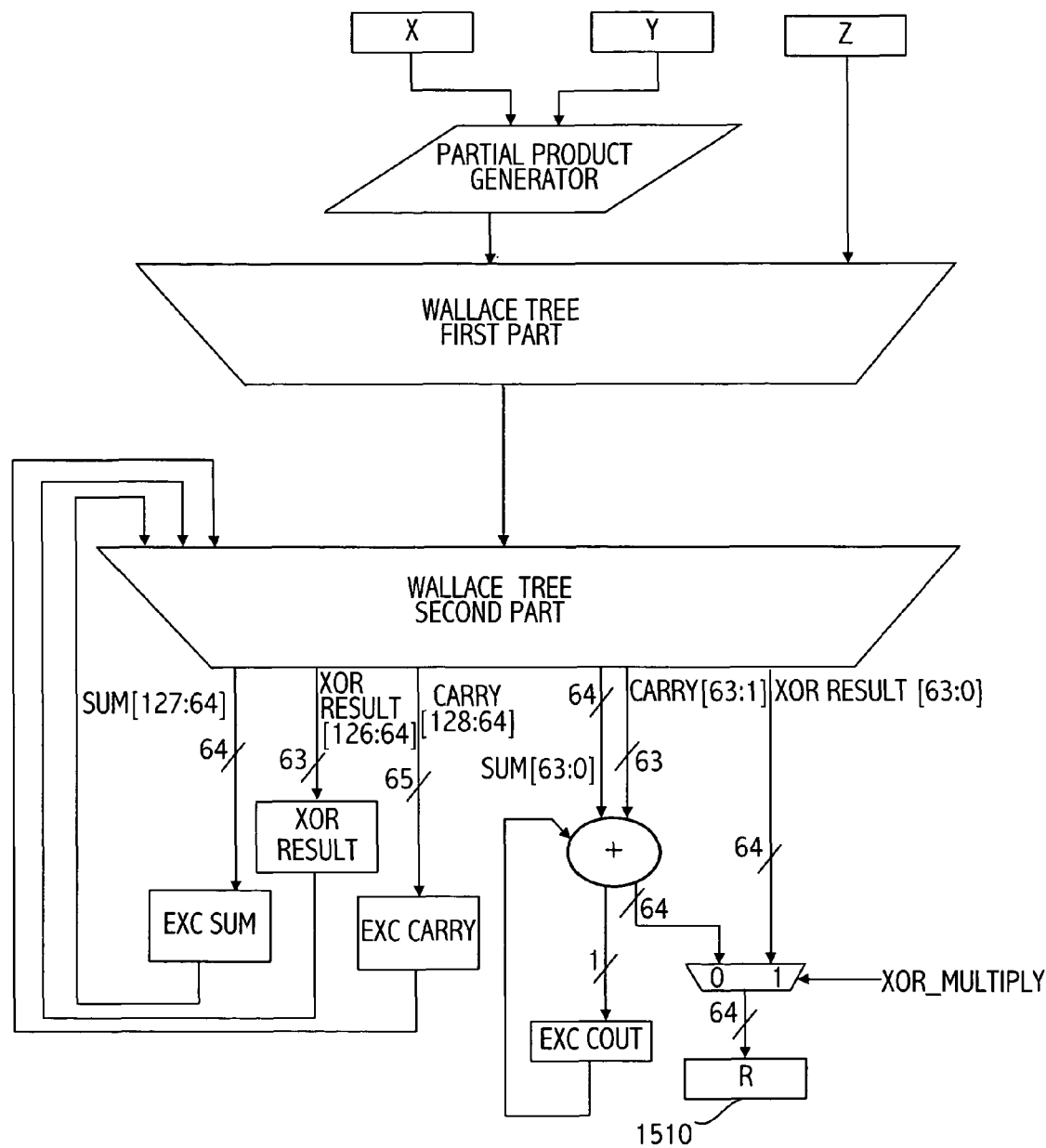
FIG. 21C illustrates another embodiment implementing the umulxck and bmulxck instructions in which the additions are performed in the Wallace tree for the feedback carry and sum bits and the extra term.

Referring to FIG. 21B, a control circuit is illustrated that allows the multiplier circuits described herein, e.g., in FIG. 19, to be utilized for regular multiplications as well as multiplications involving the extended carry register. When the control signal 2110 is zero, the sum or carry feedback to the Wallace tree (or the carry bit into adder 1810) is zero, thus allowing regular multiplications to take place. Also, if the multipliers using the extended carry registers are not on consecutive clocks, the control of zero during the intermediate clocks is needed in order to obtain the correct result. FIG. 21C illustrates another embodiment implementing the umulxck and bmulxck instructions in which the additions for the feedback carry and sum bits and the extra term are performed in the Wallace tree.

Before additional details of Wallace trees suitable for utilization in embodiments of the present invention are described, components that are utilized in constructing Wallace trees will be described, which will help provide a basis for understanding some of the issues associated with efficiently designing Wallace trees for various applications described herein.

Figure 22C:
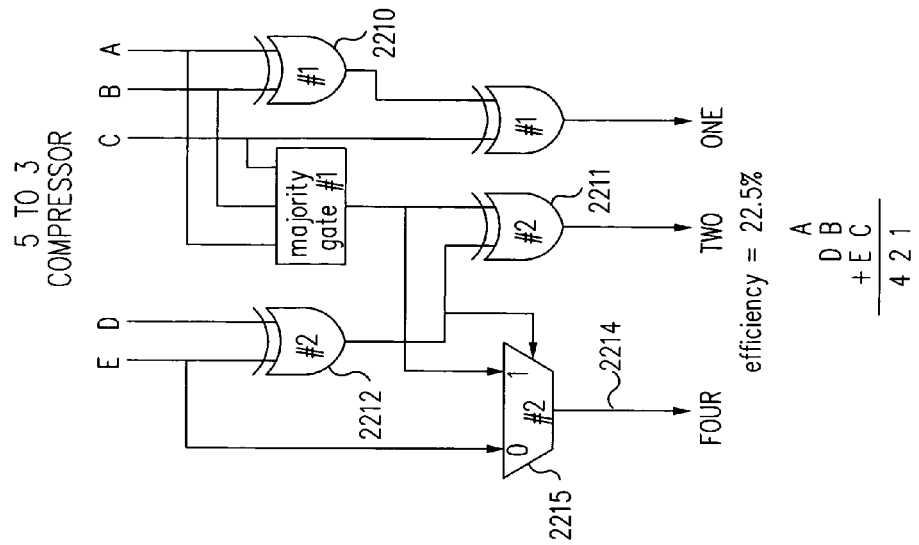
FIG. 22C illustrates a 5 to 3 compressor.
Figure 22B:
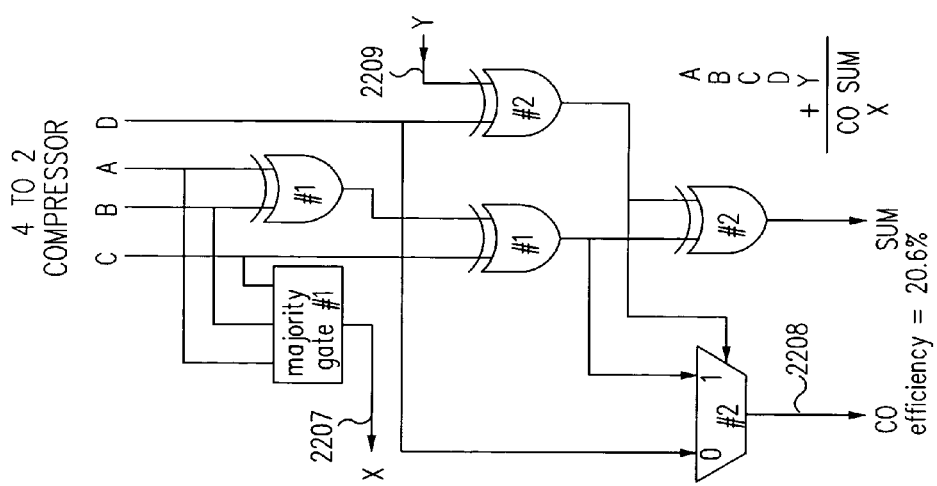
FIG. 22B illustrates a 4 to 2 compressor.
Figure 22A:
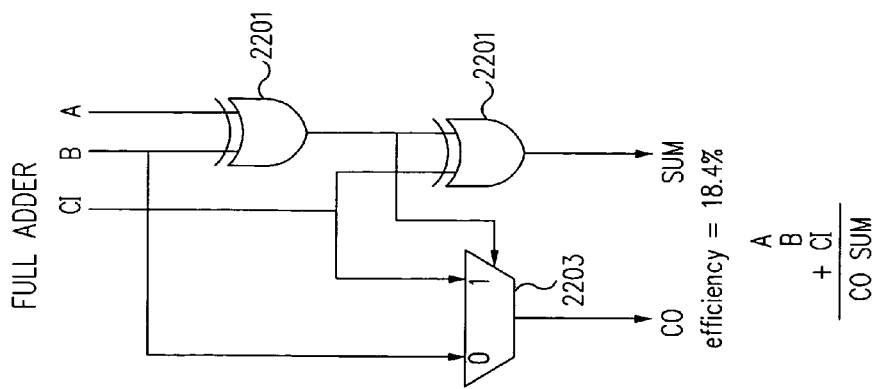
FIG. 22A illustrates a full adder.
Figures 23A, 23B, 23C, 23D:
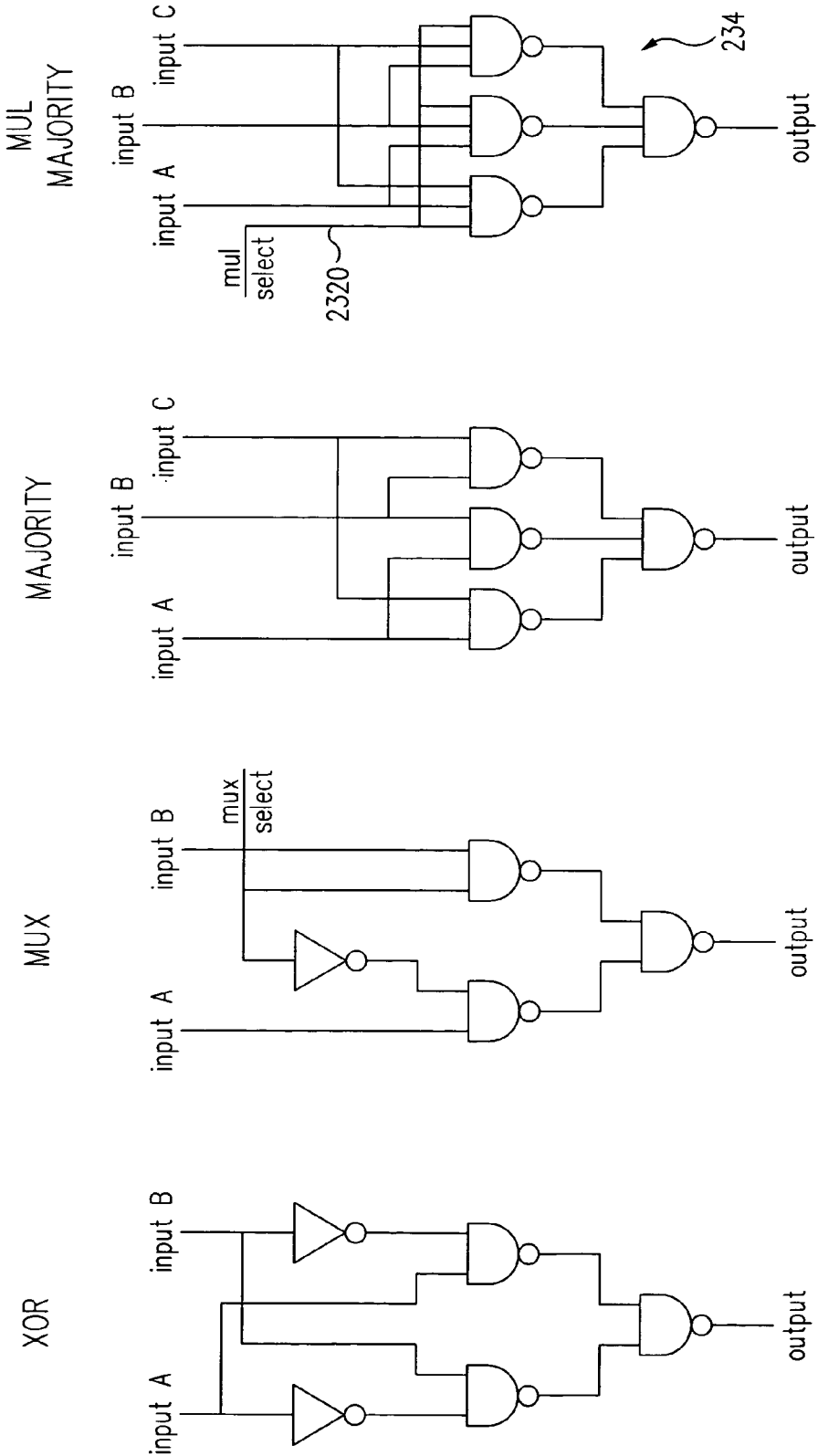
FIG. 23A shows one implementation of an XOR gate.
FIG. 23B shows an implementation of a two input multiplexer.
FIG. 23C shows a majority gate made out of NAND gates.
FIG. 23D shows a mul majority gate.

Full adders are often combined to create larger units, which can be utilized in Wallace trees. Referring to FIG. 22A a full adder is illustrated. The full adder shown has two XOR gates 2201 and a two input multiplexer 2203. A full adder may also use a majority gate instead of the two input multiplexer. FIG. 22B illustrates a 4 to 2 compressor, formed of two full adders. In FIG. 22B, one full adder is indicated by the three gates labeled with #1 and the other full adder is labeled with #2. The X output 2207 from one column of the Wallace tree is the Y input 2209 of the next column of the Wallace tree. FIG. 22C illustrates a 5 to 3 compressor. The 5 to 3 compressor has two full adders, but they are combined differently. FIG. 23A shows one implementation of an XOR gate, FIG. 23B shows an implementation of a two input multiplexer, and FIG. 23C shows a majority gate made out of NAND gates. Note that the XOR gate and a two input multiplexer illustrated in FIGS. 23A and 23B, respectively, have the same latency since the longest path of each circuit is the same. The majority gate illustrated in FIG. 23C also takes about the same amount of time since the increased latency of a three input NAND gate approximately offsets the absence of the inverter.

The XOR multiplier (mul) majority gate illustrated in FIG. 23D is only a little slower than the simple majority gate shown in FIG. 23C and is useful is applications performing both integer and XOR multiplication. When the mul select input 2320 is one, it is a majority gate. However, when it is zero, the output is always zero. When performing an XOR multiplication, the mul select input is set to zero forcing the output of the majority gate to zero, which forces carry outputs utilized in forming the XOR result to zero. Referring to FIG. 22C, that forces the output from XOR gate 2211 to depend only on the result of the XOR of inputs D and E produced by XOR gate 2212. The output 2214 from the multiplexer 2215 is assumed to not be utilized in forming the XOR multiplication result.

For the 4 to 2 compressor shown in FIG. 22B, use of the mul majority gate causes the output 2207 to be forced to zero for XOR multiplication operations and the Y input from a previous mul majority gate is also zero. The CO output on node 2208 is assumed not used in forming the XOR multiplication result.

Note that the full adder in FIG. 22A and the 5 to 3 compressor illustrated in FIG. 22C each takes two levels of logic whereas the 4 to 2 compressor shown in FIG. 22B takes 3 levels of logic.

The efficiency is a measure of what percentage of bits are eliminated for each level of logic. The full adder gets rid of 33.3% of its input bits (3 input bits, 2 output bits) in two levels of logic, so its efficiency is one minus the square root of 66.6%, or 18.4%. The 4 to 2 compressor is more efficient since it gets rid of 50% of its input bits in 3 levels of logic. This is one minus the cube root of 50%, or 20.6%. The 5 to 3 compressor is even more efficient. It gets rid of 40% of its input bits in two levels of logic, and one minus the square root of 60% is 22.5%.

Figure 24B:
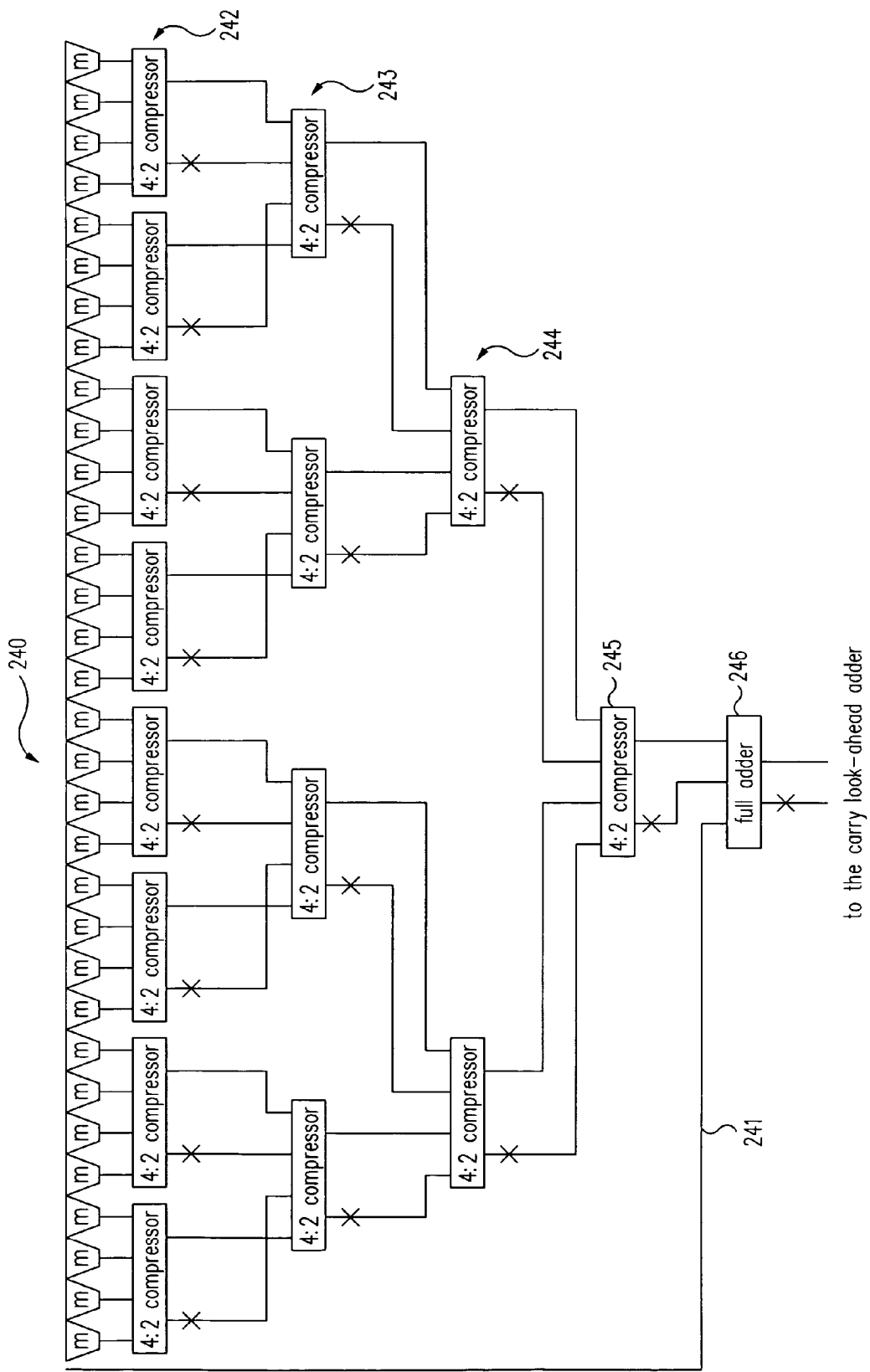
FIG. 24B shows an example of a Wallace tree column for a 64×64 multiplier with Booth encoding.

Referring to FIG. 24A a high level block diagram illustrating how the carry save adder columns shown in FIGS. 24B-32 generate high order and low order portions of a result. In an exemplary embodiment shown in FIG. 24A, a 64×64 multiply results in 32 partial products PP0-PP31. Columns of the partial products are summed in carry save adder columns, e.g. column 2450. Column 2450 represents the column that generates the most significant bit of the low order portion of the result of a umulxc, umulxck, bmulxc or bmulxck instruction. Thus, the columns to the right of column 2450 are those that generate the low order portion of the result and the columns to the left of column 2450 are those columns that generate the high order portion of the result.

Referring now to FIG. 24B an example of a Wallace tree column for a 64×64 multiplier with Booth encoding is shown. The Wallace tree columns illustrated in FIGS. 24B-32 are examples for the longest column of a 64 by 64 multiplication where Booth encoding is used. This results in 33 terms to be reduced to two terms in the Wallace tree. Two notations are used in the FIGS. 24-32 that require explanation. An X on a wire indicates that the wire before the X goes to the corresponding position in the next column and the wire after the X came from the corresponding position in the previous column. A second X (see, e.g., FIG. 25) indicates that the wire before the two X's goes to the corresponding position two columns over and the wire after the X's comes from the corresponding position two columns previous. A diamond on a wire indicates that the wire before the diamond goes to the corresponding position in the previous column and the wire after the diamond came from the corresponding position in the next column.

Figure 25:
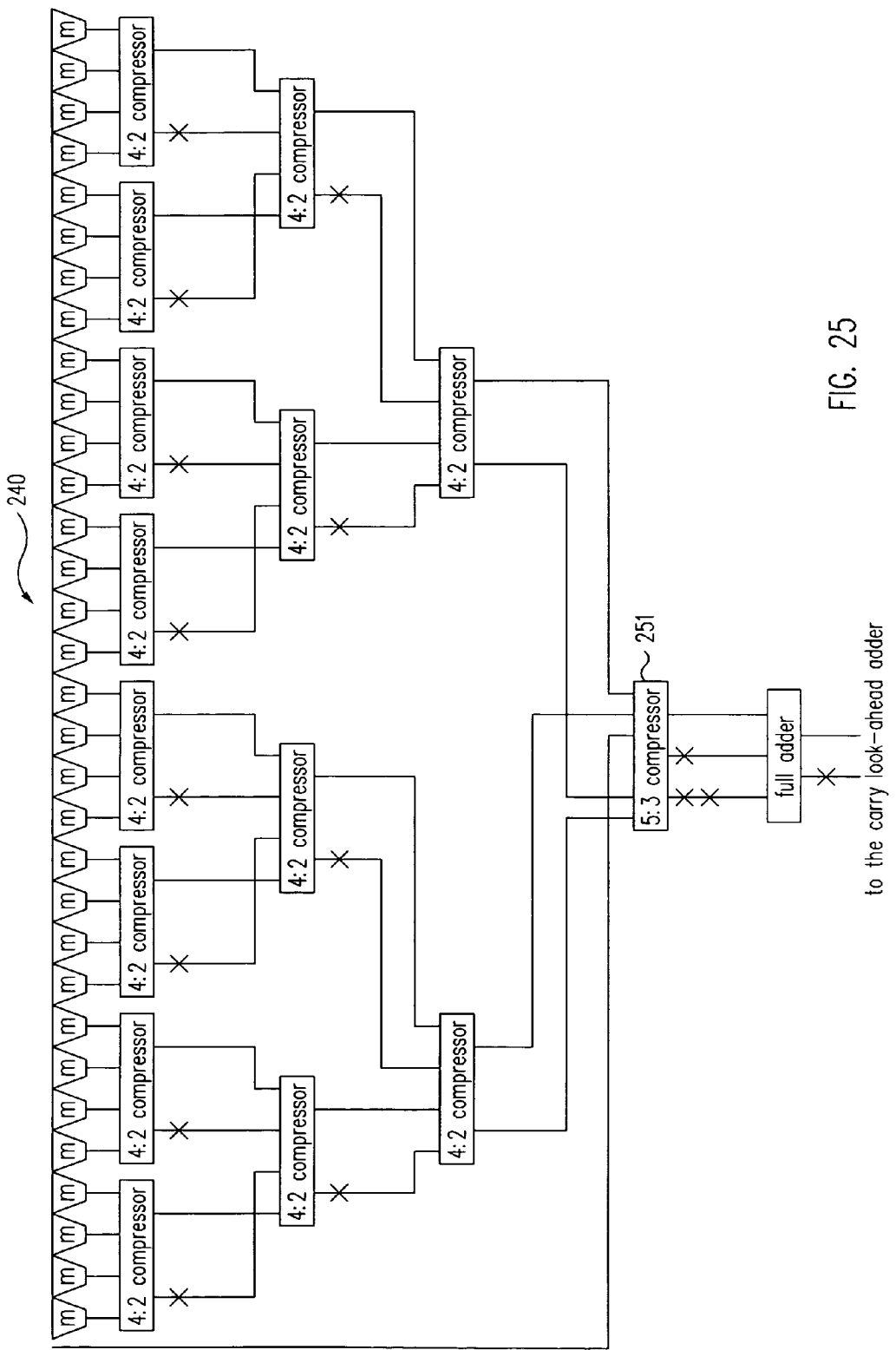
FIG. 25 shows another example of a Wallace tree column for a 64×64 multiplier with Booth encoding.
Figure 26:
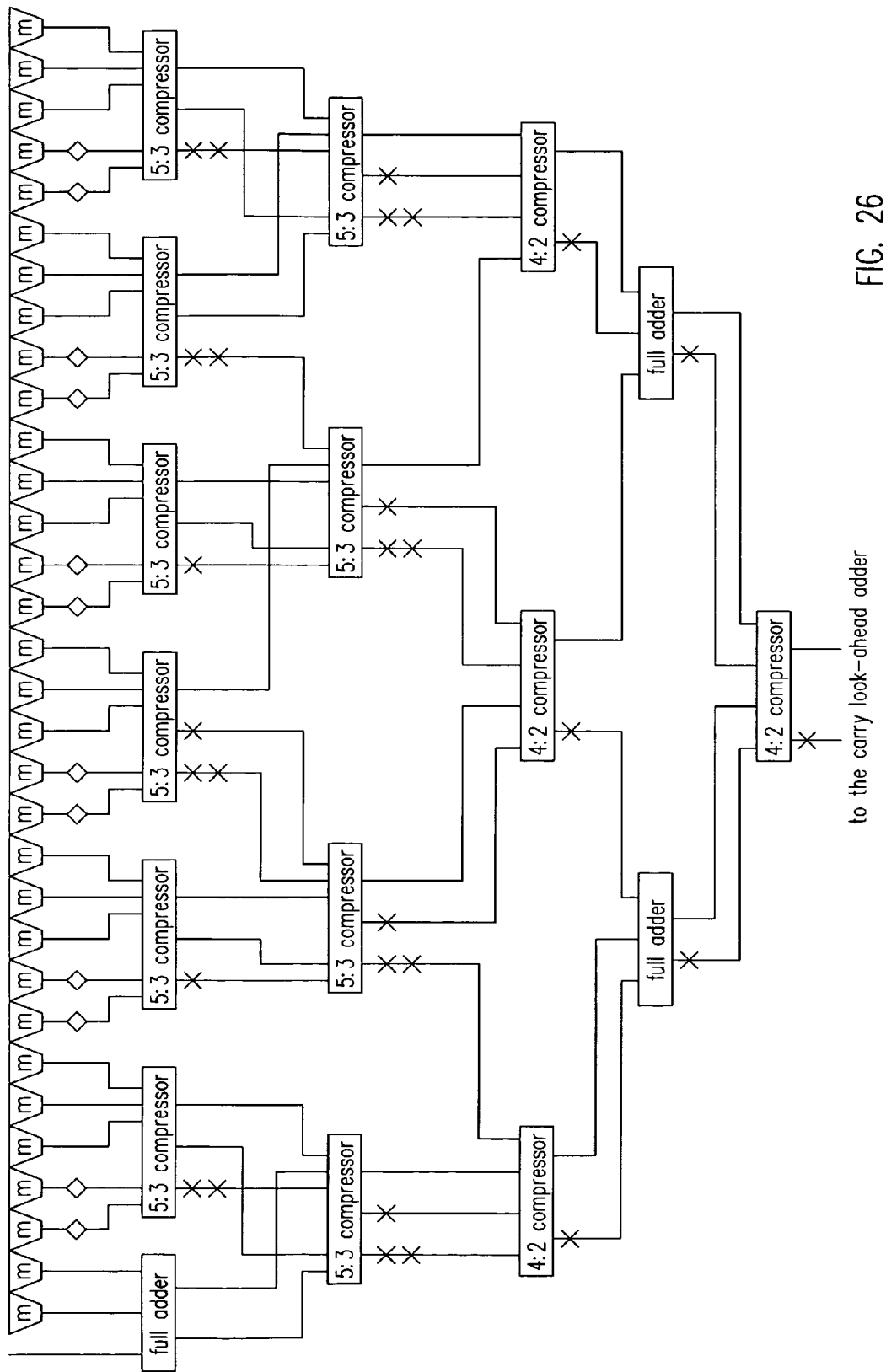
FIG. 26 shows another example of a Wallace tree column for a 64×64 multiplier with Booth encoding.

FIG. 24B shows an exemplary Wallace tree structure. The 32 multiplexers 240 provide a Booth encoding multiplexer. As Booth encoding is known in the art, it will not be discussed further herein. One input supplied on node 241 does not need the Booth encoding multiplexer, as its output may be obtained from a simple AND gate (the AND gate is not shown). Each of the first four rows of logic 242, 243, 244, 245 has 4 to 2 compressors, and so uses 3 levels of logic for each row for a total of 12 levels of logic. The final row has only a full adder 246. The full adder 246 takes another 2 levels of logic, so the total number of levels of logic is 14. In FIG. 25, the last 4 to 2 compressor 245 (FIG. 24) is replaced with a 5 to 3 compressor 251. That reduces the total number of levels of logic to 13. FIG. 26 uses 5 to 3 compressors extensively and so only 12 levels of logic are needed.

Now that several variations of Wallace trees have been shown, exemplary Wallace trees are shown that provide for the extended carry feedback required by the umulxc and umulxck (and bmulxc and bmulxck) instructions in the embodiments illustrated, e.g., in association with FIGS. 19 and 21.

Figure 27:
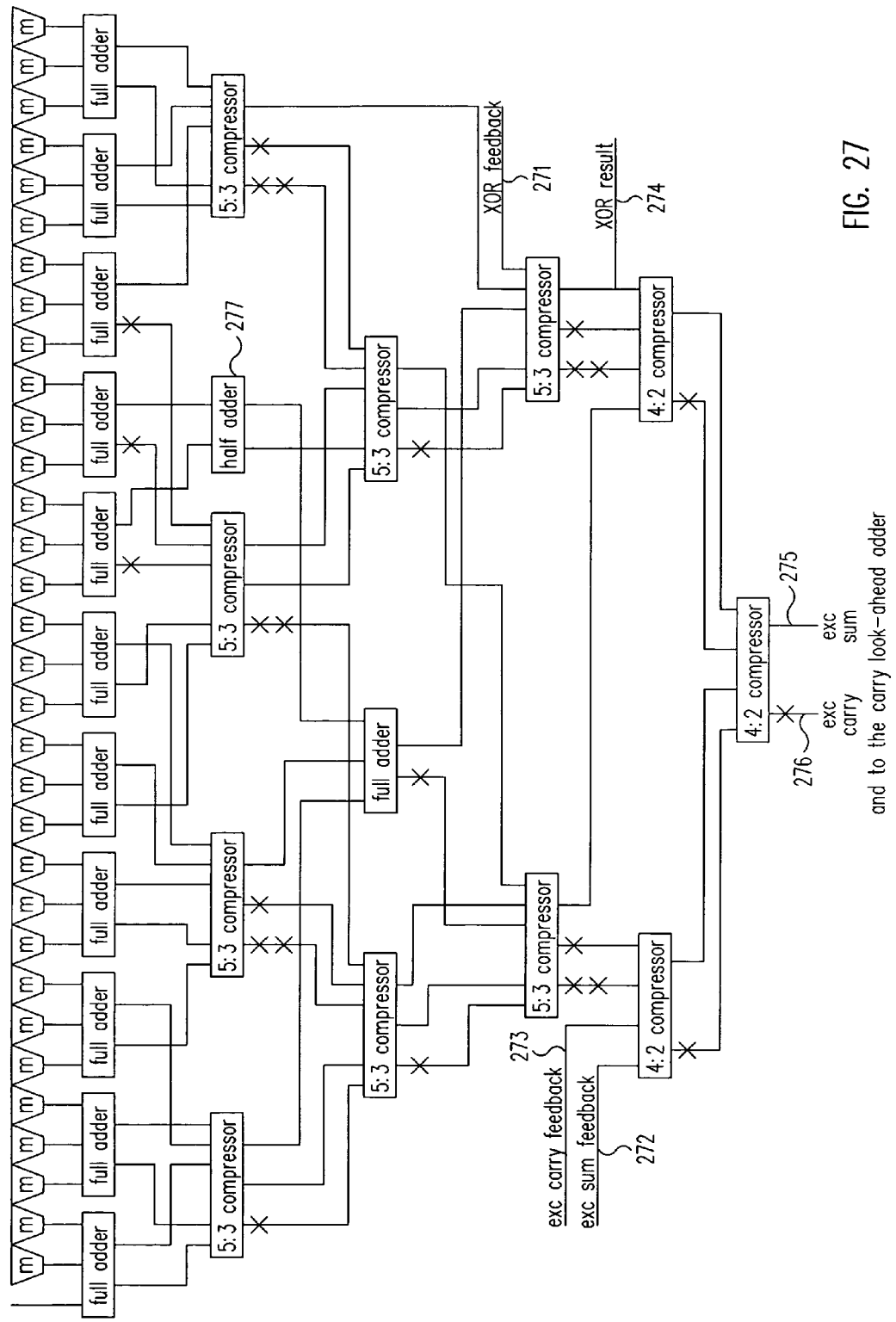
FIG. 27 illustrates an exemplary multiply-accumulate circuit according to an embodiment of the invention for implementing the bmulxc and umulxc instructions utilizing three feedback terms.

In order to accommodate both the XOR multiply-accumulate function and the integer multiply-accumulate for the bmulxc and umulxc instructions, three feedback terms may be utilized as illustrated in the exemplary embodiment shown in FIG. 27. One feedback term supplied on node 271 is for the XOR multiply when used in the multiply-accumulate mode, and the two terms (sum and carry) are supplied on nodes 272 and 273 for the integer multiply when used in the multiply-accumulate mode. The XOR result is supplied on node 274 and the sum and carry multiplication result from this column is supplied on nodes 275 and 276. Thus, for each Wallace tree column, at most one carry bit and one sum bit of the extended carry value from the high portion of the previous multiplication is fed back. For the XOR multiply, at most one bit is fed back.

Note that the number of levels of logic from the feedback inputs to the outputs is very small. For the XOR result, it is two levels from input 271 to output 274, and for the integer multiply terms it is 6 levels from inputs 272, 273 to the outputs 275, 276. This can be done in less than one clock, giving time for logic to decide whether (and when) feedback should be used. Note that the first row of the Wallace tree has only full adders. That is because the XOR result of all the inputs is needed in the XOR multiply mode, and the regular majority gate used in the compressors interferes with obtaining the XOR result. The Wallace tree column illustrated in FIG. 27 has 14 levels of logic.

Figure 28:
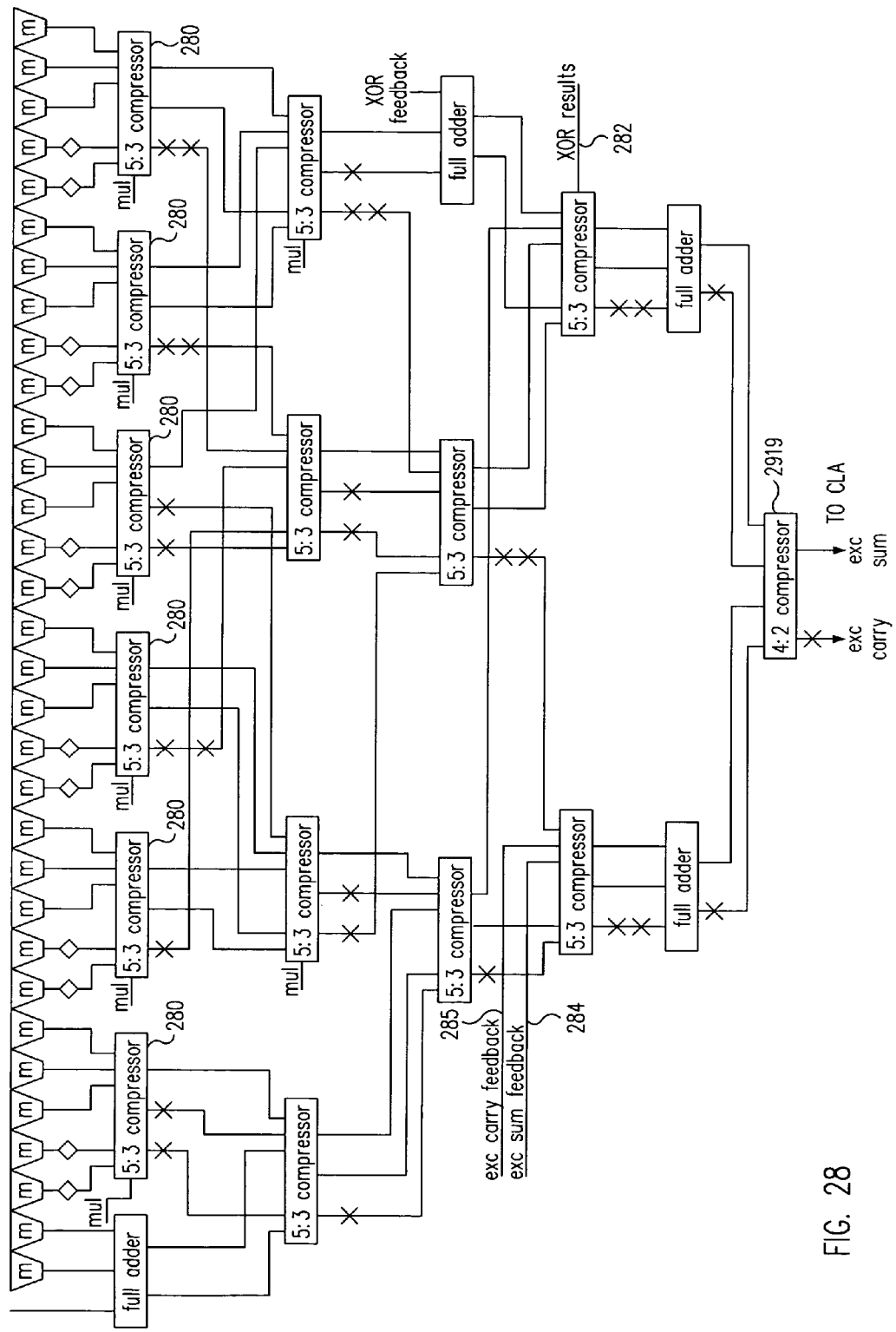
FIG. 28 illustrates an exemplary embodiment of a Wallace tree column used in a 64×64 multiplier with Booth encoding that supports the umulxc and bmulxc instructions for both integer multiply-accumulate and XOR multiply-accumulate.

Referring now to FIG. 28 shown is an exemplary embodiment of a Wallace tree column used in a 64×64 multiplier with Booth encoding that supports the umulxc and bmulxc instructions for both integer multiply-accumulate and XOR multiply-accumulate. The embodiment in FIG. 28 utilizes the mul majority circuit 234 shown in FIG. 23D in the 5:3 compressors 280 shown in FIG. 22C. The use of the mul majority circuit allows the first row to not be restricted to just full adders and still support the XOR multiply function by setting the mul input to the 5:3 compressor to 0, forcing the output of the majority circuit in the 5:3 compressor to 0 for XOR multiply operations. The use of the mul majority circuit results in 13 levels of logic. Note that the XOR result 282 comes from the output of the XOR gate 2210 (FIG. 22C) whose inputs are the A and B inputs. The extended carry sum and carry feedback bits are supplied on nodes 284 and 285.

Figure 29:
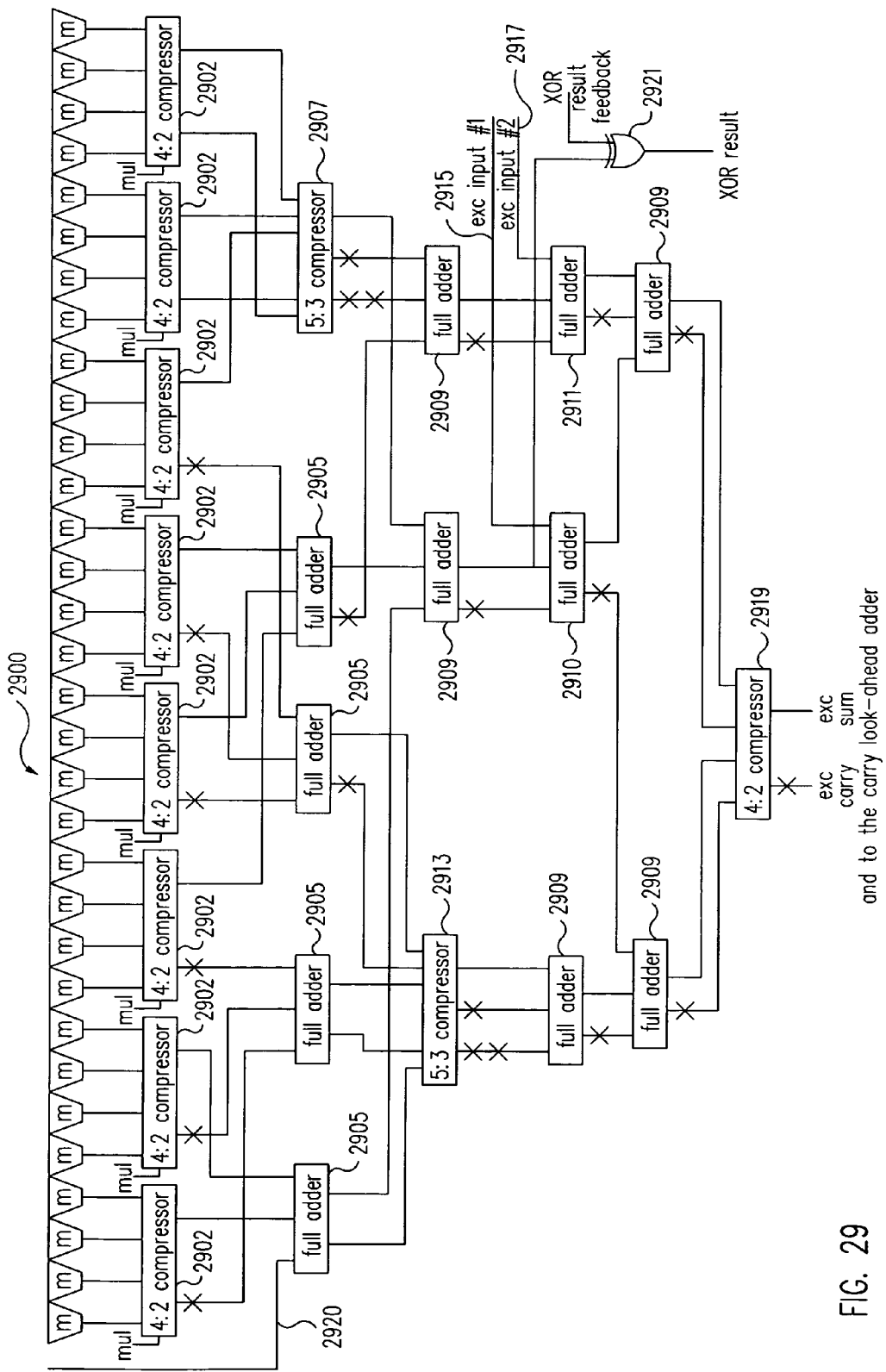
FIG. 29 illustrates another exemplary embodiment of a Wallace tree column used in a 64×64 multiplier with Booth encoding that supports the umulxc and bmulxc instructions for both integer multiply-accumulate and XOR multiply-accumulate.

Referring now to FIG. 29 shown is an exemplary embodiment of a Wallace tree column is shown used in a 64×64 multiplier with Booth encoding that supports the umulxc and bmulxc instructions for both integer multiply-accumulate and XOR multiply-accumulate. The embodiment in FIG. 29 utilizes the mul majority circuit 234 shown in FIG. 23D in the 4:2 compressors 2902 shown in FIG. 22B. The use of the mul majority circuit in the 4:2 compressors of FIG. 29 results in 14 levels of logic. A series of multiplexer 2900 are utilized to provide the Booth encoding. Outputs of the multiplexer are supplied to the 4:2 compressors 2902, whose outputs are supplied to the fill adders 2905 and the 5:3 compressor 2907. The series of full adders 2909, 2910, 2911, and 5:3 compressor 2913 are also utilized in the exemplary tree structure. Note that the full adder 2910 receives a first extended carry input on node 2915 and full adder 2911 receives a second extended carry input on node 2917. For the 64×64 multiplier, the outputs of the Wallace tree columns generating the high order bits that represent the extended carry are fed back into the Wallace tree columns generating the low order bits. The two outputs from the 4:2 compressor 2919 are those bits supplied to the carry look-ahead adder. Referring to FIG. 12, those bits would be, e.g., bits S3 and C3.

Note that FIG. 29 also includes an XOR gate 2921. That XOR gate receives the result of the XOR of the 32 inputs of the Wallace tree and is also supplied with the feedback of a high order bit of the XOR multiplication result, which is fed back to be XORed with the XOR result generated by the Wallace tree, thus adding a bit of the extended carry into a column of the Wallace tree for the XOR multiplication result. The carry look-ahead adder is not needed to implement the XOR multiplication utilized in binary polynomial field operations since no carry terms are generated. While the XOR multiplier may be integrated into the multiplier that performs integer multiplication, other embodiments contemplate the XOR multiplier and integer multipliers being separate. Further, some embodiments may utilize only XOR or only integer multipliers. Note also, while Booth encoding is illustrated, other embodiments may not utilize Booth encoding.

The Wallace tree column, such as the column illustrated in FIG. 29 can take two or more clock cycles to generate the result supplied to the carry look-ahead adder and the carry look-ahead adder can take nearly a clock cycle. If the carry output of the carry look-ahead adder (bit CC4 in FIGS. 11-12), were also fed back into the Wallace tree, then there would have to be an approximately one clock cycle delay between chained multiplies, which could significantly reduce performance. While that may be acceptable in certain embodiments, where for example, the operation is performed relatively infrequently so performance is not an important criterion, it is generally preferable to obtain more efficient performance if available. Thus, by feeding back the carry output of the carry look-ahead adder, into the carry look-ahead adder, as illustrated in, e.g., FIGS. 19 and 21, more efficiency is gained.

Figure 30:
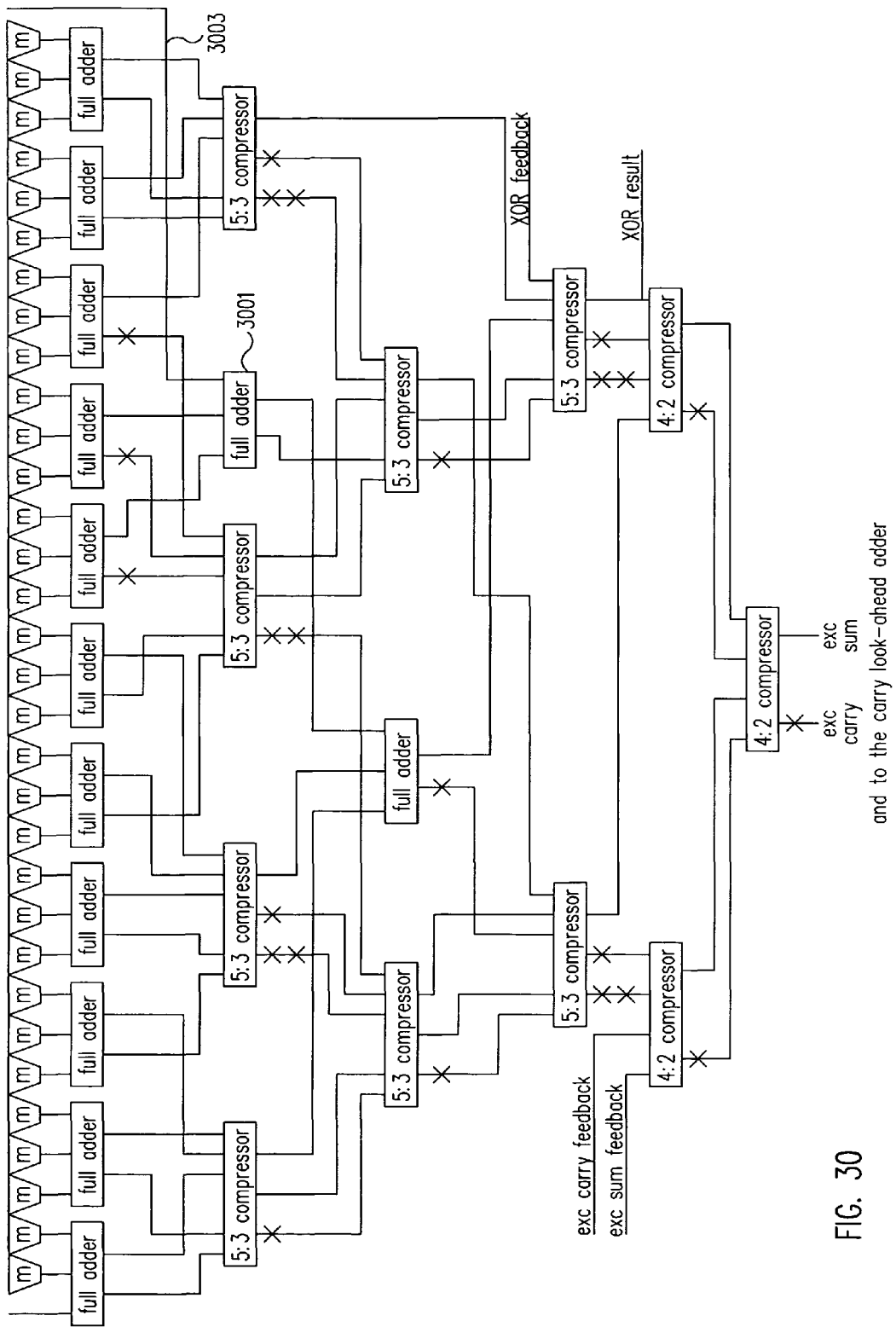
FIG. 30 illustrates an exemplary embodiment of a Wallace tree column used in a 64×64 multiplier with Booth encoding that supports the umulxck and bmulxck instructions for both integer multiply-accumulate and XOR multiply-accumulate.

For the umulxck and bmulxck instructions, where an additional term needs to be added in, FIG. 27 can be modified into FIG. 30. The half adder 277 in FIG. 27 is changed to a full adder 3001 in FIG. 30 to accommodate the extra term supplied on node 3003 from register Z (FIG. 20). The XOR multiply considerations are preserved. Thus, each Wallace tree column for the low order bits gets both feedback bits from the extended carry register and the bit to be added from the source operand rs2 (Z in FIG. 20) specified in the umulxck instruction (umulxck rs1, rs2, rd) and the bmulxck instruction.

Figure 31:
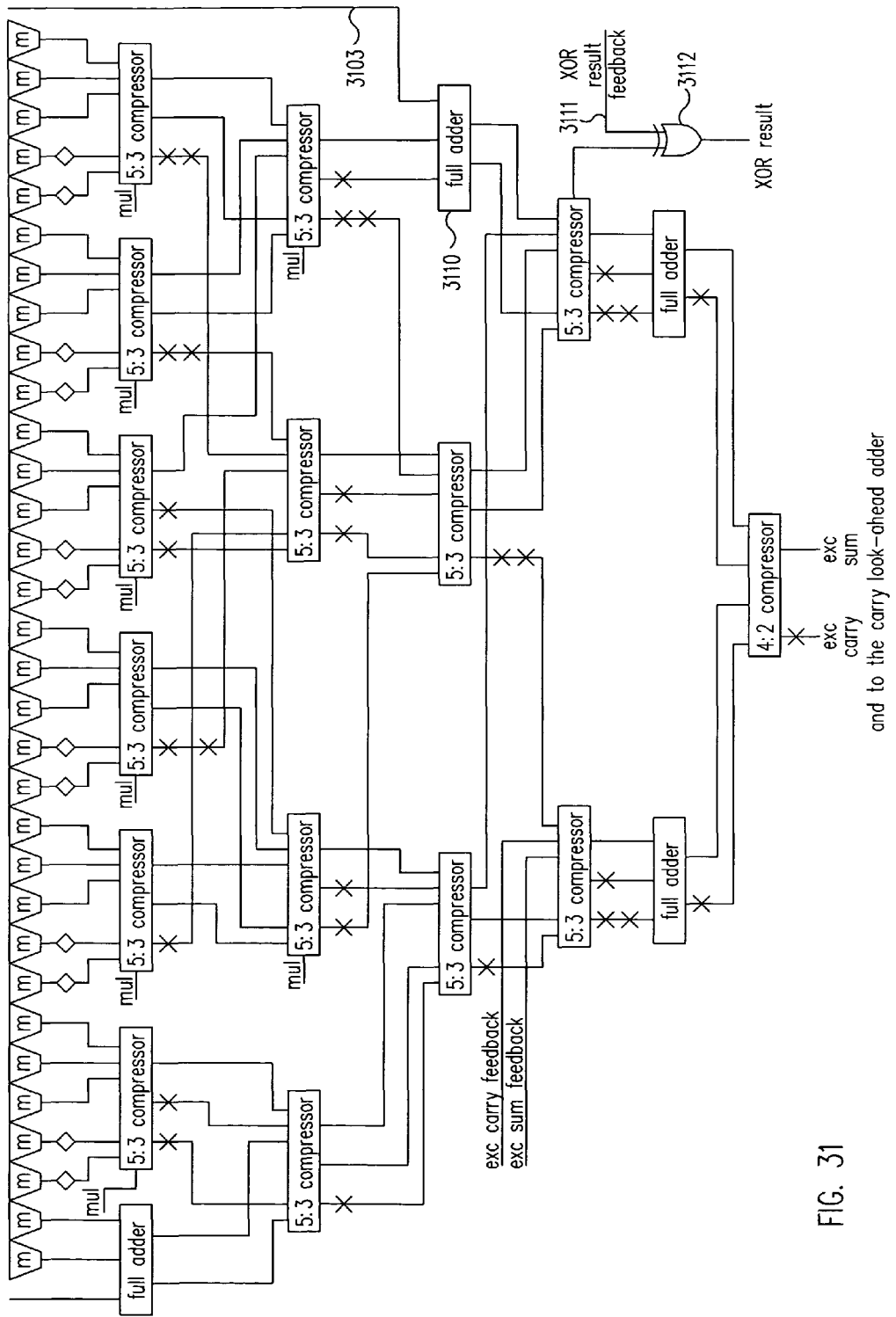
FIG. 31 illustrates another embodiment of a Wallace tree column used in a 64×64 multiplier with Booth encoding that supports the umulxck and bmulxck instructions for both integer multiply-accumulate and XOR multiply-accumulate.

FIG. 28 can also be modified for the umulxck and bmulxck instructions as shown in FIG. 31. The extra term from the source operand rs2 specified in the umulxck instruction (umulxck rs1, rs2, rd) and the bmulxck instruction is input into the Wallace tree on node 3103 to full adder 3110 where the XOR feedback was in FIG. 28. The XOR feedback supplied on node 3111 is input into XOR gate 3112.

Figure 32:
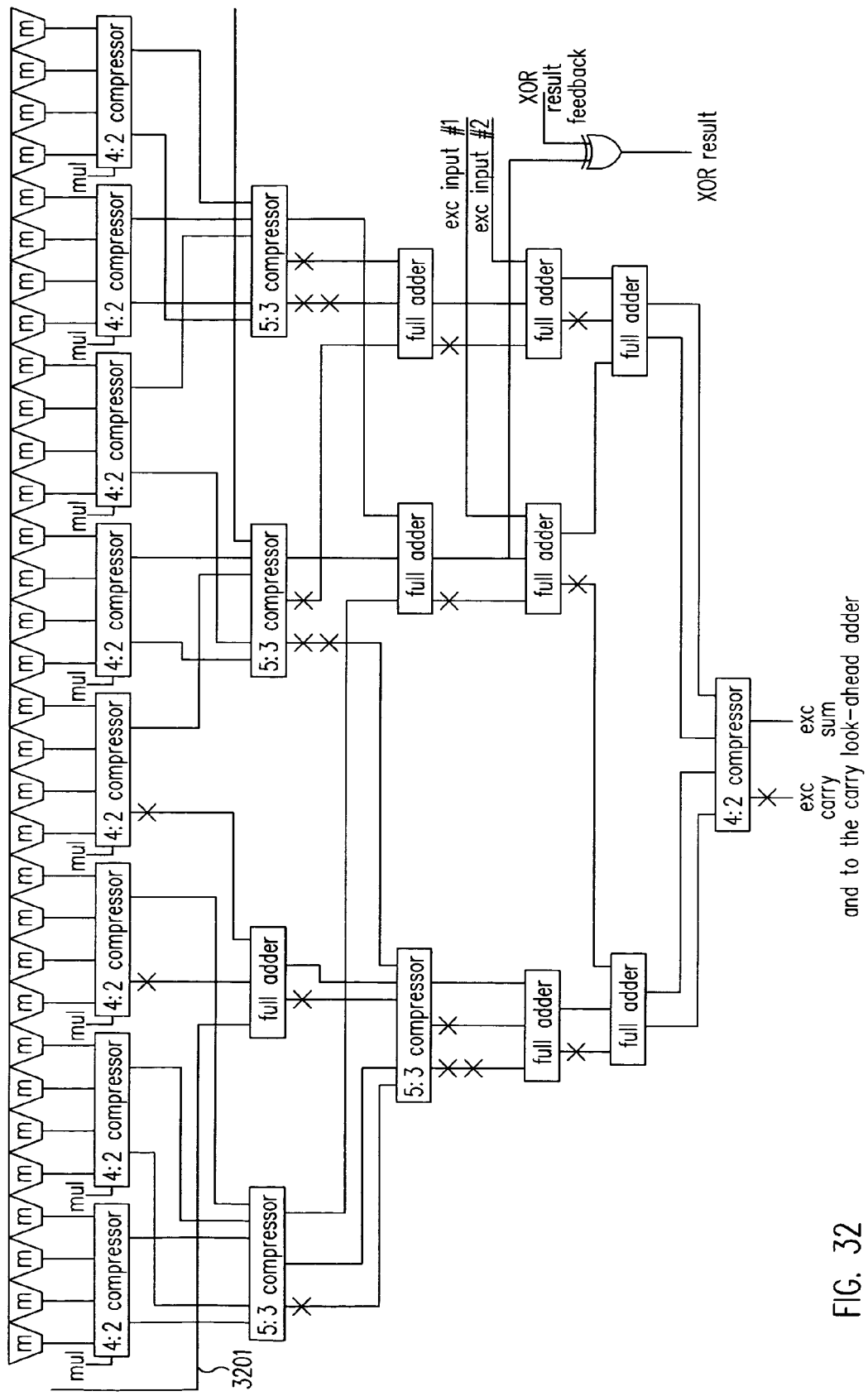
FIG. 32 illustrates another embodiment of a Wallace tree column used in a 64×64 multiplier with Booth encoding that supports the umulxck and bmulxck instructions for both integer multiply-accumulate and XOR multiply-accumulate.

FIG. 29 can also be modified to support the umulxck and bmulxck instructions as illustrated in FIG. 32. To do this, three of the full adders in the second row are replaced with two 5 to 3 compressors. Note that the $33^{rd}$ Booth encoding input on node 3201 that, in FIG. 29 (node 292) contributed to the XOR output, does not contribute to the XOR output. This is acceptable because when obtaining the XOR result, the $33^{rd}$ Booth encoding input is always zero. Thus it doesn't matter whether the value is included in the XOR result.

The instructions proposed herein provide significant performance advantages. The instructions defined herein compute the product once and save the upper 64-bit result for the next operation. The new instruction can propagate the upper 64 bits of a product into a subsequent operation without incurring delay. That helps reduce the delay and the number of registers needed to store intermediate results. The extended carry register saves the upper-64-bit result and accumulates it into the next operation.

The embodiments described above are presented as examples and are subject to other variations in structure and implementation within the capabilities of one reasonably skilled in the art. The details provided above should be interpreted as illustrative and not as limiting. Variations and modifications of the embodiments disclosed herein, may be made based on the description set forth herein, without departing from the scope of the invention as set forth in the following claims.

APPENDIX A umulxck rs1, rs2, rd:   rd <- lower 64-bits of (rs1*K + rs2 + exc)
                        exc <- higher 64-bits of (rs1*K + rs2 + exc)
1) ldx [a0], %13; xor %g0, %g0
2) ldx [b0], %14; mov %13, %K
3) ldx [b1], %15; umulxck %g0, %g0, %g1 ! exc = 0
4) ldx [b2], %16; umulxck %14, %g0, %i0
5) ldx [b3], %17; umulxck %15, %g0, %i1
6) umulxck %16, %g0, %i2
7) umulxck %17, %g0, %i3
8) umulxck %g0, %g0, %i4
9) ldx [a1], %13
10) mov %13, %K
11) umulxck %14, %i1, %i1
12) umulxck %15, %i2, %i2; stx %i0, [dest]
13) umulxck %16, %i3, %i3
14) umulxck %17, %i4, %i4
15) umulxck %g0, %g0, %i5
16) ldx [a2], %13
17) mov %13, %K
18) umulxck %14, %i2, %i2
19) umulxck %15, %i3, %i3; stx %i1, [dest+8]
20) umulxck %16, %i4, %i4
21) umulxck %17, %i5, %i5
22) umulxck %g0, %g0, %i6
23) ldx [a3], %13
24) mov %13, %K
25) umulxck %14, %i3, %i3
26) umulxck %15, %i4, %i4; stx %i2, [dest+16]
27) umulxck %16, %i5, %i5

```
28) umulxck %i7, %i6, %i6
29) umulxck %g0, %g0, %i7
30)
31)
32)
33) stx %i3, [dest+24]
34) stx %i4, [dest+32]
35) stx %i5, [dest+40]
36) stx %i6, [dest+48]
37) stx %i7, [dest+52]
```

What is claimed is:

1. A method implemented in a device supporting a public-key cryptography application, the method comprising:
feeding back, using a first arithmetic circuit comprising a first plurality of arithmetic structures, high order bits of a previously executed single arithmetic instruction of a processor instruction set in the public-key cryptography application, generated by the first arithmetic circuit, to a second arithmetic circuit comprising a second plurality of arithmetic structures;
generating, using the second arithmetic circuit, a first partial result of a currently executing single arithmetic instruction of the processor instruction set in the public-key cryptography application, wherein the currently executing single arithmetic instruction does not include an explicit source operand for specifying the high order bits, the first partial result representing the high order bits summed with low order bits of a result of a first number multiplied by a second number, the summing of the high order bits being performed during multiplication of the first number and the second number, the summing and at least a portion of the multiplication being performed in the second arithmetic circuit;
storing the first partial result; and
using the stored first partial result in a subsequent computation in the public-key cryptography application.

2. The method as recited in claim 1 wherein the high order bits are fed back in redundant number representation.

3. The method as recited in claim 2 wherein the redundant number representation includes sum and carry bits.

4. The method as recited in claim 1, further comprising feeding back the high order bits through a register to the second arithmetic circuit.

5. The method as recited in claim 1, further comprising:
generating a second partial result of the currently executing single arithmetic instruction in the first arithmetic circuit, the second partial result representing the high order bits of the multiplication result of the first number multiplied by the second number.

6. The method as recited in claim 1, further comprising:
generating a second partial result of the currently executing single arithmetic instruction, the second partial result representing the high order bits of the multiplication result of the first number multiplied by the second number summed with the high order bits of the previously executed single arithmetic instruction.

7. The method as recited in claim 6 further comprising supplying values generated in one or more most significant columns of the second arithmetic structures to one or more least significant columns of the first arithmetic structures while generating the first and second partial results.

8. The method as recited in claim 5 wherein the generating of the first and second partial result is in response to execution of the currently executing single arithmetic instruction.

9. The method as recited in claim 6 wherein the generating of the first and second partial result is in response to execution of the currently executing single arithmetic instruction.

10. The method as recited in claim 1, wherein at least one of the first and second pluralities of arithmetic structures comprises a plurality of carry save adder tree columns.

11. The method as recited in claim 1, wherein at least one of the first and second pluralities of arithmetic structures comprises a plurality of Wallace tree columns.

12. The method as recited in claim 1, wherein at least one of the first and second pluralities of arithmetic structures is usable to perform both integer and XOR multiplication.

13. The method as recited in claim 12, further comprising a logical circuit in at least one of the first and second arithmetic circuits supplying a fixed value if in XOR multiplication mode or a variable value that varies according to inputs supplied to the logical circuit if in integer multiplication mode, to thereby ensure a result is determined in XOR multiplication unaffected by carry logic performing carries in integer multiplication mode.

14. The method as recited in claim 13 wherein the logical circuit operates as a majority circuit in integer multiplication mode and outputs a zero in the XOR multiplication mode.

15. The method as recited in claim 1 wherein the first partial result is in redundant number representation.

16. The method as recited in claim 15 further comprising supplying the first partial result to an adder circuit to generate a non redundant representation of the first partial result and a carry out value.

17. The method as recited in claim 16 further comprising feeding back the carry out value to the adder circuit.

18. The method as recited in claim 16, further comprising feeding back the carry out value to the second arithmetic circuit.

19. The method as recited in claim 1, further comprising feeding back high order bits of the currently executing single arithmetic instruction from the first arithmetic circuit to the second arithmetic circuit for use with execution of a subsequent single arithmetic instruction of the processor instruction set.

20. The method as recited claim 1 further comprising storing the high order bits into an extended carry register.

21. A method implemented in a device supporting a public-key cryptography application, the method comprising:
feeding back, using a first arithmetic circuit comprising a first plurality of arithmetic structures, high order bits of a previously executed single arithmetic instruction of a processor instruction set in the public-key cryptography application, generated by the first arithmetic circuit to a second arithmetic circuit comprising a second plurality of arithmetic structures;
supplying a third number to the second arithmetic circuit;
generating, using the second arithmetic circuit, a first partial result of a currently executing single arithmetic instruction of the processor instruction set in the public-key cryptography application, wherein the currently executing single arithmetic instruction does not include an explicit source operand for specifying the high order bits, the first partial result being a representation of the high order bits summed with low order bits of a result of a first number multiplied by a second number and with the third number, the summing being performed during multiplication of the first number and the second number, the summing and at least a portion of the multiplication being performed in the second arithmetic circuit;
storing the first partial result; and
using the first partial result in a subsequent computation in the public-key cryptography application.

22. The method as recited in claim 21, further comprising feeding back the high order bits through a register to the second arithmetic circuit.

23. The method as recited in claim 21, further comprising:
the first arithmetic circuit generating a second partial result of the currently executing single arithmetic instruction, the second partial result representing the high order bits of the multiplication result of the first number multiplied by the second number.

24. The method as recited in claim 21, further comprising:
generating a second partial result of the currently executing single arithmetic instruction, the second partial result representing the high order bits of the multiplication result of the first number multiplied by the second number summed with the high order bits of the previously executed single arithmetic instruction and the third number.

25. The method as recited in claim 24 further comprising supplying values generated in one or more most significant columns of the second arithmetic structures to one or more least significant columns of the first arithmetic structures while generating the first and second partial results.

26. The method as recited in claim 23 wherein the generating of the first and second partial result is in response to execution of the single arithmetic instruction.

27. The method as recited in claim 21
supplying the first partial result to an adder circuit to generate a non redundant representation of the first partial result and a carry out value.

28. The method as recited in claim 27 further comprising feeding back the carry out value to the adder circuit.

29. The method as recited in claim 27, method further comprising feeding back the carry out value to the second arithmetic circuit.

30. The method as recited in claim 21, wherein at least one of the first and second pluralities of arithmetic structures comprises a plurality of Wallace tree columns.

31. The method as recited in claim 21, wherein at least one of the first and second pluralities of arithmetic structures comprises a plurality of carry save adder tree columns.

32. The method as recited in claim 21, wherein at least one of the first and second pluralities of arithmetic structures is usable to perform both integer and XOR multiplication.

33. The method as recited in claim 32, further comprising a logic circuit in at least one of the first and second pluralities of arithmetic structures supplying a fixed value if in XOR multiplication mode or a variable value that varies according to inputs supplied to the logical circuit if in integer multiplication mode, to thereby ensure a result is determined in XOR multiplication unaffected by carry logic performing carries in integer multiplication mode.

34. The method as recited in claim 33 wherein the logic circuit operates as a majority circuit in integer multiplication mode and outputs a zero in the XOR multiplication mode.

35. The method as recited in claim 21 wherein the high order bits are in redundant number representation.

36. The method as recited in claim 21 further comprising feeding back high order bits of the currently executing single arithmetic instruction from the first arithmetic circuit to the second arithmetic circuit for use with execution of a subsequent single arithmetic instruction of the processor instruction set.

37. The method as recited in claim 21 further comprising storing the high order bits into an extended carry register.

38. A processor configured to support public-key cryptography applications, comprising:
a first plurality of arithmetic structures configured to generate high order bits for an arithmetic instruction of the processor's instruction set in a public-key cryptography application that includes a multiplication operation; and
a second plurality of arithmetic structures configured to generate low order bits of the arithmetic instruction;
wherein the second arithmetic structures are further configured to receive the high order bits generated by the first plurality of arithmetic structures during execution of a previous instance of the arithmetic instruction in the public-key cryptography application and to generate a first partial result of a currently executing instance of the arithmetic instruction, wherein the arithmetic instruction does not include an explicit source operand for specifying the high order bits, the first partial result representing the high order bits summed with low order bits of a multiplication result of the multiplication operation; and
wherein the processor further comprises a register configured to store the first partial result for use in a subsequent arithmetic operation in the public-key cryptography application.

39. The processor as recited in claim 38, wherein the first arithmetic structures are configured to generate a second partial result of the currently executing instance of the arithmetic instruction, the second partial result representing the high order bits of the currently executing instance of the arithmetic instruction.

40. The processor as recited in claim 39, wherein the second arithmetic structures are further configured to supply values generated in one or more most significant columns of the second arithmetic structures to one or more least significant columns of the first arithmetic structures while generating the first and second partial results.

41. The processor as recited in claim 39, wherein the first and second arithmetic structures are configured to generate the first and second partial results in response to execution of an instance of the arithmetic instruction.

42. The processor as recited in claim 38, further comprising a register coupled to the first and second arithmetic structures to supply the high order bits to the second arithmetic structures.

43. The processor as recited in claim 38, wherein the first partial result is in redundant number representation.

44. The processor as recited in claim 43, further comprising an adder circuit configured to receive the first partial result and to generate a non redundant representation of the first partial result and a carry out value.

45. The processor as recited in claim 44, wherein adder circuit is configured to feed the carry out value back to itself as an input.

46. The processor as recited in claim 44, wherein adder circuit is configured to feed the carry out value back to the second arithmetic structures.

47. The processor as recited in claim 38, wherein at least one of the first and second pluralities of arithmetic structures comprises a plurality of Wallace tree columns.

48. The processor as recited in claim 38, wherein at least one of the first and second pluralities of arithmetic structures comprises a plurality of carry save adder tree columns.

49. The processor as recited in claim 38, wherein at least one of the first and second pluralities of arithmetic structures is configured to selectively perform one of integer and XOR multiplication according to a control signal.

50. The processor as recited in claim 49, further comprising a plurality of logic circuits in the first and second pluralities of arithmetic structures, each logic circuit responsive to the control signal to supply a fixed output value in XOR multiplication mode and a variable output value in integer multiplication mode, the variable output value varying according to values of inputs supplied to the logic circuit, to thereby ensure a result is determined in XOR multiplication mode unaffected by carry logic generating carries in integer multiplication mode.

51. The processor as recited in claim 50, wherein the logical circuit is configured to operate as a majority circuit in integer multiplication mode and to output a zero in XOR multiplication mode.

52. The processor as recited in claim 38, wherein the processor is a general purpose processor.

53. A processor configured to support public-key cryptography applications, comprising:
a first plurality of arithmetic structures configured to generate high order bits for an arithmetic instruction of the processor's instruction set in a public-key cryptography application that includes a multiplication operation of a first and a second number; and
a second plurality of arithmetic structures configured to generate low order bits of the arithmetic instruction;
wherein the second arithmetic structures are configured to:
receive the high order bits generated by the first plurality of arithmetic structures during execution of a previous instance of the arithmetic instruction;
receive a third number; and
generate a first partial result of a currently executing instance of the arithmetic instruction, wherein the arithmetic instruction does not include an explicit source operand for specifying the high order bits, the first partial result representing the high order bits summed with low order bits of a multiplication result of the multiplication operation and with the third number; and
wherein the processor further comprises a register configured to store the first partial result for use in a subsequent arithmetic operation in the public-key cryptography application.

54. The processor as recited in claim 53, wherein the first arithmetic structures are further configured to generate a second partial result of the currently executing instance of the arithmetic instruction, the second partial result representing the high order bits of the currently executing instance of the arithmetic instruction.

55. The processor as recited in claim 54, wherein the second arithmetic structures are further configured to generate values in one or more most significant columns and to supply them to one or more least significant columns of the first arithmetic structures while generating the first and second partial results.

56. The processor as recited in claim 54, wherein the first arithmetic structures are configured to generate the first and second partial result in response to execution of an instance of the arithmetic instruction.

57. The processor as recited in claim 53, further comprising a register coupled to the first and second arithmetic structures to supply the high order bits to the second arithmetic structures.

58. The processor as recited in claim 53, further comprising an adder circuit configured to receive the first partial result and to generate a non redundant representation of the first partial result and a carry out value.

59. The processor as recited in claim 58 wherein the adder circuit is further configured to feed the carry out value back to itself as an input.

60. The processor as recited in claim 58, wherein the adder circuit is further configured to feed the carry out value back to the second arithmetic structures.

61. The processor as recited in claim 53, wherein at least one of the first and second arithmetic structures comprises Wallace tree columns.

62. The processor as recited in claim 53, wherein at least one of the first and second arithmetic structures comprises carry save adder tree columns.

63. The processor as recited in claim 53, wherein the arithmetic structures are configured to selectively perform one of integer and XOR multiplication according to a control signal.

64. The processor as recited in claim 63, further comprising a plurality of logic circuits in at least one of the first and second pluralities of arithmetic structures, each logic circuit responsive to the control signal to supply a fixed output value in XOR multiplication mode and a variable output value in integer multiplication mode, the variable output value varying according to values of inputs supplied to the logic circuit, to thereby ensure a result is determined in XOR multiplication mode unaffected by carry logic generating carries in integer multiplication mode.

65. The processor as recited in claim 64, wherein the logical circuit is configured to operate as a majority circuit in integer multiplication mode and to output a zero in the XOR multiplication mode.

66. An apparatus configured to support a public-key cryptography application, comprising:
means for feeding back high order bits of a previously executed single arithmetic instruction of a processor instruction set, generated by a first arithmetic circuit, to a second arithmetic circuit generating low order bits of a currently executing single arithmetic instruction of the processor instruction set;
means for using the second arithmetic circuit to generate a first partial result of the currently executing single arithmetic instruction, wherein the currently executing single arithmetic instruction does not include an explicit source operand for specifying the high order bits, the first partial result representing the high order bits of the previously executed single arithmetic instruction that are summed with low order bits of a multiplication result of a first number multiplied by a second number; and
means for using the first partial result in a subsequent computation in the public-key cryptography application.

67. An apparatus configured to support a public-key cryptography application comprising:
means for feeding back high order bits of a previously executed single arithmetic instruction of a processor instruction set, from a first arithmetic circuit that generated the high order bits, to a second arithmetic circuit generating low order bits of a currently executing single arithmetic instruction of the processor instruction set;
means for supplying a third number to the second arithmetic circuit;
means for using the second arithmetic circuit to generate a first partial result of the currently executing single arithmetic instruction, wherein the currently executing single arithmetic instruction does not include an explicit source operand for specifying the high order bits, the first partial result being a representation of the high order bits of the previously executed single arithmetic instruction summed with low order bits of a result of a first number multiplied by a second number and with the third number; and means for using the first partial result in a subsequent computation in the public-key cryptography application.

* * * * *